US012103305B2

(12) United States Patent
Kondo

(10) Patent No.: US 12,103,305 B2
(45) Date of Patent: Oct. 1, 2024

(54) LIQUID DISCHARGE DEVICE AND HEAD DRIVE CIRCUIT

(71) Applicant: SEIKO EPSON CORPORATION, Tokyo (JP)

(72) Inventor: Yoichiro Kondo, Chino (JP)

(73) Assignee: SEIKO EPSON CORPORATION (JP)

( * ) Notice: Subject to any disclaimer, the term of this patent is extended or adjusted under 35 U.S.C. 154(b) by 212 days.

(21) Appl. No.: 17/898,532

(22) Filed: Aug. 30, 2022

(65) Prior Publication Data

US 2023/0062573 A1 Mar. 2, 2023

(30) Foreign Application Priority Data

Aug. 31, 2021 (JP) ................................ 2021-140974

(51) Int. Cl.
*B41J 2/045* (2006.01)
*B41J 2/14* (2006.01)

(52) U.S. Cl.
CPC ....... *B41J 2/04581* (2013.01); *B41J 2/04541* (2013.01); *B41J 2/1408* (2013.01); *B41J 2/14201* (2013.01); *B41J 2202/20* (2013.01)

(58) Field of Classification Search
CPC .. B41J 2/04581; B41J 2/04541; B41J 2/1408; B41J 2/14201; B41J 2202/20; B41J 2002/14362; B41J 2002/14419; B41J 2002/14491; B41J 2/04588; B41J 2/04593; B41J 2/04596; B41J 2/14233
See application file for complete search history.

(56) References Cited

U.S. PATENT DOCUMENTS

2018/0170038 A1 6/2018 Matsumoto

FOREIGN PATENT DOCUMENTS

JP 2018-099835 A 6/2018
JP 2018103367 A * 7/2018 ............. B41J 2/045

* cited by examiner

*Primary Examiner* — Justin Seo
*Assistant Examiner* — Tracey M McMillion
(74) *Attorney, Agent, or Firm* — Harness, Dickey & Pierce, P.L.C.

(57) ABSTRACT

A liquid discharge device includes a first discharge portion, a second discharge portion, a first drive circuit outputs a first drive signal that the first discharge portion discharges a liquid having a first discharge amount, a second drive circuit outputs a second drive signal that the first discharge portion does not discharge a liquid, a third drive circuit outputs a third drive signal that the second discharge portion discharges a liquid having a second discharge amount, and a fourth drive circuit outputs a fourth drive signal that the second discharge portion does not discharge the liquid, in which the third drive circuit is located between the first drive circuit and the second drive circuit along the one direction, and a shortest distance between the fourth drive circuit and the second drive circuit is shorter than a shortest distance between the fourth drive circuit and the third drive circuit.

8 Claims, 25 Drawing Sheets

| [SIH, SIL] | [1, 1] LD | [1, 0] SD | [0, 1] ND | [0, 0] BSD |
|---|---|---|---|---|
| S1 | H | L | L | L |
| S2 | L | H | L | L |
| S3 | L | L | L | H |

LIQUID DISCHARGE DEVICE AND HEAD DRIVE CIRCUIT

The present application is based on, and claims priority from JP Application Serial Number 2021-140974, filed Aug. 31, 2021, the disclosure of which is hereby incorporated by reference herein in its entirety.

BACKGROUND

1. Technical Field

The present disclosure relates to a liquid discharge device and a head drive circuit.

2. Related Art

It is known that a liquid discharge device that forms an image or a document on a medium by discharging ink as a liquid includes a drive element provided corresponding to each of a plurality of nozzles for discharging the liquid, and the drive element is driven to discharge the ink from the corresponding nozzle. The drive element used in such a liquid discharge device is provided corresponding to each of the plurality of nozzles. Therefore, it is necessary for a drive circuit to output a drive signal including a sufficient current capable of driving the plurality of drive elements at the same time. In particular, in the liquid discharge device using the piezoelectric element as the drive element, since the piezoelectric element is a capacitive load like a capacitor when electrically viewed, it is necessary to supply a sufficient current to the piezoelectric element from the viewpoint of driving the piezoelectric element with high accuracy.

However, the drive circuit for driving the drive element generates a large amount of heat because the drive circuit outputs a drive signal including a large current. When the heat generated in such a drive circuit contributes to the discharged liquid, the physical properties of the liquid may change. In addition, when the heat generated in the drive circuit contributes to an electronic component included in the drive circuit, the characteristics of the electronic component may change. That is, the heat generated in the drive circuit may lower the stability of the operation of the drive circuit, and may also lower the discharge characteristics of the liquid in the liquid discharge device by changing the physical properties of the liquid. Therefore, in the liquid discharge device, various heat radiation structures for efficiently releasing the heat of the drive circuit are studied.

For example, JP-A-2018-099835 discloses a liquid discharge device in which a circuit substrate in which a plurality of drive circuits for outputting a drive signal for driving a piezoelectric element as a drive element are disposed is housed in a case, and a technique for enhancing the release efficiency of heat of the drive circuit and enhancing the stability of the operation of the drive circuit by disposing the drive circuit having a large amount of heat near an intake port of the case among the plurality of the drive circuits.

In response to the recent market demand for higher image formation speeds in liquid discharge devices, the number of nozzles included in the liquid discharge device has increased. As a result, the number of drive elements for discharging liquid from the nozzles has also increased. Such an increase in the number of drive elements leads to an increase in the output current of the drive circuit that outputs the drive signal for driving the drive elements. As a result, the heat generation of the drive circuit may be further increased. In addition, as the number of drive elements included in the liquid discharge device increases, the number of drive circuits that output drive signals for driving the drive elements also increases. That is, in response to the recent market demand for higher image formation speeds, the liquid discharge device is required to efficiently radiate heat from multiple drive circuits that generate a large amount of heat. However, from the viewpoint of efficiently radiating heat from the multiple drive circuits, a heat radiation method described in JP-A-2018-099835 is not sufficient, and there is room for improvement.

SUMMARY

According to an aspect of the present disclosure, there is provided a liquid discharge device including a discharge head that includes a first discharge portion group having a first piezoelectric element and a first discharge portion discharging a liquid in response to a drive of the first piezoelectric element, and a second discharge portion group having a second piezoelectric element and a second discharge portion discharging a liquid in response to a drive of the second piezoelectric element, a substrate, and a first drive circuit, a second drive circuit, a third drive circuit, and a fourth drive circuit arranged side by side along one direction of the substrate, in which the first drive circuit outputs a first drive signal for driving the first piezoelectric element so that the first discharge portion discharges a liquid having a first discharge amount, the second drive circuit outputs a second drive signal for driving the first piezoelectric element so that the first discharge portion does not discharge a liquid, the third drive circuit outputs a third drive signal for driving the second piezoelectric element so that the second discharge portion discharges a liquid having a second discharge amount, the fourth drive circuit outputs a fourth drive signal for driving the second piezoelectric element so that the second discharge portion does not discharge a liquid, the third drive circuit is located between the first drive circuit and the second drive circuit along the one direction, and a shortest distance between the fourth drive circuit and the second drive circuit is shorter than a shortest distance between the fourth drive circuit and the third drive circuit.

According to another aspect of the present disclosure, there is provided a head drive circuit that drives a discharge head which includes a first discharge portion group having a first piezoelectric element and a first discharge portion discharging a liquid in response to a drive of the first piezoelectric element, and a second discharge portion group having a second piezoelectric element and a second discharge portion discharging a liquid in response to a drive of the second piezoelectric element, the circuit including a substrate, and a first drive circuit, a second drive circuit, a third drive circuit, and a fourth drive circuit arranged side by side along one direction of the substrate, in which the first drive circuit outputs a first drive signal for driving the first piezoelectric element so that the first discharge portion discharges a liquid having a first discharge amount, the second drive circuit outputs a second drive signal for driving the first piezoelectric element so that the first discharge portion does not discharge a liquid, the third drive circuit outputs a third drive signal for driving the second piezoelectric element so that the second discharge portion discharges a liquid having a second discharge amount, the fourth drive circuit outputs a fourth drive signal for driving the second piezoelectric element so that the second discharge portion does not discharge a liquid, the third drive circuit is located between the first drive circuit and the second drive circuit along the one direction, and a shortest distance between the fourth drive circuit and the second drive circuit is shorter than a shortest distance between the fourth drive circuit and the third drive circuit.

DESCRIPTION OF EXEMPLARY EMBODIMENTS

Hereinafter, preferred embodiments of the present disclosure will be described with reference to the drawings. The drawings used are for convenience of description. The embodiments described below do not unreasonably limit the content of the present disclosure described in the aspects. In addition, not all of the configurations described below are essential constituent requirements of the present disclosure.

1. First Embodiment

1.1 Configuration of Liquid Discharge Device

Figure 1:
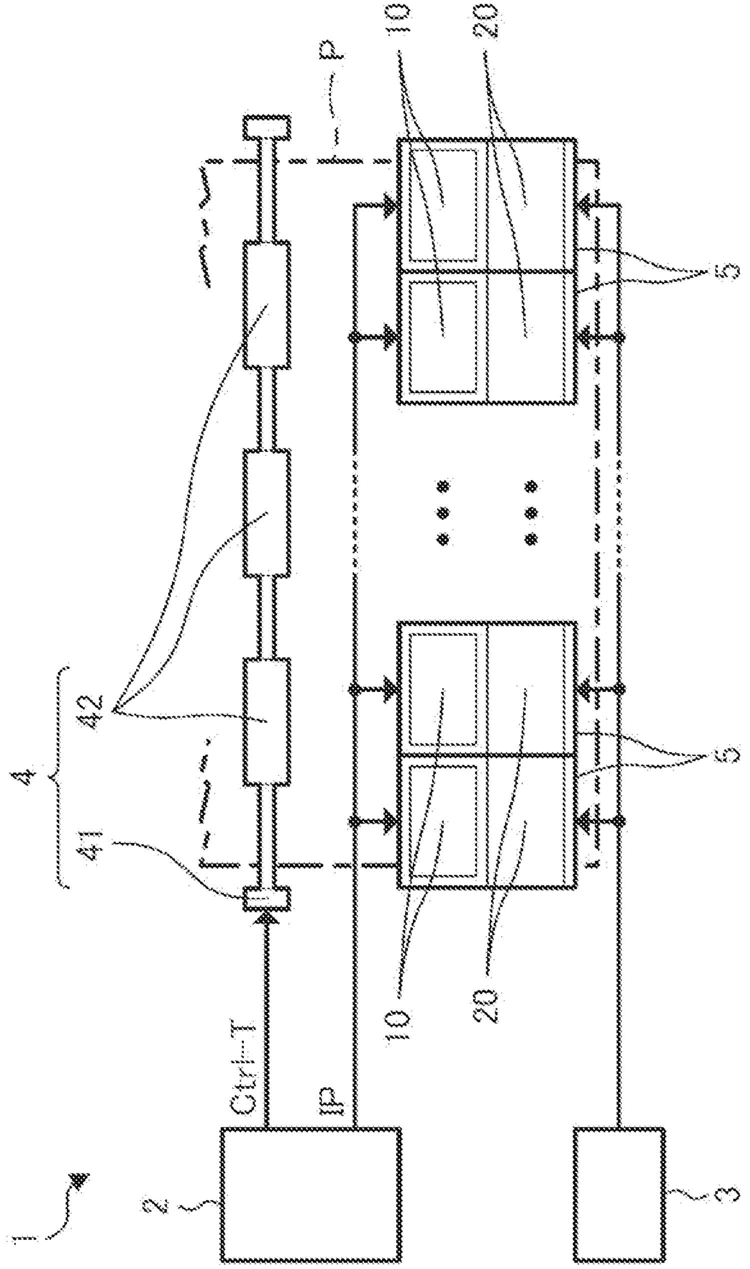
FIG. 1 is a diagram illustrating a schematic configuration of the liquid discharge device.

FIG. 1 is a diagram illustrating a schematic configuration of a liquid discharge device 1. As illustrated in FIG. 1, the liquid discharge device 1 is a so-called line-type ink jet printer that forms a desired image on a medium P by discharging ink at a desired timing on the medium P transported by a transport unit 4. Here, in the following description, a direction where the medium P is transported may be referred to as a transport direction, and a width direction of the transported medium P may be referred to as a main scanning direction.

As illustrated in FIG. 1, the liquid discharge device 1 is provided with a control unit 2, a liquid container 3, a transport unit 4, and a plurality of discharge units 5.

The control unit 2 includes a processing circuit such as a central processing unit (CPU) and a field programmable gate array (FPGA), and a storage circuit such as a semiconductor memory. The control unit 2 outputs a signal for controlling each element of the liquid discharge device 1 based on image data supplied from an external device such as a host computer (not illustrated) provided outside the liquid discharge device 1.

The ink as an example of the liquid supplied to the discharge unit 5 is stored in the liquid container 3. Specifically, the liquid container 3 stores inks of a plurality of colors discharged on the medium P, such as black, cyan, magenta, yellow, red, and gray.

The transport unit 4 includes a transport motor 41 and a transport roller 42. A transport control signal Ctrl-T output by the control unit 2 is input to the transport unit 4. The transport motor 41 operates based on the input transport control signal Ctrl-T, and the transport roller 42 is rotationally driven along with the operation of the transport motor 41, so that the medium P is transported along the transport direction.

Each of the plurality of discharge units 5 includes a head drive module 10 and a liquid discharge module 20. An image information signal IP output by the control unit 2 is input to the discharge unit 5, and the ink stored in the liquid container 3 is supplied. The head drive module 10 controls the operation of the liquid discharge module 20 based on the image information signal IP input from the control unit 2, and the liquid discharge module 20 discharges the ink supplied from the liquid container 3 on the medium P according to the control of the head drive module 10.

In the liquid discharge device 1 according to the first embodiment, the liquid discharge modules 20 included in each of the plurality of discharge units 5 are located side by side along the main scanning direction so as to be equal to or wider than the width of the medium P. Therefore, a so-called line-type ink jet printer capable of discharging ink to the entire region in the width direction of the medium P to be transported is configured. The liquid discharge device 1 is not limited to the line-type ink jet printer.

Figure 2:
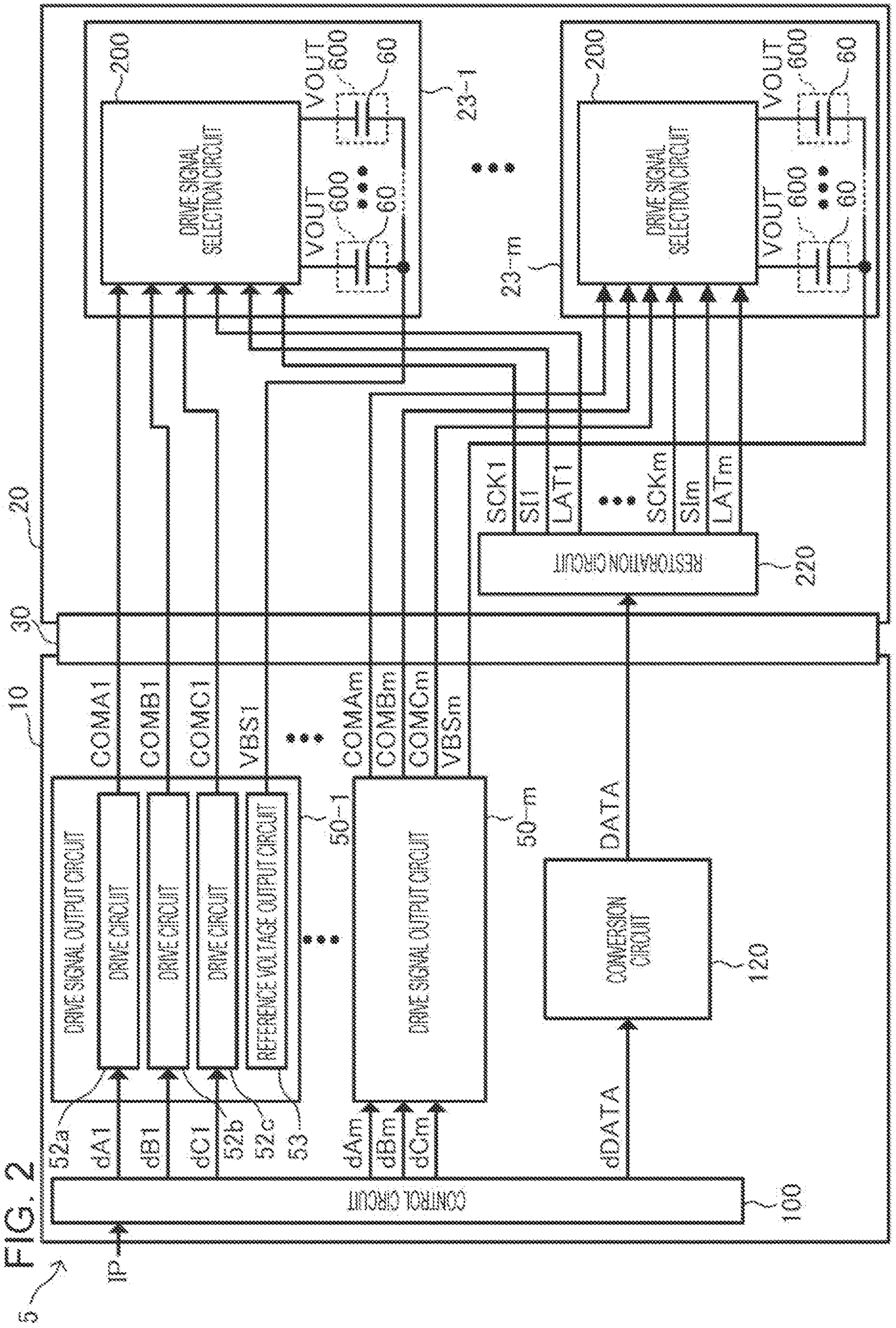
FIG. 2 is a diagram illustrating a schematic configuration of a discharge unit.

Next, a schematic configuration of the discharge unit 5 will be described. FIG. 2 is a diagram illustrating a schematic configuration of the discharge unit 5. As illustrated in FIG. 2, the discharge unit 5 includes the head drive module 10 and the liquid discharge module 20. In addition, in the discharge unit 5, the head drive module 10 and the liquid discharge module 20 are electrically coupled by a wiring member 30.

The wiring member 30 is a flexible member for electrically coupling the head drive module 10 and the liquid discharge module 20, and is, for example, flexible printed circuits (FPC) or a flexible flat cable (FFC). The head drive module 10 and the liquid discharge module 20 do not have an FPC or an FFC, and may be electrically coupled by, for example, a board to board (B to B) connector, or may be electrically coupled by using the B to B connector and the FPC or the FFC in combination.

The head drive module 10 includes a control circuit 100, a drive signal output circuit 50-1 to 50-*m*, and a conversion circuit 120.

The control circuit 100 includes a CPU, FPGA, or the like. The image information signal IP output by the control unit 2 is input to the control circuit 100. The control circuit 100 outputs a signal for controlling each element of the discharge unit 5 based on the input image information signal IP.

The control circuit 100 generates a basic data signal dDATA for controlling the operation of the liquid discharge module 20 based on the image information signal IP, and outputs the basic data signal dDATA to the conversion circuit 120. The conversion circuit 120 converts the basic data signal dDATA into a differential signal such as low voltage differential signaling (LVDS) and outputs a data signal DATA to the liquid discharge module 20. The conversion circuit 120 may convert the basic data signal dDATA into a differential signal of a high-speed transfer method such as low voltage positive emitter coupled logic (LVPECL) or current mode logic (CML) other than LVDS and output the differential signal as the data signal DATA to the liquid discharge module 20, and may output a part or all of the input basic data signal dDATA as a single-ended data signal DATA to the liquid discharge module 20.

In addition, the control circuit 100 outputs basic drive signals dA1, dB1, and dC1 to the drive signal output circuit 50-1. The drive signal output circuit 50-1 includes drive circuits 52*a*, 52*b*, and 52*c*. The basic drive signal dA1 is input to the drive circuit 52*a*. The drive circuit 52*a* generates a drive signal COMA1 by performing digital/analog conversion of the input basic drive signal dA1 and then amplifying in class D, and outputs the drive signal COMA1 to the liquid discharge module 20. The basic drive signal dB1 is input to the drive circuit 52*b*. The drive circuit 52*b* generates a drive signal COMB1 by performing digital/analog conversion of the input basic drive signal dB1 and then amplifying in class D, and outputs the drive signal COMB1 to the liquid discharge module 20. The basic drive signal dC1 is input to the drive circuit 52*c*. The drive circuit 52*c* generates a drive signal COMC1 by performing digital/analog conversion of the input basic drive signal dC1 and then amplifying in class D, and outputs the drive signal COMC1 to the liquid discharge module 20.

Here, each of the drive circuits 52*a*, 52*b*, and 52*c* may generate the drive signals COMA1, COMB1, and COMC1 by amplifying the waveforms defined by each of the input basic drive signals dA1, dB1, and dC1, and may include a class A amplifier circuit, a class B amplifier circuit, a class AB amplifier circuit, or the like in place of the class D amplifier circuit or in addition to the class D amplifier circuit. In addition, each of the basic drive signals dA1, dB1, and dC1 may be an analog signal as long as the waveforms of the corresponding drive signals COMA1, COMB1, and COMC1 can be defined.

In addition, the drive signal output circuit 50-1 includes a reference voltage output circuit 53. The reference voltage output circuit 53 generates a reference voltage signal VBS1 having a constant potential indicating the reference potential of a piezoelectric element 60 described later included in the liquid discharge module 20, and outputs the reference voltage signal VBS1 to the liquid discharge module 20. The reference voltage signal VBS1 may be, for example, a ground potential or a constant potential such as 5.5 V or 6 V. Here, the constant potential includes a case where it can be regarded as a substantially constant potential when various fluctuations such as a fluctuation of the potential caused by the operation of the peripheral circuit, a fluctuation of the potential caused by variations in the circuit element, and a fluctuation of the potential caused by temperature characteristics of the circuit element is taken into consideration.

The drive signal output circuits 50-2 to 50-*m* have the same configuration as the drive signal output circuit 50-1, except that the input signal and the output signal are different. That is, each of the drive signal output circuits 50-*j* (j is any one of 1 to m) includes a circuit corresponding to the drive circuits 52*a*, 52*b*, and 52*c* and a circuit corresponding to the reference voltage output circuit 53, generates drive signals COMAj, COMBj, and COMCj and a reference voltage signal VBSj based on the basic drive signals dAj, dBj, and dCj input from the control circuit 100, and outputs the drive signals and the reference voltage signal to the liquid discharge module 20.

Here, the drive circuits 52*a*, 52*b*, and 52*c* included in the drive signal output circuit 50-1 and the drive circuits 52*a*, 52*b*, and 52*c* included in the drive signal output circuit 50-*j* have the same configuration, and when it is not necessary to distinguish the drive circuits in the following description, the drive circuits may be simply referred to as a drive circuit 52. In this case, the drive circuit 52 will be described as generating and outputting a drive signal COM based on the basic drive signal do to the liquid discharge module 20. In addition, when the drive circuits 52*a*, 52*b*, and 52*c* included in the drive signal output circuit 50-1 and the drive circuits 52*a*, 52*b*, and 52*c* included in the drive signal output circuit 50-*j* are separately described, the drive circuits 52*a*, 52*b*, and 52*c* included in the drive signal output circuit 50-1 may be referred to as drive circuits 52*a*1, 52*b*1, and 52*c*1, and the drive circuits 52*a*, 52*b*, and 52*c* included in the drive signal output circuit 50-*j* may be referred to as drive circuits 52*aj*, 52*bj*, and 52*cj*.

The liquid discharge module 20 includes a restoration circuit 220 and discharge modules 23-1 to 23-*m*.

The restoration circuit 220 restores the data signal DATA to a single-ended signal, separates the data signal DATA into signals corresponding to each of the discharge modules 23-1 to 23-*m*, and outputs the data signals to the corresponding discharge modules 23-1 to 23-*m*.

Specifically, the restoration circuit 220 restores and separates the data signal DATA to generate a clock signal SCK1, a print data signal SI1, and a latch signal LAT1 corresponding to the discharge module 23-1, and outputs these signals to the discharge module 23-1. In addition, the restoration circuit 220 restores and separates the data signal DATA to generate a clock signal SCKj, a print data signal SIj, and a latch signal LATj corresponding to the discharge module 23-*j*, and outputs these signals to the discharge module 23-*j*.

As described above, the restoration circuit 220 restores the data signal DATA of the differential signal output by the head drive module 10 to a single-ended signal, and separates and outputs the restored signal into signals corresponding to the discharge modules 23-1 to 23-*m*. As a result, the restoration circuit 220 generates the clock signals SCK1 to SCKm, the print data signals SI1 to SIm, and the latch signals LAT1 to LATm corresponding to each of the discharge modules 23-1 to 23-*m*, and outputs these signals to the corresponding discharge modules 23-1 to 23-*m*. Any one of the clock signals SCK1 to SCKm, the print data signals SI1 to SIm, and the latch signals LAT1 to LATm corresponding to each of the discharge modules 23-1 to 23-*m* output by the restoration circuit 220 may be a common signal for the discharge modules 23-1 to 23-*m*.

Here, in view of the fact that the restoration circuit 220 generates the clock signals SCK1 to SCKm, the print data signals SI1 to SIm, and the latch signals LAT1 to LATm by restoring and separating the data signal DATA, the data signal DATA output by the control circuit 100 is a differential signal corresponding to the clock signals SCK1 to SCKm, the print data signals SI1 to SIm, and the latch signals LAT1 to LATm. The basic data signal dDATA on which the data signal DATA is based includes signals corresponding to each of the clock signals SCK1 to SCKm, the print data signals SI1 to SIm, and the latch signals LAT1 to LATm. That is, the control circuit 100 outputs the basic data signal dDATA as a signal for controlling the operation of the discharge modules 23-1 to 23-*m* included in the liquid discharge module 20.

The discharge module 23-1 includes a drive signal selection circuit 200 and a plurality of discharge portions 600. In addition, each of the plurality of discharge portions 600 includes a piezoelectric element 60. That is, the discharge module 23-1 includes a plurality of piezoelectric elements 60 having the same number as the plurality of discharge portions 600.

The drive signals COMA1, COMB1, and COMC1, the reference voltage signal VBS1, the clock signal SCK1, the print data signal SI1, and the latch signal LAT1 are input to the discharge module 23-1. The drive signals COMA1, COMB1, and COMC1, the clock signal SCK1, the print data signal SI1, and the latch signal LAT1 are input to the drive signal selection circuit 200 included in the discharge module 23-1. The drive signal selection circuit 200 generates a drive signal VOUT by selecting or not selecting each of the drive signals COMA1, COMB1, and COMC1 based on the input clock signal SCK1, the print data signal SI1, and the latch signal LAT1, and supplies the drive signal VOUT to one end of the piezoelectric element 60 included in the corresponding discharge portion 600. At this time, the reference voltage signal VBS1 is supplied to the other end of the piezoelectric element 60. The piezoelectric element 60 is driven by the potential difference between the drive signal VOUT supplied to one end and the reference voltage signal VBS1 supplied to the other end. As a result, ink is discharged from the corresponding discharge portion 600.

Similarly, the discharge module 23-*j* includes the drive signal selection circuit 200 and the plurality of discharge portions 600. In addition, each of the plurality of discharge portions 600 includes a piezoelectric element 60. That is, the discharge module 23-*j* includes a plurality of discharge portions 600 and a plurality of piezoelectric elements 60 having the same number.

The drive signals COMAj, COMBj, and COMCj, the reference voltage signal VBSj, the clock signal SCKj, the print data signal SIj, and the latch signal LATj are input to the discharge module 23-*j*. The drive signals COMAj, COMBj, and COMCj, the clock signal SCKj, the print data signal SIj, and the latch signal LATj are input to the drive signal selection circuit 200 included in the discharge module 23-*j*. The drive signal selection circuit 200 generates a drive signal VOUT by selecting or not selecting each of the drive signals COMAj, COMBj, and COMCj based on the input clock signal SCKj, the print data signal SIj, and the latch signal LATj, and supplies the drive signal VOUT to one end of the piezoelectric element 60 included in the corresponding discharge portion 600. In addition, the reference voltage signal VBSj is supplied to the other end of the piezoelectric element 60. The piezoelectric element 60 is driven according to the potential difference between the drive signal VOUT supplied to one end and the reference voltage signal VBSj supplied to the other end. As a result, ink is discharged from the corresponding discharge portion 600.

As described above, the liquid discharge device 1 according to the first embodiment controls the transport of the medium P by the transport unit 4, and also controls the discharge of ink from the liquid discharge module 20 included in the discharge unit 5, based on image data supplied from a host computer or the like (not illustrated) by the control unit 2. As a result, the liquid discharge device 1 can land a desired amount of ink at a desired position on the medium P, and forms a desired image on the medium P.

Here, the discharge modules 23-1 to 23-*m* included in the liquid discharge module 20 have the same configuration except that the input signals are different. Therefore, in the following description, when it is not necessary to distinguish the discharge modules 23-1 to 23-*m*, the discharge modules may be simply referred to as a discharge module 23. In addition, in this case, the drive signals COMA1 to COMAm input to the discharge module 23 may be referred to as a drive signal COMA, the drive signals COMB1 to COMBm may be referred to as a drive signal COMB, and the drive signals COMC1 to COMCm may be referred to as a drive signal COMC. The reference voltage signals VBS1 to VBSm may be referred to as a reference voltage signal VBS, the clock signals SCK1 to SCKm may be referred to as a clock signal SCK, the print data signals SI1 to SIm may be referred to as a print data signal SI, and the latch signals LAT1 to LATm may be referred to as a latch signal LAT.

1.2 Functional Configuration of Drive Signal Selection Circuit

Next, the configuration and operation of the drive signal selection circuit 200 included in the discharge module 23 will be described. In describing the configuration and operation of the drive signal selection circuit 200 included in the discharge module 23, first, an example of signal waveforms included in the drive signals COMA, COMB, and COMC input to the drive signal selection circuit 200 will be described.

Figure 3:
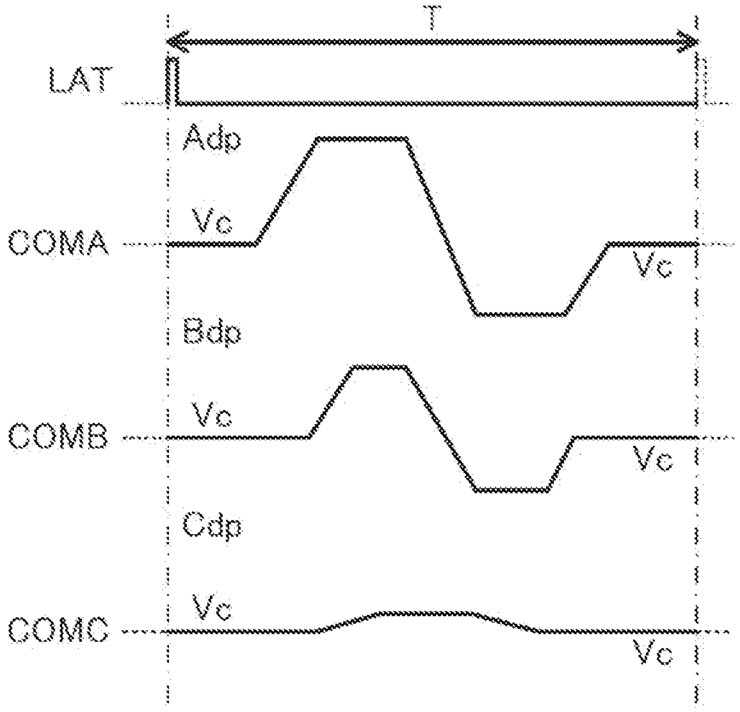
FIG. 3 is a diagram illustrating an example of signal waveforms of drive signals.

FIG. 3 is a diagram illustrating an example of the signal waveforms of the drive signals COMA, COMB, and COMC. As illustrated in FIG. 3, the drive signal COMA includes a trapezoidal waveform Adp arranged in a cycle T from the rise of the latch signal LAT to the rise of the next latch signal LAT. The trapezoidal waveform Adp is a signal waveform that is supplied to one end of the piezoelectric element 60 to discharge a predetermined amount of ink from the discharge portion 600 corresponding to the piezoelectric element 60.

The drive signal COMB includes a trapezoidal waveform Bdp arranged in the cycle T. This trapezoidal waveform Bdp is a signal waveform whose voltage amplitude is smaller than that of the trapezoidal waveform Adp, and is a signal waveform that is supplied to one end of the piezoelectric element 60 to discharge a smaller amount of ink than a predetermined amount from the discharge portion 600 corresponding to the piezoelectric element 60.

That is, the drive amount of the piezoelectric element 60 when the drive signal COMA is supplied to the piezoelectric element 60 is larger than the drive amount of the piezoelectric element 60 when the drive signal COMB is supplied to the piezoelectric element 60. The amount of ink discharged from the discharge portion 600 corresponding to the case where the drive signal COMA is supplied to the piezoelectric element 60 is larger than the amount of ink discharged from the discharge portion 600 corresponding to the case where the drive signal COMB is supplied to the piezoelectric element 60. In other words, the amount of ink discharged from the discharge portion 600 corresponding to the piezoelectric element 60 when the drive signal COMA is supplied to the piezoelectric element 60 is larger than the amount of ink discharged from the discharge portion 600 corresponding to the piezoelectric element 60 when the drive signal COMB is supplied to the piezoelectric element 60. Therefore, the amount of current generated by the propagation of the drive signal COMA is larger than the amount of current generated by the propagation of the drive signal COMB.

In addition, the drive signal COMC includes a trapezoidal waveform Cdp arranged in the cycle T. This trapezoidal waveform Cdp is a signal waveform whose voltage amplitude is smaller than that of the trapezoidal waveforms Adp and Bdp, and is a signal waveform that is supplied to one end of the piezoelectric element 60 to vibrate the ink in the vicinity of a nozzle opening portion to the extent that the ink is not discharged from the discharge portion 600 corresponding to the piezoelectric element 60. The trapezoidal waveform Cdp is supplied to the piezoelectric element 60 to vibrate the ink in the vicinity of the nozzle opening portion of the discharge portion 600 including the piezoelectric element 60. As a result, the possibility that the viscosity of the ink in the vicinity of the nozzle opening portion increases is reduced.

That is, the drive signals COMA and COMB drive the corresponding piezoelectric element 60 so that the ink is discharged from the discharge portion 600, and the drive signal COMC drives the corresponding piezoelectric element 60 so that the ink is not discharged from the discharge portion 600. Therefore, the drive amount of the piezoelectric element 60 when the drive signals COMA and COMB are supplied to the piezoelectric element 60 is larger than the drive amount of the piezoelectric element 60 when the drive signal COMC is supplied to the piezoelectric element 60. Therefore, the amount of current generated by the propagation of the drive signals COMA and COMB is larger than the amount of current generated by the propagation of the drive signals COMC.

In addition, at the start timing and end timing of each of the trapezoidal waveforms Adp, Bdp, and Cdp, the voltage values of the trapezoidal waveforms Adp, Bdp, and Cdp are all common to the voltage Vc. In other words, each of the trapezoidal waveforms Adp, Bdp, and Cdp are signal waveforms that start at the voltage Vc and end at the voltage Vc.

Here, in the following description, when the trapezoidal waveform Adp is supplied to one end of the piezoelectric element 60, the amount of ink discharged from the discharge portion 600 corresponding to the piezoelectric element 60 may be referred to as a large amount. When the trapezoidal waveform Bdp is supplied to one end of the piezoelectric element 60, the amount of ink discharged from the discharge portion 600 corresponding to the piezoelectric element 60 may be referred to as a small amount different from a large amount. In addition, when the trapezoidal waveform Cdp is supplied to one end of the piezoelectric element 60, vibrating the ink in the vicinity of the nozzle opening portion to the extent that the ink is not discharged from the discharge portion 600 corresponding to the piezoelectric element 60 may be referred to as micro-vibration.

As described above, in the liquid discharge device 1 of the first embodiment, the drive circuit 52*a* outputs a drive signal COMA that drives the piezoelectric element 60 so that the discharge portion 600 included in the discharge module 23 discharges a predetermined amount of ink and a large amount of ink. The drive circuit 52*b* outputs a drive signal COMB that drives the piezoelectric element 60 so that the discharge portion 600 included in the discharge module 23 discharges an amount smaller than a predetermined amount and a small amount of ink. The drive circuit 52*c* outputs a drive signal COMC that drives the piezoelectric element 60 so that the discharge portion 600 included in the discharge module 23 does not discharge ink.

The signal waveforms included in the drive signals COMA, COMB, and COMC are not limited to the signal waveforms exemplified in FIG. 3, and various signal waveforms may be used depending on the type of ink discharged from the discharge portion 600, the number of piezoelectric elements 60 driven by drive signals COMA, COMB, and COMC, the wiring length propagated by the drive signals COMA, COMB, and COMC, and the like. That is, each of the drive signals COMA1 to COMAm may include different signal waveforms, and the amount of ink discharged from the discharge portion 600 including the piezoelectric element 60 to which the drive signal COMA1 is supplied may be different from the amount of ink discharged from the discharge portion 600 including the piezoelectric element 60 to which the drive signal COMAj is supplied. Similarly, each of the drive signals COMB1 to COMBm may include different signal waveforms, and the amount of ink discharged from the discharge portion 600 including the piezoelectric element 60 to which the drive signal COMB1 is supplied may be different from the amount of ink discharged from the discharge portion 600 including the piezoelectric element 60 to which the drive signal COMBj is supplied. Similarly, each of the drive signals COMC1 to COMCm may include different signal waveforms, and the amount of displacement generated in the piezoelectric element 60 when the drive signal COMC1 is supplied may be different from the amount of displacement generated in the piezoelectric element 60 when the drive signal COMCj is supplied.

Figure 4:
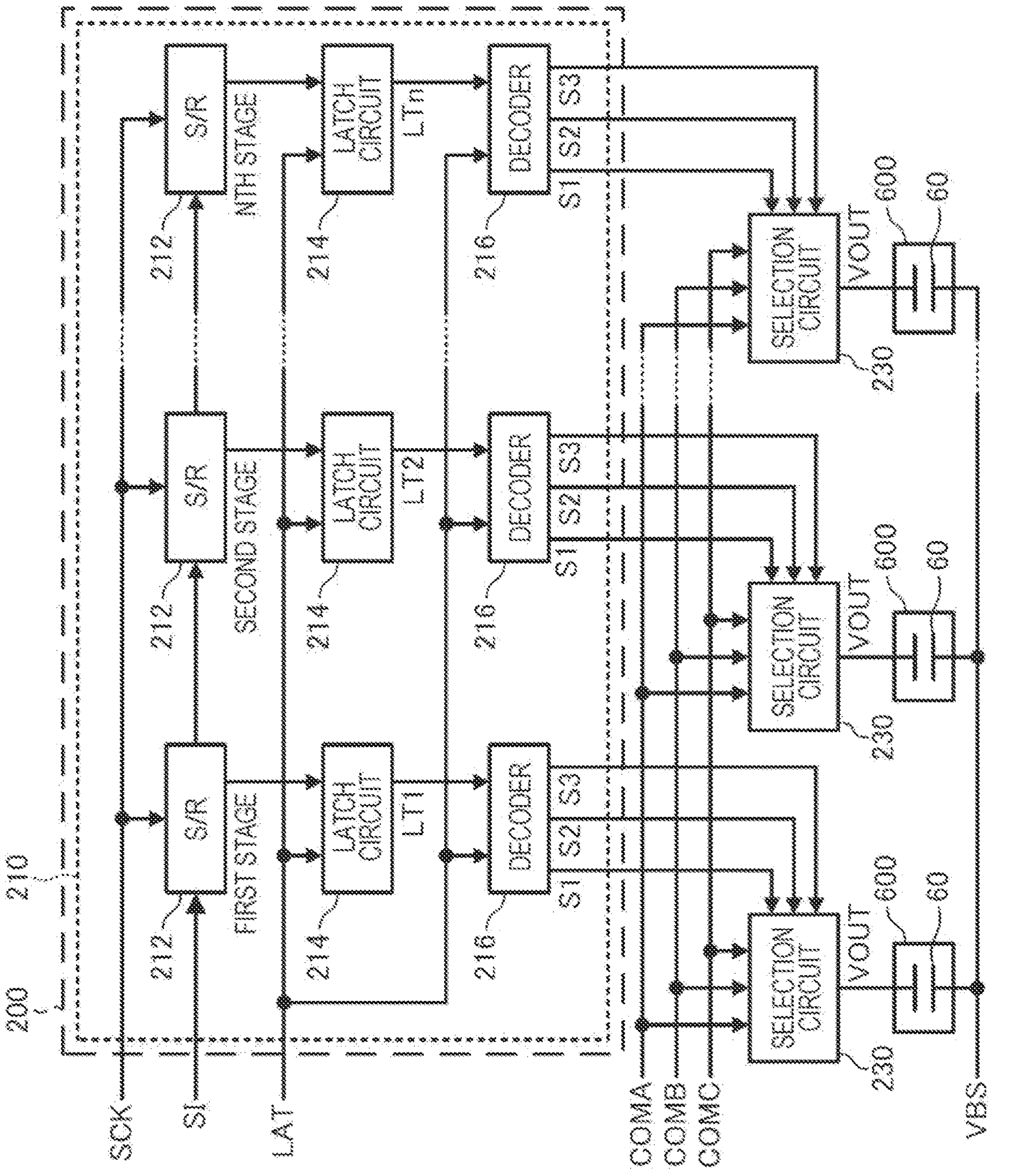
FIG. 4 is a diagram illustrating a functional configuration of a drive signal selection circuit.

Next, the configuration and operation of the drive signal selection circuit 200 that outputs the drive signal VOUT by selecting or not selecting each of the drive signals COMA, COMB, and COMC will be described. FIG. 4 is a diagram illustrating a functional configuration of the drive signal selection circuit 200. As illustrated in FIG. 4, the drive signal selection circuit 200 includes a selection control circuit 210 and a plurality of selection circuits 230.

The print data signal SI, the latch signal LAT, and the clock signal SCK are input to the selection control circuit 210. In addition, the selection control circuit 210 includes n set of a shift register (S/R) 212, a latch circuit 214, and a decoder 216 corresponding to each of the n discharge portions 600. That is, the drive signal selection circuit 200 includes n shift registers 212, n latch circuits 214, and n decoders 216, which are the same as the total number of discharge portions 600.

The print data signal SI is a signal synchronized with the clock signal SCK, and includes 2-bit print data [SIH, SIL] for defining the dot size formed by the ink discharged from each of the n discharge portions 600 by any of "large dot LD", "small dot SD", "non-discharge ND", and "micro-vibration BSD". This print data signal SI is held in the shift register 212 corresponding to the discharge portion 600 for each 2-bit print data [SIH, SIL].

Specifically, the n shift registers 212 corresponding to the discharge portion 600 are coupled in cascade to each other. The serially input print data signal SI is sequentially transferred to a subsequent stage of the shift register 212 coupled in cascade according to the clock signal SCK. When the supply of the clock signal SCK is stopped, the 2-bit print data [SIH, SIL] corresponding to the discharge portion 600 corresponding to the shift register 212 is held in the n shift registers 212. In FIG. 4, in order to distinguish the n shift registers 212 coupled in cascade, the shift registers are expressed as first stage, second stage, . . . , Nth stage from the upstream to the downstream where the print data signal SI is input.

Each of the n latch circuits 214 latches simultaneously the 2-bit print data [SIH, SIL] held by the corresponding shift register 212 at the rise of the latch signal LAT.

Figures 5, 6:
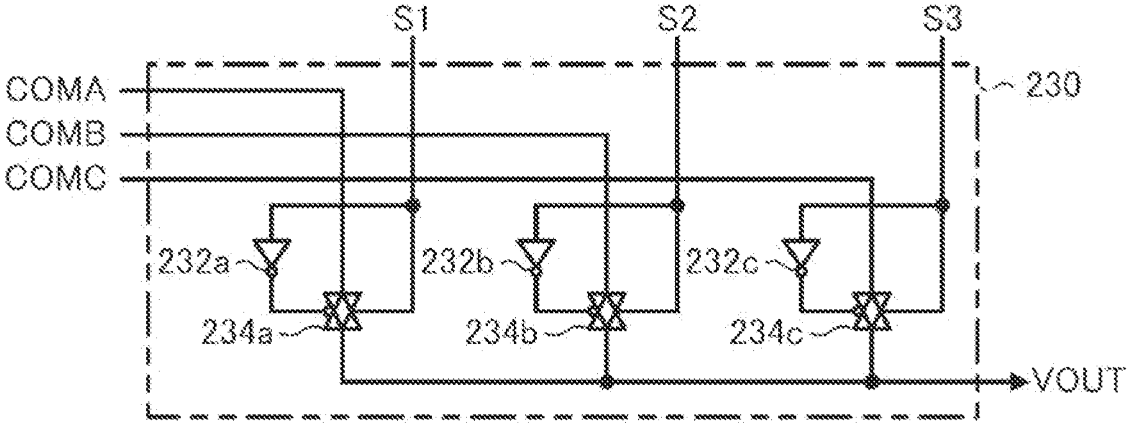
FIG. 5 is a table illustrating an example of a decoding content in a decoder.
FIG. 6 is a diagram illustrating an example of a configuration of a selection circuit corresponding to one discharge portion.

Each of the n decoders 216 decodes the 2-bit print data [SIH, SIL] latched by the corresponding latch circuit 214, and outputs the logic level selection signals S1, S2, and S3 according to a decoding content for each cycle T. FIG. 5 is a table illustrating an example of the decoding content in the decoder 216. The decoder 216 outputs the logic level selection signals S1, S2, and S3 defined by the latched 2-bit print data [SIH, SIL] and the decoding content illustrated in FIG. 5. For example, when the 2-bit print data [SIH, SIL] of [1, 0] latched by the corresponding latch circuit 214 is input to the decoder 216 according to the first embodiment, the decoder 216 sets each of the logic levels of the selection signals S1, S2, and S3 to the L, H, and L levels in the cycle T.

The selection circuit 230 is provided corresponding to each of the n discharge portions 600. That is, the drive signal selection circuit 200 includes n selection circuits 230. The selection signals S1, S2, and S3 output by the decoder 216 corresponding to the same discharge portion 600 and the drive signals COMA, COMB, and COMC are input to the selection circuit 230. The selection circuit 230 generates a drive signal VOUT by selecting or not selecting each of the drive signals COMA, COMB, and COMC based on the selection signals S1, S2, and S3 and the drive signals COMA, COMB, and COMC, and outputs the drive signal VOUT to the corresponding discharge portion 600.

FIG. 6 is a diagram illustrating an example of a configuration of the selection circuit 230 corresponding to one discharge portion 600. As illustrated in FIG. 6, the selection circuit 230 includes inverters 232*a*, 232*b*, and 232*c* and transfer gates 234*a*, 234*b*, and 234*c*.

The selection signal S1 is input to a positive control end not marked with a circle at the transfer gate 234*a*, while being logically inverted by the inverter 232*a* and input to a negative control end marked with a circle at the transfer gate 234*a*. In addition, the drive signal COMA is supplied to an input terminal of the transfer gate 234*a*. The transfer gate 234*a* is conductive between the input terminal and the output terminal when the input selection signal S1 is H level, and is non-conductive between the input terminal and the output terminal when the input selection signal S1 is L level. That is, the transfer gate 234*a* outputs the drive signal COMA to the output terminal when the selection signal S1 is H level, and does not output the drive signal COMA to the output terminal when the selection signal S1 is L level.

The selection signal S2 is input to a positive control end not marked with a circle in the transfer gate 234*b*, while being logically inverted by the inverter 232*b* and input to a negative control end marked with a circle in the transfer gate 234*b*. In addition, the drive signal COMB is supplied to the input terminal of the transfer gate 234*b*. The transfer gate 234*b* is conductive between the input terminal and the output terminal when the input selection signal S2 is H level, and is non-conductive between the input terminal and the output terminal when the input selection signal S2 is L level. That is, the transfer gate 234*b* outputs the drive signal COMB to the output terminal when the selection signal S2 is H level, and does not output the drive signal COMB to the output terminal when the selection signal S2 is L level.

The selection signal S3 is input to a positive control end not marked with a circle in the transfer gate 234*c*, while being logically inverted by the inverter 232*c* and input to a negative control end marked with a circle in the transfer gate 234*c*. In addition, the drive signal COMC is supplied to the input terminal of the transfer gate 234*c*. The transfer gate 234*c* is conductive between the input terminal and the output terminal when the input selection signal S3 is H level, and is non-conductive between the input terminal and the output terminal when the input selection signal S3 is L level. That is, the transfer gate 234*c* outputs the drive signal COMC to the output terminal when the selection signal S3 is H level, and does not output the drive signal COMC to the output terminal when the selection signal S3 is L level.

The output terminals of the transfer gates 234*a*, 234*b*, and 234*c* are commonly coupled. That is, the drive signals COMA, COMB, and COMC selected or not selected by the selection signals S1, S2, and S3 are supplied to the output terminals of the transfer gates 234*a*, 234*b*, and 234*c* commonly coupled. The selection circuit 230 outputs the signal supplied to the output terminals commonly coupled to the corresponding discharge portion 600 as the drive signal VOUT.

Figure 7:
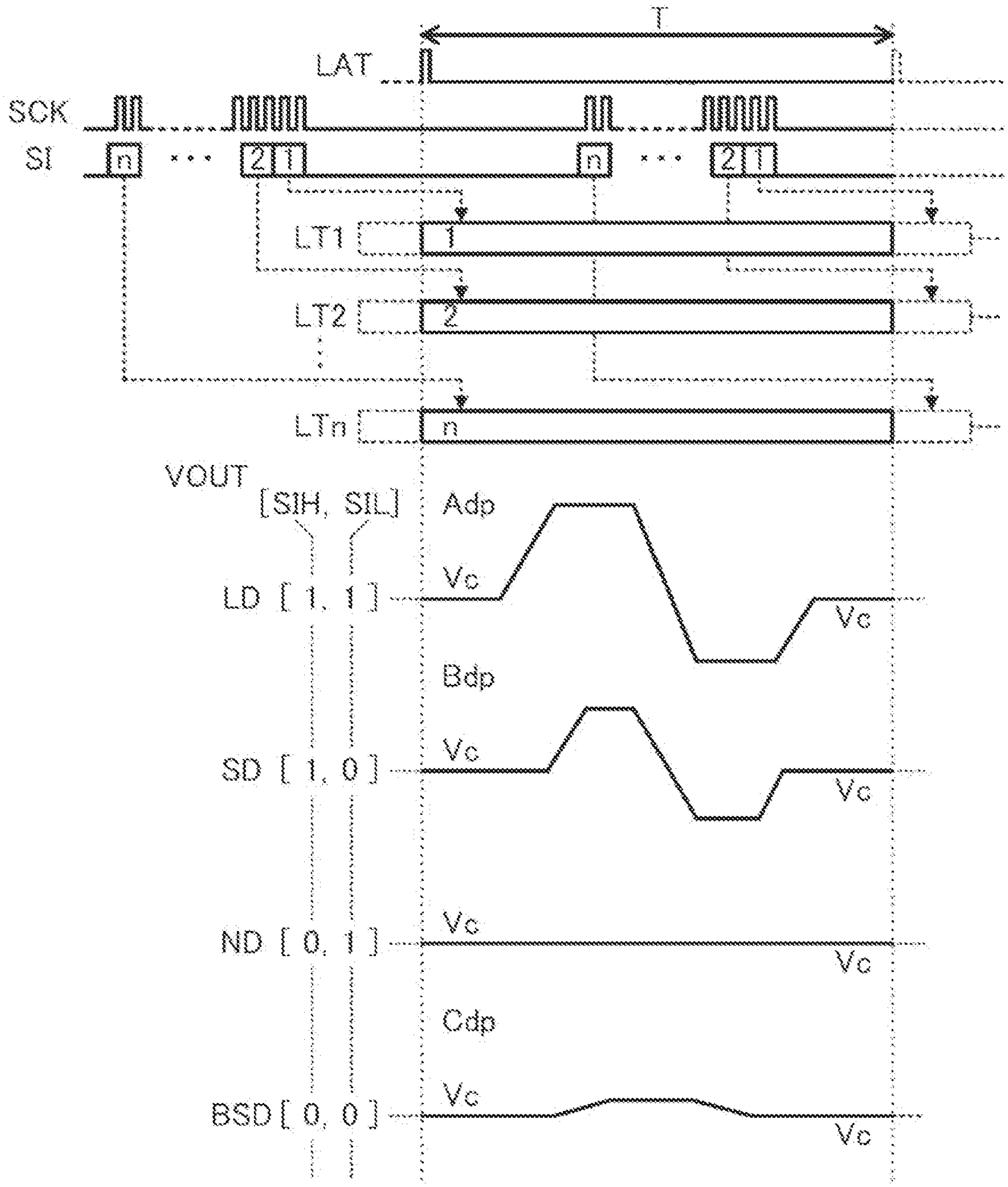
FIG. 7 is a diagram for describing an operation of the drive signal selection circuit.

An operation of the drive signal selection circuit 200 will be described. FIG. 7 is a diagram for describing the operation of the drive signal selection circuit 200. The print data signal SI is serially input in synchronization with the clock signal SCK, and is sequentially transferred by the shift register 212 corresponding to the discharge portion 600. When the input of the clock signal SCK is stopped, the 2-bit print data [SIH, SIL] corresponding to each of the discharge portions 600 is held in the corresponding shift register 212.

Thereafter, when the latch signal LAT rises, the 2-bit print data [SIH, SIL] held in the shift register 212 are simultaneously latched by the latch circuit 214. In FIG. 7, the 2-bit print data [SIH, SIL] corresponding to first stage, second stage, . . . , Nth stage shift registers 212 latched by the latch circuit 214 are illustrated as LT1, LT2, . . . , LTn.

The decoder 216 outputs the logic level selection signals S1, S2, and S3 according to the dot size defined by the latched 2-bit print data [SIH, SIL].

Specifically, when the print data [SIH, SIL] is [1, 1], the decoder 216 outputs the logic levels of the selection signals S1, S2, and S3 to the selection circuit 230 as the H, L, and L levels in the cycle T. As a result, the selection circuit 230 selects the trapezoidal waveform Adp in the cycle T and outputs the drive signal VOUT corresponding to the "large dot LD". In addition, when the print data [SIH, SIL] is [1, 0], the decoder 216 outputs the logic levels of the selection signals S1, S2, and S3 to the selection circuit 230 as the L, H, and L levels in the cycle T. As a result, the selection circuit 230 selects the trapezoidal waveform Bdp in the cycle T and outputs the drive signal VOUT corresponding to the "small dot SD". In addition, when the print data [SIH, SIL] is [0, 1], the decoder 216 outputs the logic levels of the selection signals S1, S2, and S3 to the selection circuit 230 as the L, L, and L levels in the cycle T. As a result, the selection circuit 230 does not select any of the trapezoidal waveforms Adp, Bdp, and Cdp in the cycle T, and outputs the drive signal VOUT corresponding to a constant "non-discharge ND" at the voltage Vc. In addition, when the print data [SIH, SIL] is [0, 0], the decoder 216 outputs the logic levels of the selection signals S1, S2, and S3 to the selection circuit 230 as the L, L, and H levels in the cycle T. As a result, the selection circuit 230 selects the trapezoidal waveform Cdp in the cycle T and outputs the drive signal VOUT corresponding to the "micro-vibration BSD".

Here, when the selection circuit 230 does not select any of the trapezoidal waveforms Adp, Bdp, and Cdp, the voltage Vc supplied immediately before the piezoelectric element 60 is held by the capacitance component of the piezoelectric element 60 at one end of the corresponding piezoelectric element 60. That is, the fact that the selection circuit 230 outputs a constant drive signal VOUT at the voltage Vc includes the case where the voltage Vc immediately before being held by the capacitance component of the piezoelectric element 60 is supplied to the piezoelectric element 60 as the drive signal VOUT, when none of the trapezoidal waveforms Adp, Bdp, and Cdp is selected as the drive signal VOUT.

As described above, the drive signal selection circuit 200 generates a drive signal VOUT corresponding to each of the plurality of discharge portions 600 by selecting or not selecting the drive signals COMA, COMB, and COMC based on the print data signal SI, the latch signal LAT, and the clock signal SCK, and outputs the drive signal VOUT to the corresponding discharge portion 600. As a result, the amount of ink discharged from each of the plurality of discharge portions 600 is individually controlled.

1.3 Configuration of Drive Signal Output Circuit

Figure 8:
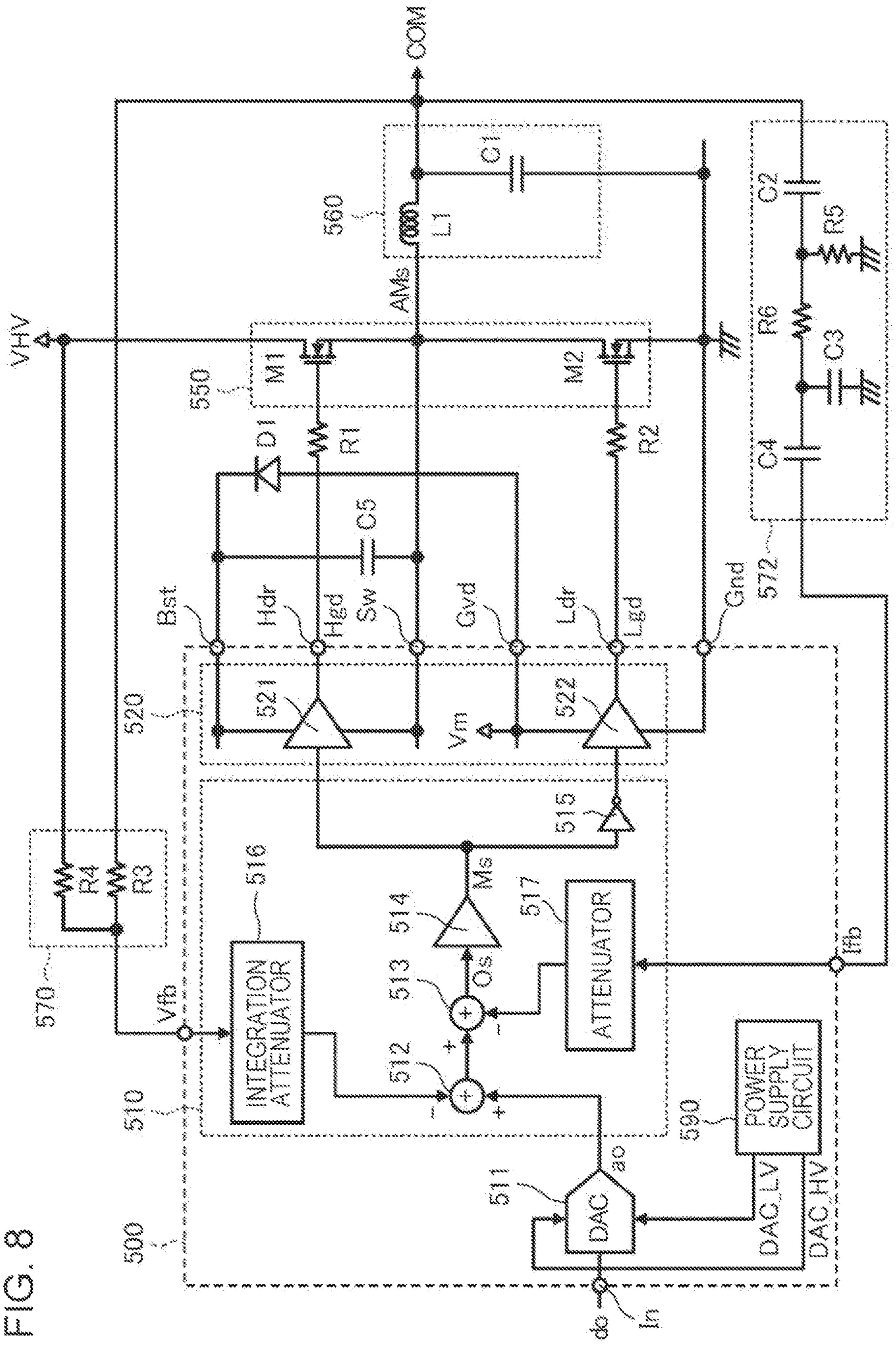
FIG. 8 is a diagram illustrating a configuration of a drive circuit.

Next, the configuration and operation of the drive circuit 52 that outputs the drive signal COM will be described. FIG. 8 is a diagram illustrating the configuration of the drive circuit 52. The drive circuit 52 includes an integrated circuit 500, an amplifier circuit 550, a demodulation circuit 560, feedback circuits 570 and 572, and other electronic components.

The integrated circuit 500 includes a plurality of terminals including a terminal In, a terminal Bst, a terminal Hdr, a terminal Sw, a terminal Gvd, a terminal Ldr, and a terminal Gnd. The integrated circuit 500 is electrically coupled to an externally provided substrate (not illustrated) via the plurality of terminals. The integrated circuit 500 includes a digital to analog converter (DAC) 511, a modulation circuit 510, a gate drive circuit 520, and a power supply circuit 590.

The power supply circuit 590 generates a voltage signal DAC_HV and a voltage signal DAC_LV and supplies the voltage signals to the DAC 511. The DAC 511 converts the digital basic drive signal do that defines the signal waveform of the input drive signal COM into a basic drive signal ao that is an analog signal of the voltage value between the voltage signal DAC_HV and the voltage signal DAC_LV, and outputs the basic drive signal ao to the modulation circuit 510. Here, the maximum value of the voltage amplitude of the basic drive signal ao is defined by the voltage signal DAC_HV, and the minimum value is defined by the voltage signal DAC_LV. That is, the voltage signal DAC_HV is the reference voltage on the high voltage side in the DAC 511, and the voltage signal DAC_LV is the reference voltage on the low voltage side in the DAC 511. The signal obtained by amplifying the analog basic drive signal ao output by the DAC 511 is the drive signal COM. That is, the basic drive signal ao corresponds to a target signal before amplification of the drive signal COM.

The modulation circuit 510 generates a modulation signal Ms obtained by modulating the basic drive signal ao and outputs the modulation signal Ms to the gate drive circuit 520. The modulation circuit 510 includes adders 512 and 513, a comparator 514, an inverter 515, an integration attenuator 516, and an attenuator 517.

The integration attenuator 516 attenuates and integrates the drive signal COM input via a terminal Vfb and supplies the drive signal COM to the input terminal on the − side of the adder 512. In addition, the basic drive signal ao is input to the input terminal on the + side of the adder 512. The adder 512 supplies the voltage obtained by subtracting and integrating the voltage input to the input terminal on the − side from the voltage input to the input terminal on the + side to the input terminal on the + side of the adder 513.

The attenuator 517 supplies a voltage obtained by attenuating the high frequency component of the drive signal COM input via a terminal Ifb to the input terminal on the − side of the adder 513. In addition, the voltage output from the adder 512 is input to the input terminal on the + side of the adder 513. The adder 513 outputs a voltage signal Os obtained by subtracting the voltage input to the input terminal on the − side from the voltage input to the input terminal on the + side to the comparator 514.

The comparator 514 outputs a modulation signal Ms obtained by pulse-modulating the voltage signal Os output from the adder 513. Specifically, the comparator 514 outputs the modulation signal Ms that is an H level when the voltage value of the voltage signal Os output from the adder 513 is rising and is a predetermined threshold value Vth1 or more, and that is L level when the voltage value of the voltage signal Os is falling and falls below a predetermined threshold value Vth2. The threshold values Vth1 and Vth2 are set in the relationship of threshold value Vth1=>threshold value Vth2.

The modulation signal Ms output from the comparator 514 is supplied to the gate driver 521 included in the gate drive circuit 520, and is supplied to the gate driver 522 included in the gate drive circuit 520 after the logic level is inverted by the inverter 515. That is, a signal having a logic level of exclusive relationship is input to the gate driver 521 and the gate driver 522. Here, strictly speaking, the logic level of exclusive relationship means that the logic levels of the signals supplied to the gate driver 521 and the gate driver 522 do not become H level at the same time, and in detail, means that a transistor M1 and a transistor M2 included in the amplifier circuit 550 described later are not turned on at the same time. Therefore, the modulation circuit 510 may include a timing control circuit for controlling the timing of the modulation signal Ms supplied to the gate driver 521 and the signal in which the logic level of the modulation signal Ms supplied to the gate driver 522 is inverted.

The gate drive circuit 520 includes the gate driver 521 and the gate driver 522. The gate driver 521 level-shifts the modulation signal Ms output from the comparator 514 and outputs the modulation signal Ms as an amplification control signal Hgd from the terminal Hdr.

Specifically, the voltage is supplied to the higher side of the power supply voltage of the gate driver 521 via the terminal Bst, and the voltage is supplied to the lower side via the terminal Sw. The terminal Bst is coupled to one end of a capacitor C5 and the cathode of the diode Dl for preventing backflow. The terminal Sw is coupled to the other end of the capacitor C5. In addition, the anode of the diode Dl is coupled to a terminal Gvd to which a voltage Vm, which is a DC voltage of, for example, 7.5 V, is supplied from a power supply circuit (not illustrated). That is, the voltage Vm, which is a DC voltage, is supplied to the anode of the diode Dl. Therefore, the potential difference between the terminal Bst and the terminal Sw is approximately equal to the voltage Vm. As a result, the gate driver 521 outputs an amplification control signal Hgd having a large voltage value by the voltage Vm with respect to the terminal Sw from the terminal Hdr according to the input modulation signal Ms.

The gate driver 522 operates on the lower potential side than the gate driver 521. The gate driver 522 level-shifts the signal in which the logic level of the modulation signal Ms output from the comparator 514 is inverted by the inverter 515, and outputs the signal as an amplification control signal Lgd from the terminal Ldr.

Specifically, the voltage Vm is supplied to the higher side of the power supply voltage of the gate driver 522, and the ground potential of, for example, 0 V is supplied to the lower side via the terminal Gnd. The gate driver 522 outputs an amplification control signal Lgd having a large voltage value by the voltage Vm with respect to the terminal Gnd from the terminal Ldr according to the signal in which the logic level of the input modulation signal Ms is inverted.

The amplifier circuit 550 includes the transistor M1 and the transistor M2.

The transistor M1 is a surface mount-type field effect transistor (FET), and a voltage VHV, which is a DC voltage of, for example, 42V, is supplied to a drain of the transistor M1 as an amplification voltage. In addition, the gate of the transistor M1 is electrically coupled to one end of a resistor R1 and the other end of the resistor R1 is electrically coupled to the terminal Hdr of the integrated circuit 500. That is, the amplification control signal Hgd is supplied to the gate of the transistor M1. The source of the transistor M1 is electrically coupled to the terminal Sw of the integrated circuit 500.

The transistor M2 is the surface mount-type FET, and a drain of the transistor M2 is electrically coupled to the terminal Sw of the integrated circuit 500. That is, the drain of the transistor M2 and the source of the transistor M1 are electrically coupled to each other. The gate of the transistor M2 is electrically coupled to one end of a resistor R2, and the other end of the resistor R2 is electrically coupled to the terminal Ldr of the integrated circuit 500. That is, the amplification control signal Lgd is supplied to the gate of the transistor M2. A ground potential is supplied to the source of the transistor M2.

That is, the drive circuit 52 includes surface mount-type transistors M1 and M2. In the amplifier circuit 550 configured as described above, when the transistor M1 is controlled to be off and the transistor M2 is controlled to be on, the potential of the node to which the terminal Sw is coupled is the ground potential. Therefore, the voltage Vm is supplied to the terminal Bst. On the other hand, when the transistor M1 is controlled to be on and the transistor M2 is controlled to be off, the potential of the node to which the terminal Sw is coupled is the voltage VHV. Therefore, a voltage signal having a potential of voltage VHV+Vm is supplied to the terminal Bst. That is, using the capacitor C5 as a floating power source, the potential of the terminal Sw changes to 0 V or the voltage VHV according to the operation of the transistor M1 and the transistor M2, so that the gate driver 521 that drives the transistor M1 supplies the amplification control signal Hgd of the potential where the L level is the potential of the voltage VHV and the H level is the voltage VHV+the voltage Vm to the gate of the transistor M1.

On the other hand, the gate driver 522 that drives the transistor M2 supplies the amplification control signal Lgd of the potential where the L level is the ground potential and the H level is the voltage Vm to the gate of the transistor M2 regardless of the operation of the transistor M1 and the transistor M2.

The amplifier circuit 550 configured as described above generates an amplification modulation signal AMs obtained by amplifying the modulation signal Ms based on the voltage VHV at a coupling point between the source of the transistor M1 and the drain of the transistor M2. The amplifier circuit 550 outputs the generated amplification modulation signal AMs to the demodulation circuit 560.

The demodulation circuit 560 generates a drive signal COM by demodulating the amplification modulation signal AMs output by the amplifier circuit 550, and outputs the drive signal COM from the drive circuit 52. The demodulation circuit 560 includes an inductor L1 and a capacitor C1. One end of the inductor L1 is coupled to one end of the capacitor C1. The amplification modulation signal AMs is input to the other end of the inductor L1. In addition, a ground potential is supplied to the other end of the capacitor C1. That is, in the demodulation circuit 560, the inductor L1 and the capacitor C1 form a low pass filter. The demodulation circuit 560 demodulates by smoothing the amplification modulation signal AMs output from the amplifier circuit 550 by the low pass filter, and outputs the demodulated signal as the drive signal COM. That is, the drive signal COM is output from one end of the inductor L1 included in the demodulation circuit 560.

The feedback circuit 570 includes a resistor R3 and a resistor R4. The drive signal COM is supplied to one end of the resistor R3, and the other end is coupled to the terminal Vfb and one end of the resistor R4. The voltage VHV is supplied to the other end of the resistor R4. As a result, the drive signal COM passed through the feedback circuit 570 is fed back to the terminal Vfb in a state of being pulled up by the voltage VHV.

The feedback circuit 572 includes capacitors C2, C3, and C4 and resistors R5 and R6. The drive signal COM is supplied to one end of the capacitor C2, and the other end is coupled to one end of the resistor R5 and one end of the resistor R6. The ground potential is supplied to the other end of the resistor R5. As a result, the capacitor C2 and the resistor R5 function as a high pass filter. The cutoff frequency of this high pass filter is set to, for example, approximately 9 MHz. In addition, the other end of the resistor R6 is coupled to one end of the capacitor C4 and one end of the capacitor C3. The ground potential is supplied to the other end of the capacitor C3. As a result, the resistor R6 and the capacitor C3 function as a low pass filter. The cutoff frequency of this low pass filter is set to, for example, approximately 160 MHz. That is, the feedback circuit 572 includes a high pass filter and a low pass filter, and functions as a band pass filter that passes a signal in a predetermined frequency range included in the drive signal COM.

The other end of the capacitor C4 is coupled to the terminal Ifb of the integrated circuit 500. As a result, among the high frequency components of the drive signal COM passed through the feedback circuit 572 that functions as a band pass filter, the signal in which the DC component is cut is fed back to the terminal Ifb.

The drive signal COM is a signal obtained by smoothing the amplification modulation signal AMs based on the basic drive signal do by the demodulation circuit 560. In addition, the drive signal COM is integrated and subtracted via the terminal Vfb, and then fed back to the adder 512. As a result, the drive circuit 52 self-oscillates at a frequency determined by the feedback delay and the feedback transfer function. However, the feedback path via the terminal Vfb has a large delay amount. Therefore, it may not be possible to raise the frequency of self-oscillation to such an extent that the accuracy of the drive signal COM can be sufficiently ensured only by feedback via the terminal Vfb. Therefore, as illustrated in FIG. 8, by providing a path for feeding back the high frequency component of the drive signal COM via the terminal Ifb separately from the path via the terminal Vfb, the delay in the entire circuit is reduced. As a result, the frequency of the voltage signal Os can be increased to such an extent that the accuracy of the drive signal COM can be sufficiently ensured as compared with the case where the path via the terminal Ifb does not exist.

As described above, the drive circuit 52 generates a drive signal COM by performing digital/analog conversion of the input basic drive signal do and then amplifying the analog signal in class D, and outputs the generated drive signal COM.

1.4 Configuration of Liquid Discharge Module

Figure 9:
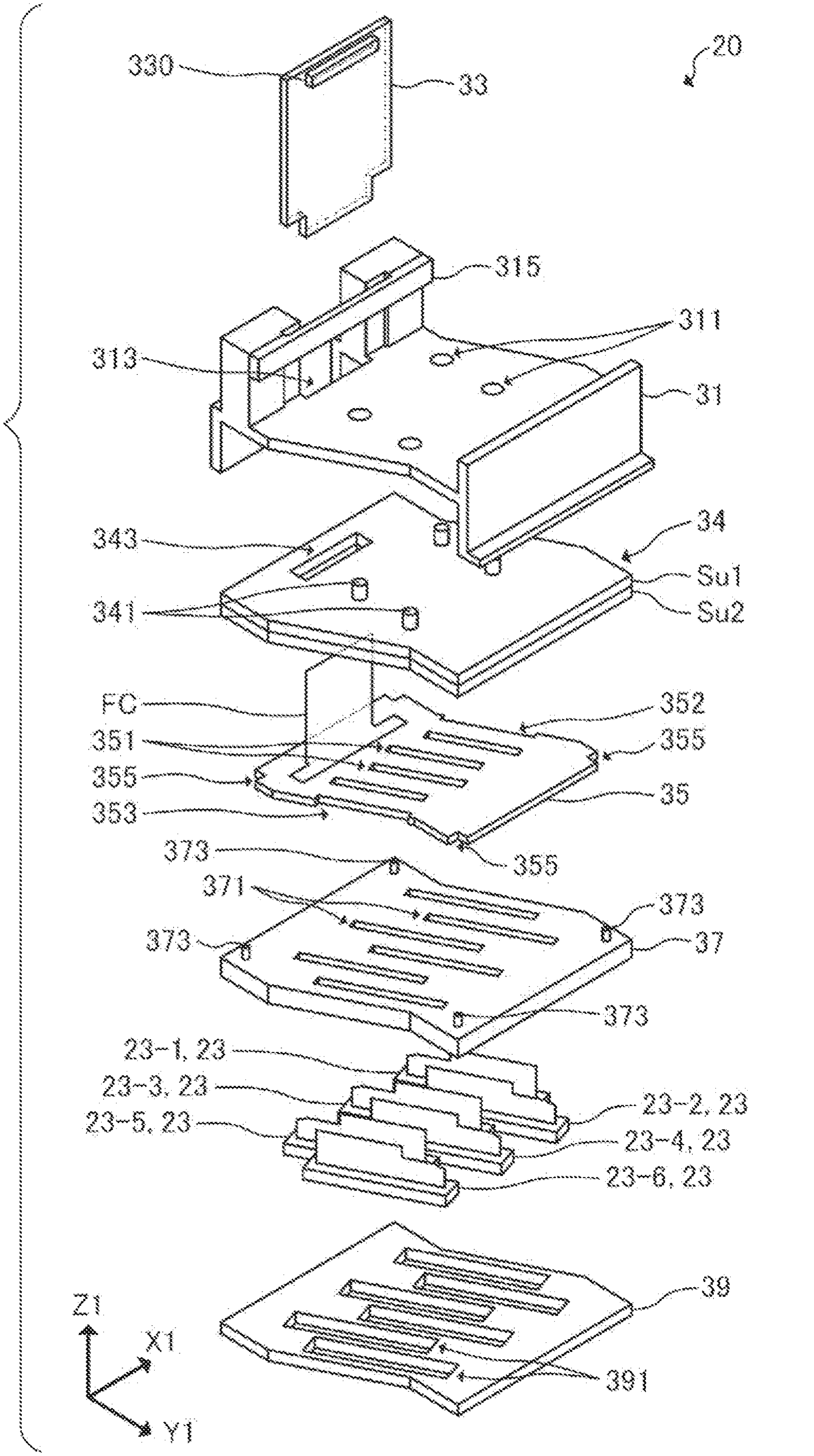
FIG. 9 is a diagram illustrating a structure of a liquid discharge module.
Figure 10:
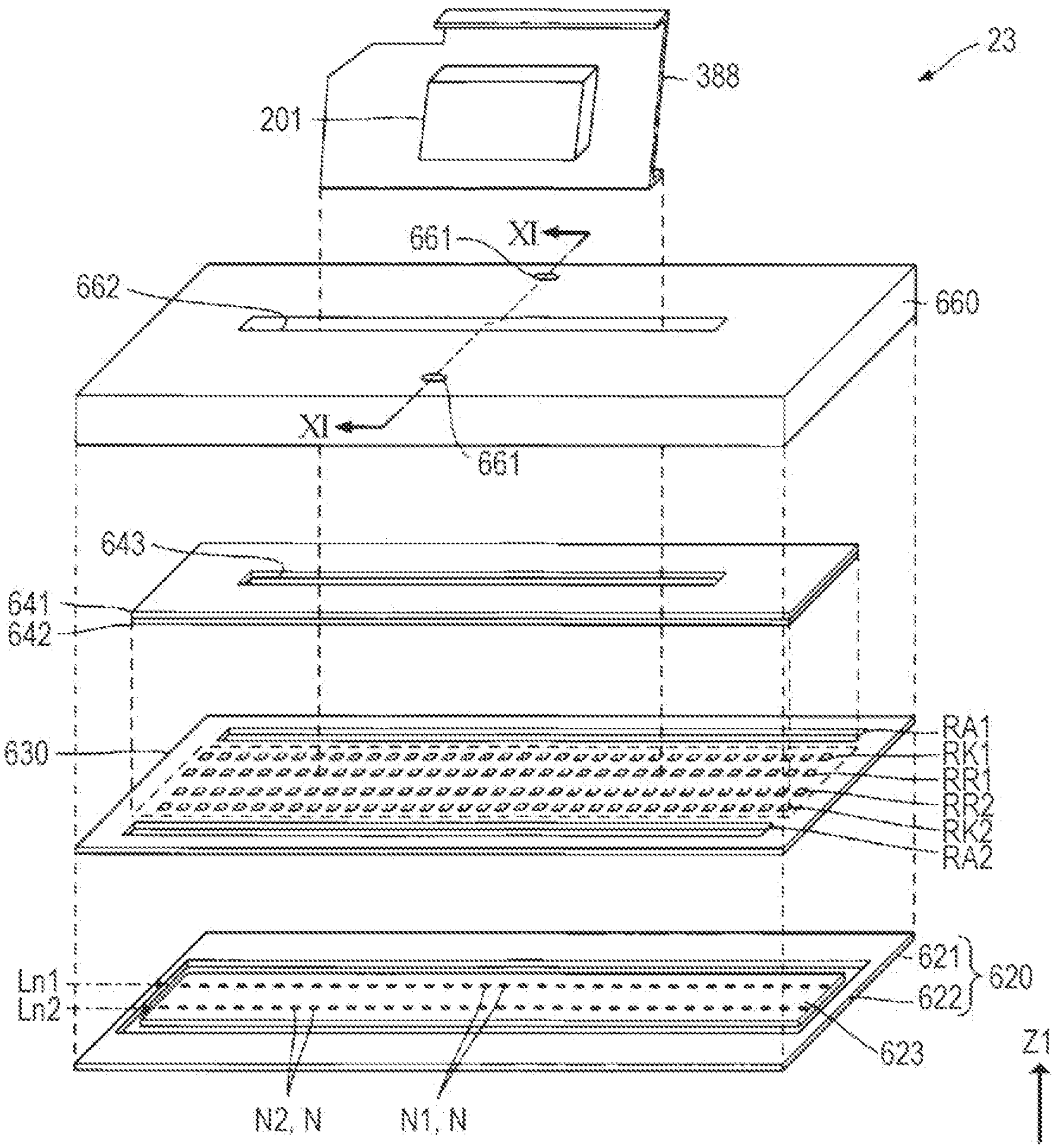
FIG. 10 is a diagram illustrating an example of a structure of a discharge module.
Figure 11:
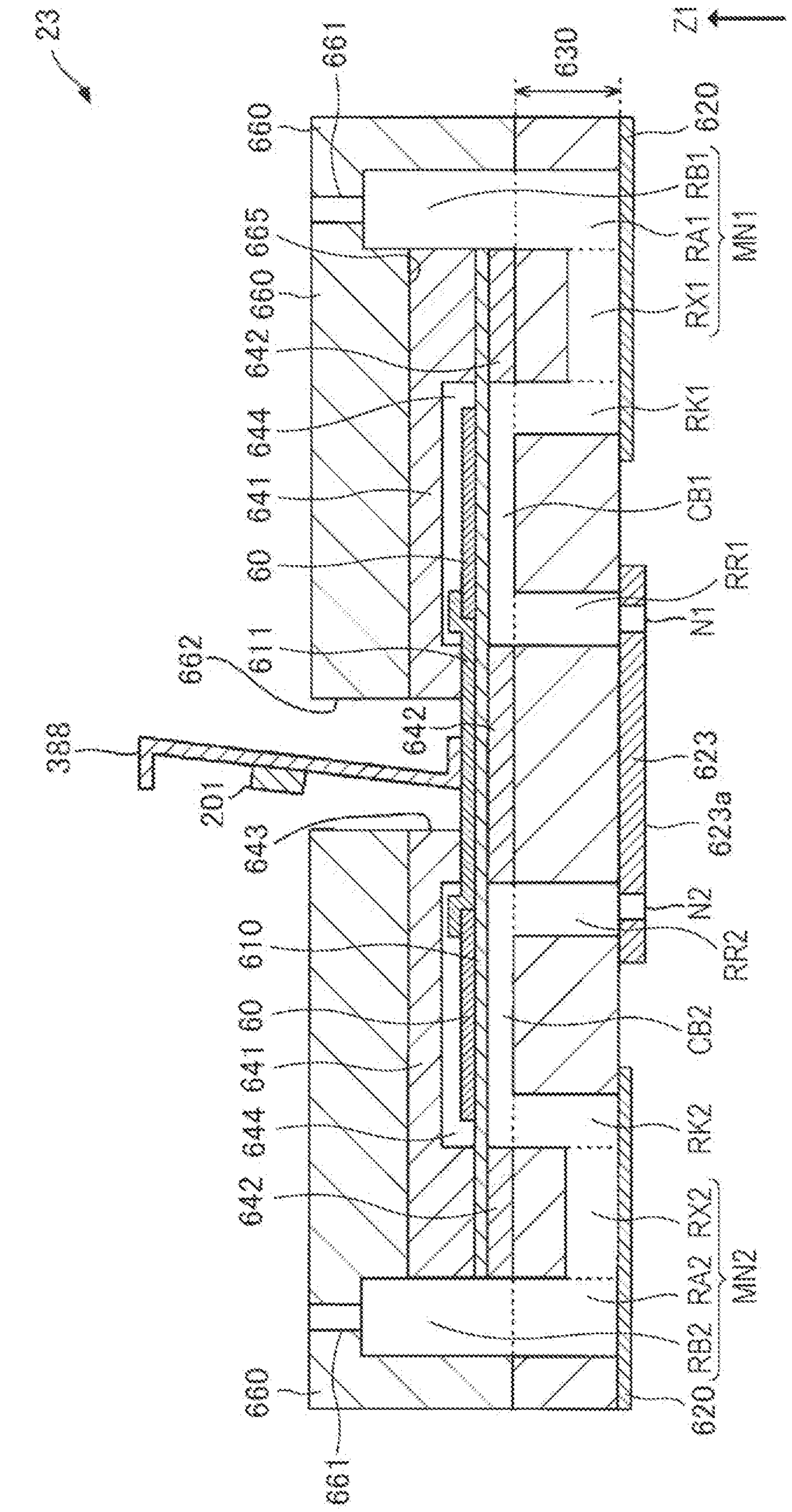
FIG. 11 is a diagram illustrating an example of a cross section of the discharge module.

Next, the structure of the liquid discharge module 20 will be described with reference to FIGS. 9 to 11. FIG. 9 is a diagram illustrating the structure of the liquid discharge module 20. Here, in describing the structure of the liquid discharge module 20, FIGS. 9 to 11 illustrate arrows indicating the X1 direction, the Y1 direction, and the Z1 direction orthogonal to each other. In addition, in the description of FIGS. 9 to 11, the starting point side of the arrow indicating the X1 direction may be referred to as a −X1 side, the tip end side may be referred to as a +X1 side, the starting point side of the arrow indicating the Y1 direction may be referred to as a −Y1 side, the tip end side may be referred to as a +Y1 side, the starting point side of the arrow indicating the Z1 direction may be referred to as a −Z1 side, and the tip end side may be referred to as a +Z1 side. In addition, in the following description, the liquid discharge module 20 provided in the liquid discharge device 1 according to the first embodiment will be described as having six discharge modules 23. When distinguishing each of the six discharge modules 23, each of the six discharge modules 23 may be referred to as discharge modules 23-1 to 23-6.

As illustrated in FIG. 9, the liquid discharge module 20 includes a housing 31, an aggregate substrate 33, a flow path structure 34, a head substrate 35, a distribution flow path 37, a fixing plate 39, and discharge modules 23-1 to 23-6. In the liquid discharge module 20, the flow path structure 34, the head substrate 35, the distribution flow path 37, and the fixing plate 39 are laminated in the order of the fixing plate 39, the distribution flow path 37, the head substrate 35, and the flow path structure 34 from the −Z1 side to the +Z1 side along the Z1 direction. The housing 31 is located around the flow path structure 34, the head substrate 35, the distribution flow path 37, and the fixing plate 39 so as to support the flow path structure 34, the head substrate 35, the distribution flow path 37, and the fixing plate 39. The aggregate substrate 33 is erected on the +Z1 side of the housing 31 while being held by the housing 31, and the six discharge modules 23 are located between the distribution flow path 37 and the fixing plate 39 so that a part of the six discharge modules 23 is exposed to the outside of the liquid discharge module 20.

In describing the structure of the liquid discharge module 20, first, the structure of the discharge module 23 included in the liquid discharge module 20 will be described. FIG. 10 is a diagram illustrating an example of the structure of the discharge module 23, and FIG. 11 is a diagram illustrating an example of a cross section of the discharge module 23. Here, FIG. 11 is a cross-sectional view of the discharge module 23 when the discharge module 23 is cut along the line XI-XI illustrated in FIG. 10, and the line XI-XI illustrated in FIG. 10 is a virtual line segment that passes through an introduction path 661 of the discharge module 23 and passes through a nozzle N1 and a nozzle N2.

As illustrated in FIGS. 10 and 11, the discharge module 23 includes a plurality of nozzles N1 arranged side by side and a plurality of nozzles N2 arranged side by side. The total number of nozzles N1 and nozzles N2 included in the discharge module 23 is n, which is the same as the number of discharge portions 600 included in the discharge module 23. In the first embodiment, the number of nozzles N1 and the number of nozzles N2 included in the discharge module 23 will be described as being the same. That is, the discharge module 23 will be described as having n/2 nozzles N1 and n/2 nozzles N2. Here, when it is not necessary to distinguish between the nozzle N1 and the nozzle N2 in the following description, the nozzles may be simply referred to as a nozzle N.

The discharge module 23 includes a wiring member 388, a case 660, a protective substrate 641, a flow path formation substrate 642, a communication plate 630, a compliance substrate 620, and a nozzle plate 623.

On the flow path formation substrate 642, pressure chambers CB1 partitioned by a plurality of partition walls by anisotropic etching from one surface side are arranged side by side corresponding to the nozzle N1, and pressure chambers CB2 partitioned by a plurality of partition walls by anisotropic etching from one surface side are arranged side by side corresponding to the nozzle N2. Here, in the following description, when it is not necessary to distinguish between the pressure chamber CB1 and the pressure chamber CB2, the pressure chambers may be simply referred to as a pressure chamber CB.

The nozzle plate 623 is located on the −Z1 side of the flow path formation substrate 642. The nozzle plate 623 is provided with a nozzle row Ln1 formed by n/2 nozzles N1 and a nozzle row Ln2 formed by n/2 nozzles N2. Here, in the following description, the surface of the nozzle plate 623 on which the nozzle N opens on the −Z1 side may be referred to as a liquid ejection surface 623*a*.

The communication plate 630 is located on the −Z1 side of the flow path formation substrate 642 and on the +Z1 side of the nozzle plate 623. The communication plate 630 is provided with a nozzle communication path RR1 that communicates with the pressure chamber CB1 and the nozzle N1, and a nozzle communication path RR2 that communicates with the pressure chamber CB2 and the nozzle N2. In addition, the communication plate 630 is provided with a pressure chamber communication path RK1 for communicating the end portion of the pressure chamber CB1 and a manifold MN1 and a pressure chamber communication path RK2 for communicating the end portion of the pressure chamber CB2 and a manifold MN2 independently corresponding to each of the pressure chambers CB1 and CB2.

The manifold MN1 includes a supply communication path RA1 and a coupling communication path RX1. The supply communication path RA1 is provided so as to penetrate the communication plate 630 along the Z1 direction, and the coupling communication path RX1 opens on the nozzle plate 623 side of the communication plate 630 without penetrating the communication plate 630 in the Z1 direction and is provided halfway in the Z1 direction. Similarly, the manifold MN2 includes a supply communication path RA2 and a coupling communication path RX2. The supply communication path RA2 is provided so as to penetrate the communication plate 630 along the Z1 direction, and the coupling communication path RX2 opens on the nozzle plate 623 side of the communication plate 630, without penetrating the communication plate 630 in the Z1 direction and is provided halfway in the Z1 direction. The coupling communication path RX1 included in the manifold MN1 communicates with the corresponding pressure chamber CB1 by the pressure chamber communication path RK1, and the coupling communication path RX2 included in the manifold MN2 communicates with the corresponding pressure chamber CB2 by the pressure chamber communication path RK2.

Here, in the following description, when it is not necessary to distinguish between the nozzle communication path RR1 and the nozzle communication path RR2, the nozzle communication paths may be simply referred to as a nozzle communication path RR, and it is not necessary to distinguish between the manifold MN1 and the manifold MN2, the manifolds may be simply referred to as a manifold MN. When it is not necessary to distinguish between the supply communication path RA1 and the supply communication path RA2, the supply communication paths may be simply referred to as a supply communication path RA, and when it is not necessary to distinguish between the coupling communication path RX1 and the coupling communication path RX2, the coupling communication paths may be simply referred to as a coupling communication path RX.

A diaphragm 610 is located on the surface of the flow path formation substrate 642 on the +Z1 side. In addition, the piezoelectric elements 60 are formed in two rows corresponding to the nozzles N1 and N2 on the surface of the diaphragm 610 on the +Z1 side. One electrode of the piezoelectric element 60 and the piezoelectric layer are formed for each pressure chamber CB, and the other electrode of the piezoelectric element 60 is configured as a common electrode common to the pressure chamber CB. The drive signal VOUT is supplied from the drive signal selection circuit 200 to one electrode of the piezoelectric element 60, and the reference voltage signal VBS is supplied to the common electrode which is the other electrode of the piezoelectric element 60.

The protective substrate 641 is bonded to the surface of the flow path formation substrate 642 on the +Z1 side. The protective substrate 641 forms a protective space 644 for protecting the piezoelectric element 60. In addition, the protective substrate 641 is provided with a through-hole 643 penetrating along the Z1 direction. The end portion of a lead electrode 611 drawn from the electrode of the piezoelectric element 60 is extended so as to be exposed inside the through-hole 643. The wiring member 388 is electrically coupled to the end portion of the lead electrode 611 exposed inside the through-hole 643.

In addition, a case 660 that defines a part of the manifold MN communicating with a plurality of pressure chambers CB is fixed to the protective substrate 641 and the communication plate 630. The case 660 is bonded to the protective substrate 641 and also to the communication plate 630. Specifically, the case 660 includes a recessed portion 665 in which the flow path formation substrate 642 and the protective substrate 641 are accommodated on the surface on the −Z1 side. The recessed portion 665 has a wider opening area than that of the surface on which the protective substrate 641 is bonded to the flow path formation substrate 642. The opening surface of the recessed portion 665 on the −Z1 side is sealed by the communication plate 630 in a state where the flow path formation substrate 642 and the like are accommodated in the recessed portion 665. As a result, a supply communication path RB1 and a supply communication path RB2 are defined by the case 660, the flow path formation substrate 642, and the protective substrate 641 on an outer peripheral portion of the flow path formation substrate 642. Here, when it is not necessary to distinguish between the supply communication path RB1 and the supply communication path RB2, the supply communication paths may be simply referred to as a supply communication path RB.

In addition, a compliance substrate 620 is provided on the surface of the communication plate 630 where the supply communication path RA and the coupling communication path RX are opened. The compliance substrate 620 seals the openings of the supply communication path RA and the coupling communication path RX. Such a compliance substrate 620 includes a sealing film 621 and a fixed substrate 622. The sealing film 621 is formed of a flexible thin film or the like, and the fixed substrate 622 is formed of a hard material such as a metal such as stainless steel.

The case 660 is provided with an introduction path 661 for supplying ink to the manifold MN. In addition, the case 660 is an opening that communicates with the through-hole 643 of the protective substrate 641 and penetrates along the Z1 direction, and is provided with a coupling port 662 through which the wiring member 388 is inserted.

The wiring member 388 is a flexible member for electrically coupling the discharge module 23 and the head substrate 35, and for example, an FPC can be used. In addition, an integrated circuit 201 is mounted on the wiring member 388 by chip on film (COF). At least a part of the drive signal selection circuit 200 described above is mounted on the integrated circuit 201.

In the discharge module 23 configured as described above, the drive signal VOUT output by the drive signal selection circuit 200 and the reference voltage signal VBS are supplied to the piezoelectric element 60 via the wiring member 388. The piezoelectric element 60 is driven by a change in the potential difference between the drive signal VOUT and the reference voltage signal VBS. With the driving of the piezoelectric element 60, the diaphragm 610 is displaced in the vertical direction, and the internal pressure of the pressure chamber CB changes. Due to the change in the internal pressure of the pressure chamber CB, the ink stored inside the pressure chamber CB is discharged from the corresponding nozzle N. Here, in the discharge module 23, the configuration including the nozzle N, the nozzle communication path RR, the pressure chamber CB, the piezoelectric element 60, and the diaphragm 610 corresponds to the discharge portion 600 described above. That is, the discharge module 23 includes the piezoelectric element 60, and includes a plurality of discharge portions 600 that discharge ink in response to the drive of the piezoelectric element 60.

Returning to FIG. 9, the fixing plate 39 is located on the −Z1 side of the discharge module 23. The fixing plate 39 fixes the six discharge modules 23. Specifically, the fixing plate 39 includes six opening portions 391 penetrating the fixing plate 39 along the Z2 direction. The liquid ejection surface 623*a* of the discharge module 23 is exposed from each of the six opening portions 391. That is, the six discharge modules 23 are fixed to the fixing plate 39 so that the liquid ejection surface 623*a* is exposed from each of the corresponding opening portions 391.

The distribution flow path 37 is located on the +Z1 side of the discharge module 23. Four introduction portions 373 are provided on the surface of the distribution flow path 37 on the +Z1 side. The four introduction portions 373 are flow path tubes that protrude from the surface of the distribution flow path 37 on the +Z1 side toward the +Z1 side along the Z1 direction, and communicate with a flow path hole (not illustrated) formed on the surface of the flow path structure 34 on the −Z1 side. In addition, a flow path tube (not illustrated) that communicates with the four introduction portions 373 is located on the surface of the distribution flow path 37 on the −Z1 side. The flow path tube (not illustrated) located on the surface of the distribution flow path 37 on the −Z1 side communicates with the introduction path 661 included in each of the six discharge modules 23. In addition, the distribution flow path 37 includes six opening portions 371 penetrating along the Z1 direction. The wiring member 388 included in each of the six discharge modules 23 is inserted into the six opening portions 371.

The head substrate 35 is located on the +Z1 side of the distribution flow path 37. A wiring member FC electrically coupled to the aggregate substrate 33 described later is attached to the head substrate 35. In addition, the head substrate 35 is formed with four opening portions 351 and cutout portions 352 and 353. The wiring member 388 included in the discharge modules 23-2 to 23-5 is inserted into the four opening portions 351. The wiring member 388 of each of the discharge modules 23-2 to 23-5 through which the four opening portions 351 are inserted is electrically coupled to the head substrate 35 by solder or the like. In addition, the wiring member 388 included in the discharge module 23-1 passes through the cutout portion 352, and the wiring member 388 included in the discharge module 23-6 passes through the cutout portion 353. The wiring member 388 included in each of the discharge modules 23-1 and 23-6 that have passed through each of the cutout portions 352 and 353 is electrically coupled to the head substrate 35 by solder or the like.

In addition, four cutout portions 355 are formed at the four corners of the head substrate 35. The introduction portion 373 passes through the four cutout portions 355. The four introduction portions 373 that have passed through the cutout portion 355 are coupled to the flow path structure 34 located on the +Z1 side of the head substrate 35.

The flow path structure 34 includes a flow path plate Su1 and a flow path plate Su2. The flow path plate Su1 and the flow path plate Su2 are laminated along the Z1 direction in a state where the flow path plate Su1 is located on the +Z1 side and the flow path plate Su2 is located on the −Z1 side, and are bonded to each other by an adhesive or the like. In addition, the flow path structure 34 includes four introduction portions 341 protruding toward the +Z1 side along the Z1 direction on the surface on the +Z1 side. The four introduction portions 341 communicate with the flow path hole (not illustrated) formed on the surface of the flow path structure 34 on the −Z1 side via the ink flow path formed inside the flow path structure 34. The flow path hole (not illustrated) formed on the surface of the flow path structure 34 on the −Z1 side and the four introduction portions 373 communicate with each other. Furthermore, the flow path structure 34 is formed with a through-hole 343 penetrating along the Z1 direction. The wiring member FC that is electrically coupled to the head substrate 35 is inserted into the through-hole 343. Inside the flow path structure 34, in addition to the ink flow path that communicates with the introduction portion 341 and the flow path hole (not illustrated) formed on the surface on the −Z1 side, a filter or the like for capturing foreign matter contained in the ink flowing through the ink flow path may be provided.

The housing 31 is located so as to cover the periphery of the flow path structure 34, the head substrate 35, the distribution flow path 37, and the fixing plate 39, and supports the flow path structure 34, the head substrate 35, the distribution flow path 37, and the fixing plate 39. The housing 31 includes four opening portions 311, an aggregate substrate insertion portion 313, and a holding member 315.

The four introduction portions 341 included in the flow path structure 34 are inserted into the four opening portions 311. Ink is supplied from the liquid container 3 to the four introduction portions 341 through which the four opening portions 311 are inserted through a tube (not illustrated) or the like.

The holding member 315 interposes the aggregate substrate 33 in a state where a part of the aggregate substrate 33 is inserted through the aggregate substrate insertion portion 313. The aggregate substrate 33 is provided with a coupling portion 330. Various signals such as a data signal DATA, drive signals COMA, COMB, and COMC, a reference voltage signal VBS, and other power supply voltages output by the head drive module 10 are input to the coupling portion 330 via the wiring member 30. In addition, the wiring member FC included in the head substrate 35 is electrically coupled to the aggregate substrate 33. As a result, the aggregate substrate 33 and the head substrate 35 are electrically coupled to each other. The aggregate substrate 33 may be provided with a semiconductor device including the above-described restoration circuit 220. Although FIG. 9 illustrates a case where the aggregate substrate 33 includes one coupling portion 330, when the liquid discharge device 1 includes a plurality of wiring members 30, and various signals such as a data signal DATA, drive signals COMA, COMB, and COMC, a reference voltage signal VBS, and other power supply voltages output by the head drive module 10 are input to the aggregate substrate 33 via the plurality of wiring members 30, the aggregate substrate 33 may include a plurality of coupling portions 330 corresponding to each of the plurality of wiring members 30.

In the liquid discharge module 20 configured as described above, the liquid container 3 and the introduction portion 341 communicate with each other via a tube or the like (not illustrated) to supply the ink stored in the liquid container 3. The ink supplied to the liquid discharge module 20 is guided to a flow path hole (not illustrated) formed on the surface of the flow path structure 34 on the −Z1 side via the ink flow path formed inside the flow path structure 34, and then is supplied to the four introduction portions 373 included in the distribution flow path 37. The ink supplied to the distribution flow path 37 via the four introduction portions 373 is distributed correspondingly to each of the six discharge modules 23 in an ink flow path (not illustrated) formed inside the distribution flow path 37, and then supplied to the introduction path 661 included in the corresponding discharge module 23. The ink supplied to the discharge module 23 via the introduction path 661 is stored in the pressure chamber CB included in the discharge portion 600.

In addition, the head drive module 10 and the liquid discharge module 20 are electrically coupled to each other by one or a plurality of wiring members 30. As a result, various signals including the drive signals COMA, COMB, and COMC, the reference voltage signal VBS, and the data signal DATA output by the head drive module 10 are supplied to the liquid discharge module 20. Various signals including the drive signals COMA, COMB, and COMC, the reference voltage signal VBS, and the data signal DATA input to the liquid discharge module 20 propagate through the aggregate substrate 33 and the head substrate 35. At this time, the restoration circuit 220 generates clock signals SCK1 to SCK6, print data signals SI1 to SI6, and latch signals LAT1 to LAT6 corresponding to each of the discharge modules 23-1 to 23-6 from the data signal DATA. The integrated circuit 201 including the drive signal selection circuit 200 provided in the wiring member 388 generates drive signals VOUT corresponding to each of the n discharge portions 600, and supplies the drive signals VOUT to the piezoelectric element 60 included in the corresponding discharge portion 600. As a result, the piezoelectric element 60 is driven, and the ink stored in the pressure chamber CB is discharged.

That is, the liquid discharge module 20 includes the discharge module 23-1 including the piezoelectric element 60 and n discharge portions 600 for discharging liquid in response to the drive of the piezoelectric element 60, the discharge module 23-2 including the piezoelectric element 60 and n discharge portions 600 for discharging liquid in response to the drive of the piezoelectric element 60, the discharge module 23-3 including the piezoelectric element 60 and n discharge portions 600 for discharging liquid in response to the drive of the piezoelectric element 60, the discharge module 23-4 including the piezoelectric element 60 and n discharge portions 600 for discharging liquid in response to the drive of the piezoelectric element 60, the discharge module 23-5 including the piezoelectric element 60 and n discharge portions 600 for discharging liquid in response to the drive of the piezoelectric element 60, and the discharge module 23-6 including the piezoelectric element 60 and n discharge portions 600 for discharging liquid in response to the drive of the piezoelectric element 60. In other words, the liquid discharge module 20 discharges the liquid in response to the drive of the piezoelectric element 60 included in the discharge module 23-1, discharges the liquid in response to the drive of the piezoelectric element 60 included in the discharge module 23-2, discharges the liquid in response to the drive of the piezoelectric element 60 included in the discharge module 23-3, discharges the liquid in response to the drive of the piezoelectric element 60 included in the discharge module 23-4, discharges the liquid in response to the drive of the piezoelectric element 60 included in the discharge module 23-5, and discharges the liquid in response to the drive of the piezoelectric element 60 included in the discharge module 23-6.

1.5 Head Drive Module Structure

Figure 12:
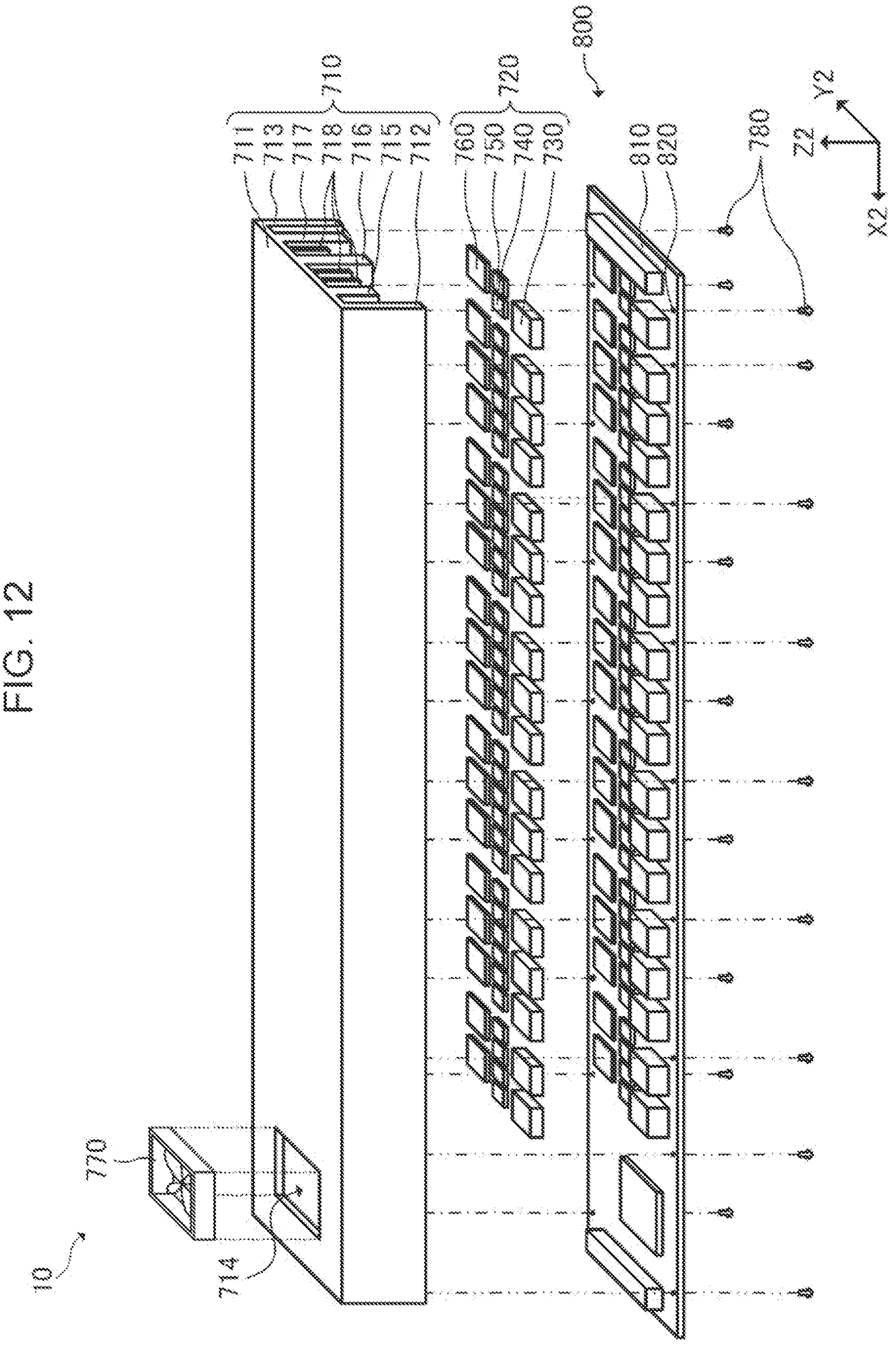
FIG. 12 is a diagram illustrating an example of a structure of a head drive module.

Next, the structure of the head drive module 10 will be described with reference to FIG. 12. Here, FIG. 12 illustrates arrows indicating the X2 direction, the Y2 direction, and the Z2 direction which are independent of the above-described X1 direction, Y1 direction, and Z1 direction and are orthogonal to each other. In addition, in the following description, the starting point side of the arrow indicating the X2 direction may be referred to as a −X2 side, the tip end side may be referred to as a +X2 side, the starting point side of the arrow indicating the Y2 direction may be referred to as a −Y2 side, the tip end side may be referred to as a +Y2 side, the starting point side of the arrow indicating the Z2 direction may be referred to as a −Z2 side, and the tip end side may be referred to as a +Z2 side.

FIG. 12 is a diagram illustrating an example of the structure of the head drive module 10. As illustrated in FIG. 12, the head drive module 10 includes a drive circuit substrate 800, a heat conductive member group 720, a plurality of screws 780, and a cooling fan 770.

The drive circuit substrate 800 includes a wiring substrate 810 provided with a plurality of drive circuits 52 described above, and outputs a drive signal COM to the liquid discharge module 20. The heat sink 710 is located on the +Z2 side of the drive circuit substrate 800 and is attached to the wiring substrate 810 by the plurality of screws 780. The heat conductive member group 720 is located between the drive circuit substrate 800 and the heat sink 710, and comes into contact with both the plurality of drive circuits 52 provided on the wiring substrate 810 and the heat sink 710 by attaching the heat sink 710 to the wiring substrate 810. As a result, the heat conductive member group 720 conducts the heat generated by the plurality of drive circuits 52 provided on the wiring substrate 810 to the heat sink 710.

The details of the structure of the head drive module 10 configured as described above will be described with reference to the drawings.

Figure 13:
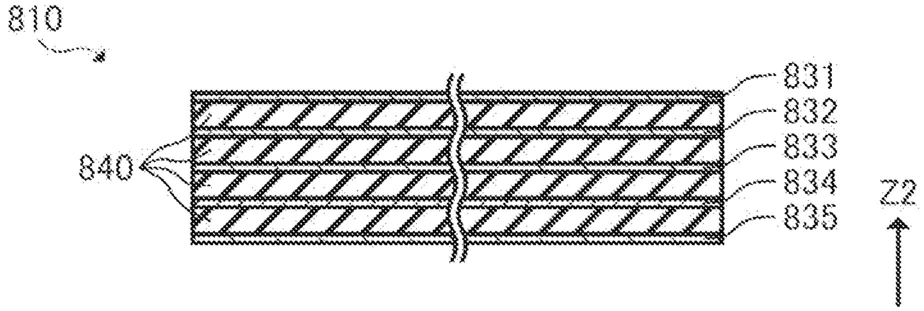
FIG. 13 is a diagram illustrating an example of a cross-sectional structure of a wiring substrate provided with a plurality of drive circuits.

First, a specific example of the structure of the drive circuit substrate 800 included in the head drive module 10 will be described. FIG. 13 is a diagram illustrating an example of a cross-sectional structure of the wiring substrate 810 provided with the plurality of drive circuits 52. As illustrated in FIG. 13, the wiring substrate 810 includes a first layer 831, a second layer 832, a third layer 833, a fourth layer 834, a fifth layer 835, and a plurality of insulating layers 840. The first layer 831, the second layer 832, the third layer 833, the fourth layer 834, and the fifth layer 835 are located in the order of the first layer 831, the second layer 832, the third layer 833, the fourth layer 834, and the fifth layer 835 from the +Z2 side to the −Z2 side along the Z2 direction. The plurality of insulating layers 840 are located between the first layer 831 and the second layer 832, between the second layer 832 and the third layer 833, between the third layer 833 and the fourth layer 834, and between the fourth layer 834 and the fifth layer 835 along the Z2 direction.

The first layer 831 and the fifth layer 835 are provided with a plurality of electronic components constituting various circuits including the plurality of drive circuits 52. In addition, in the first layer 831, the second layer 832, the third layer 833, the fourth layer 834, and the fifth layer 835, a plurality of wiring patterns are formed in which the electronic components provided on the first layer 831 and the fifth layer 835 are electrically coupled and various signals are propagated. The plurality of wiring patterns formed in each of the first layer 831, the second layer 832, the third layer 833, the fourth layer 834, and the fifth layer 835 are made of materials having excellent electrical conductivity, and are formed by, for example, etching a copper foil. In addition, the insulating layer 840 functions as an insulating layer that insulates between the plurality of wiring patterns formed in the first layer 831, the second layer 832, the third layer 833, the fourth layer 834, and the fifth layer 835.

Examples of such an insulating layer 840 include epoxy glass formed by impregnating a glass fiber cloth with an epoxy resin.

That is, the wiring substrate 810 according to the first embodiment is a multilayer substrate including the first layer 831, the second layer 832, the third layer 833, the fourth layer 834, and the fifth layer 835. The first layer 831 and the fifth layer 835 form the surface layer of the wiring substrate 810, and the second layer 832, the third layer 833, and the fourth layer 834 form the inner layer of the wiring substrate 810. The wiring substrate 810 penetrates the insulating layer 840 along the Z2 direction, and may include a through-hole (not illustrated) that electrically couples the first layer 831, the second layer 832, the third layer 833, the fourth layer 834, and the fifth layer 835 to each other. In addition, in the following description, it is described that the electronic components constituting the various circuits including the plurality of drive circuits 52 included in the drive circuit substrate 800 are provided on the first layer 831, but a part of the electronic components constituting various circuits including the plurality of drive circuits 52 included in the drive circuit substrate 800 may be provided on the fifth layer 835.

Figure 14:
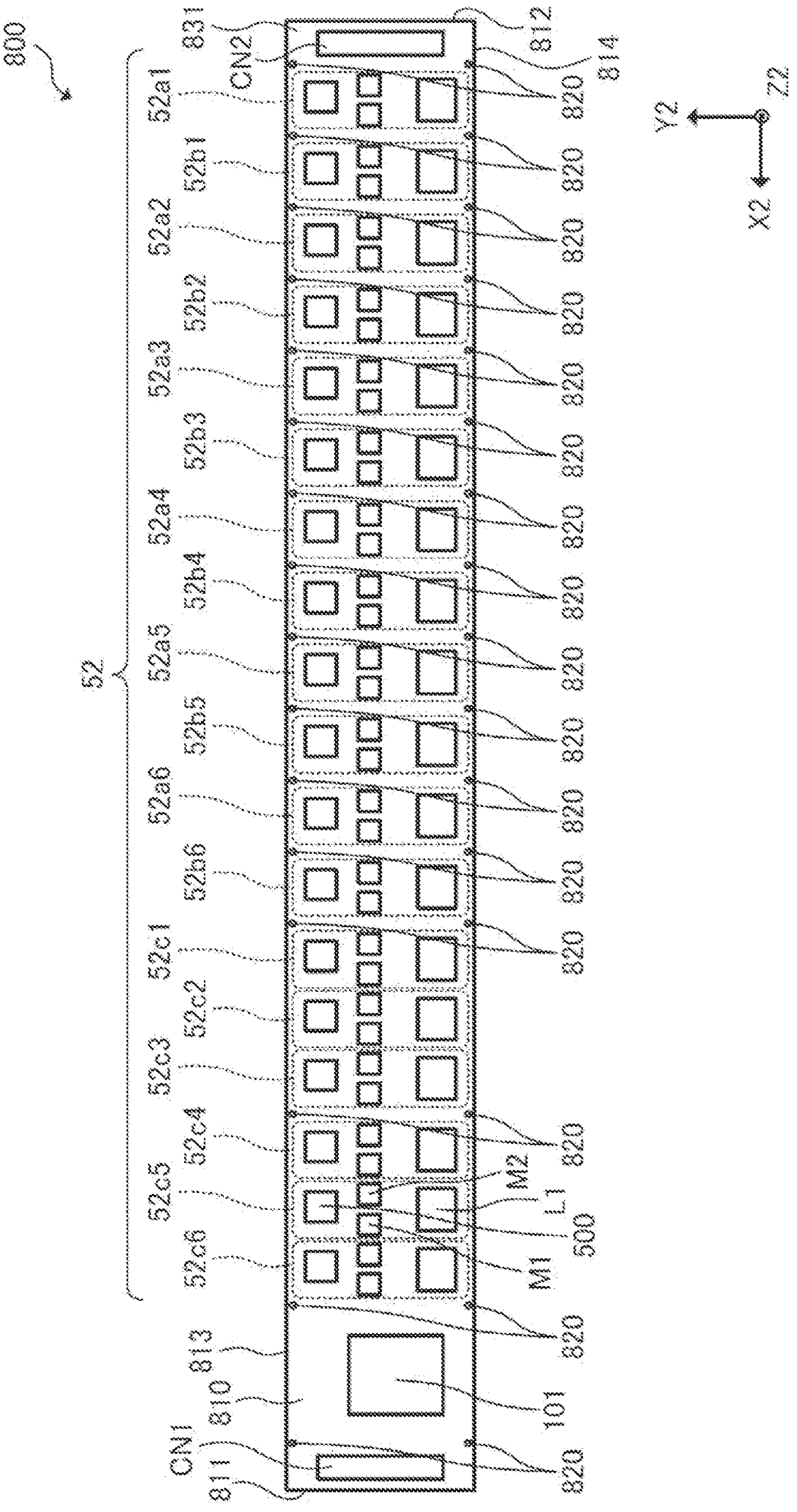
FIG. 14 is a diagram illustrating an example of a configuration of a first layer of the wiring substrate.

Details of the configurations of the first layer 831, the second layer 832, the third layer 833, and the fourth layer 834 will be described with reference to FIGS. 14 to 17. FIG. 14 is a diagram illustrating an example of a configuration of the first layer 831 when the wiring substrate 810 is viewed from the Z2 side along the Z2 direction.

As illustrated in FIG. 14, the wiring substrate 810 is a substantially rectangular multilayer substrate including sides 811 and 812 facing each other along the X2 direction and sides 813 and 814 facing each other along the Y2 direction. Specifically, the side 811 is located on the +X2 side of the wiring substrate 810, and the side 812 is located on the −X2 side of the wiring substrate 810. The side 813 intersects both sides 811 and 812 and is located on the +Y2 side of the wiring substrate 810. The side 814 intersects both sides 811 and 812 and is located on the −Y2 side of the wiring substrate 810.

The first layer 831 of the wiring substrate 810 is provided with coupling portions CN1 and CN2, an integrated circuit 101, and a plurality of drive circuits 52.

The coupling portion CN1 is located along the side 811 and is electrically coupled to the control unit 2. Specifically, a cable (not illustrated) electrically coupled to the control unit 2 is attached to the coupling portion CN1. As a result, a signal including the image information signal IP output by the control unit 2 is supplied to the head drive module 10. The coupling portion CN1 may be a board to board (B to B) connector that enables electrical coupling between the control unit 2 and the head drive module 10 without using a cable.

The coupling portion CN2 is located along the side 812 of the wiring substrate 810 and is electrically coupled to the liquid discharge module 20. Specifically, one end of the wiring member 30 is attached to the coupling portion CN2. In addition, the other end of the wiring member 30 is coupled to the coupling portion 330 included in the liquid discharge module 20. As a result, the signals including the drive signals COMA1 to COMA6, COMB1 to COMB6, and COMC1 to COMC6 and the data signal DATA output by the head drive module 10 are supplied from the coupling portion 330 to the liquid discharge module 20 via the coupling portion CN2 and the wiring member 30. That is, the coupling portion CN2 is provided on the wiring substrate 810, and electrically couples the wiring substrate 810 and the liquid discharge module 20, so that the drive signals COMA1 to COMA6, COMB1 to COMB6, and COMC1 to COMC6 are propagated to the liquid discharge module 20. Here, the coupling portions CN2 and 330 may be B to B connectors that can be electrically coupled to each other without using a cable or the like, and in this case, the coupling portions CN2 and 330 constitute the wiring member 30.

The integrated circuit 101 is located on the −X2 side of the coupling portion CN1. The integrated circuit 101 constitutes a part or all of the above-described control circuit 100. That is, the image information signal IP is input to the integrated circuit 101 via the coupling portion CN1. The integrated circuit 101 generates and outputs various signals based on the input image information signal IP. Here, the integrated circuit 101 may include a part or all of the conversion circuit 120 in addition to the control circuit 100. In the liquid discharge device 1 of the first embodiment, it is described that the integrated circuit 101 includes the entire control circuit 100 and the entire conversion circuit 120, but a part of the control circuit 100 or a part of the conversion circuit 120 may be configured outside the integrated circuit 101.

Here, FIG. 14 illustrates a case where the integrated circuit 101 is disposed on the first layer 831 of the wiring substrate 810 together with the plurality of drive circuits 52, but the integrated circuit 101 may be disposed on a substrate (not illustrated) different from the wiring substrate 810. As illustrated in FIG. 14, when the integrated circuit 101 and the plurality of drive circuits 52 are mounted on a common substrate, the wiring pattern in which the signal is propagated between the plurality of drive circuits 52 and the integrated circuit 101 can be shortened. As a result, the possibility that noise or the like is superimposed on the signal propagating between the plurality of drive circuits 52 and the integrated circuit 101 is reduced. On the other hand, the plurality of drive circuits 52 have a large amount of heat as compared with the integrated circuit 101. Therefore, when the heat generated by the plurality of drive circuits 52 contributes to the integrated circuit 101, there is a possibility that the stability of the operation of the integrated circuit 101 may decrease. In response to such a problem, by mounting the integrated circuit 101 on a substrate different from the plurality of drive circuits 52, it is possible to reduce the possibility that the heat generated in the plurality of drive circuits 52 contributes to the integrated circuit 101.

The plurality of drive circuits 52 are located between the integrated circuit 101 and the coupling portion CN2, and are arranged side by side along the X2 direction. Specifically, the drive circuits 52*a*1 to 52*a*6, 52*b*1 to 52*b*6, 52*c*1 to 52*c*6 as the plurality of drive circuits 52 are provided on the first layer 831 of the wiring substrate 810, and are located side by side in order of the drive circuits 52*a*1, 52*b*1, 52*a*2, 52*b*2, 52*a*3, 52*b*3, 52*a*4, 52*b*4, 52*a*5, 52*b*5, 52*a*6, 52*b*6, 52*c*1, 52*c*2, 52*c*3, 52*c*4, 52*c*5, and 52*c*6 from the −X2 side to the +X2 side along the X2 direction in the first layer 831 of the wiring substrate 810.

In this case, the transistor M1 and the transistor M2 included in each of the plurality of drive circuits 52 are located side by side so that the transistor M1 is on the +X2 side and the transistor M2 is on the −X2 side along the X2 direction. The inductor L1 is located on the −Y2 side of the transistors M1 and M2 located side by side along the X2 direction, and the integrated circuit 500 is located on the +Y2 side of the transistors M1 and M2 located side by side along the X2 direction. That is, the integrated circuit 500, the transistors M1 and M2, and the inductor L1 included in the drive circuit 52 are located side by side in the order of the integrated circuit 500, the transistors M1 and M2 arranged side by side, and the inductor L1 along the direction from the side 813 to the side 814 in the first layer 831 of the wiring substrate 810.

In addition, the integrated circuits 500 included in each of the plurality of drive circuits 52 are located side by side along the X2 direction. The transistors M1 and M2 arranged side by side are alternately located side by side along the X2 direction, and the inductors L1 are located side by side along the X2 direction. That is, the first layer 831 of the wiring substrate 810 is configured to include a row of integrated circuits 500 arranged side by side from the side 812 to the side 811, a row of transistors M1 and M2 arranged side by side from the side 812 to the side 811, and a row of inductors L1 arranged side by side from the side 812 to the side 811.

In the first layer 831 of the wiring substrate 810 of the liquid discharge device 1 of the first embodiment, the drive circuit 52*a*1, 52*a*2, 52*b*1, 52*b*2, 52*c*1, and 52*c*2 are located so that the drive circuit 52*a*2 is located between the drive circuit 52*a*1 and the drive circuit 52*c*1 along the X2 direction, and the shortest distance between the drive circuit 52*c*2 and the drive circuit 52*c*1 is shorter than the shortest distance between the drive circuit 52*c*2 and the drive circuit 52*a*2. The drive circuit 52*b*1 and the drive circuit 52*b*2 are located between the drive circuit 52*a*1 and the drive circuit 52*c*1 and between the drive circuit 52*a*1 and the drive circuit 52*c*2 along the X2 direction.

Similarly, in the first layer 831 of the wiring substrate 810 of the liquid discharge device 1 of the first embodiment, the drive circuit 52*a*3, 52*a*4, 52*b*3, 52*b*4, 52*c*3, and 52*c*4 are located so that the drive circuit 52*a*4 is located between the drive circuit 52*a*3 and the drive circuit 52*c*3 along the X2 direction, and the shortest distance between the drive circuit 52*c*4 and the drive circuit 52*c*3 is shorter than the shortest distance between the drive circuit 52*c*4 and the drive circuit 52*a*4. The drive circuit 52*b*3 and the drive circuit 52*b*4 are located between the drive circuit 52*a*3 and the drive circuit 52*c*3 and between the drive circuit 52*a*3 and the drive circuit 52*c*4 along the X2 direction.

Similarly, in the first layer 831 of the wiring substrate 810 of the liquid discharge device 1 of the first embodiment, the drive circuit 52*a*5, 52*a*6, 52*b*5, 52*b*6, 52*c*5, and 52*c*6 are located so that the drive circuit 52*a*6 is located between the drive circuit 52*a*5 and the drive circuit 52*c*5 along the X2 direction, and the shortest distance between the drive circuit 52*c*6 and the drive circuit 52*c*5 is shorter than the shortest distance between the drive circuit 52*c*6 and the drive circuit 52*a*6. The drive circuit 52*b*5 and the drive circuit 52*b*6 are located between the drive circuit 52*a*5 and the drive circuit 52*c*5 and between the drive circuit 52*a*5 and the drive circuit 52*c*6 along the X2 direction.

In this case, the drive circuit 52*a*1 that outputs the drive signal COMA1 and the drive circuit 52*b*1 that outputs the drive signal COMB1 are located adjacent to each other along the X2 direction on the piezoelectric element 60 included in the discharge module 23-1. The drive circuit 52*a*2 that outputs the drive signal COMA2 and the drive circuit 52*b*2 that outputs the drive signal COMB2 are located adjacent to each other along the X2 direction on the piezoelectric element 60 included in the discharge module 23-2. The drive circuit 52*a*3 that outputs the drive signal COMA3 and the drive circuit 52*b*3 that outputs the drive signal COMB3 are located adjacent to each other along the X2 direction on the piezoelectric element 60 included in the discharge module 23-3. The drive circuit 52*a*4 that outputs the drive signal COMA4 and the drive circuit 52*b*4 that outputs the drive signal COMB4 are located adjacent to each other along the X2 direction on the piezoelectric element 60 included in the discharge module 23-4. The drive circuit 52*a*5 that outputs the drive signal COMA5 and the drive circuit 52*b*5 that outputs the drive signal COMB5 are located adjacent to each other along the X2 direction on the piezoelectric element 60 included in the discharge module 23-5. The drive circuit 52*a*6 that outputs the drive signal COMA6 and the drive circuit 52*b*6 that outputs the drive signal COMB6 are located adjacent to each other along the X2 direction on the piezoelectric element 60 included in the discharge module 23-6.

Specifically, the drive circuit 52*a*1 that outputs the drive signal COMA1 for driving the piezoelectric element 60 included in the discharge module 23-1 so that the ink is discharged from the discharge portion 600 included in the discharge module 23-1 and the drive circuit 52*b*1 that outputs the drive signal COMB1 for driving the piezoelectric element 60 included in the discharge module 23-1 so that the ink is discharged from the discharge portion 600 of the discharge module 23-1 are located adjacent to each other along the X2 direction in the first layer 831 of the wiring substrate 810 so that the drive circuit 52*a*1 is on the −X2 side and the drive circuit 52*b*1 is on the +X2 side.

The drive circuit 52*a*2 that outputs the drive signal COMA2 for driving the piezoelectric element 60 included in the discharge module 23-2 so that the ink is discharged from the discharge portion 600 included in the discharge module 23-2 and the drive circuit 52*b*2 that outputs the drive signal COMB2 for driving the piezoelectric element 60 included in the discharge module 23-2 so that the ink is discharged from the discharge portion 600 of the discharge module 23-2 are located adjacent to each other along the X2 direction in the first layer 831 of the wiring substrate 810 so that the drive circuit 52*b*1 is on the +X2 side, the drive circuit 52*a*2 is on the −X2 side, and the drive circuit 52*b*2 is on the +X2 side.

The drive circuit 52*a*3 that outputs the drive signal COMA3 for driving the piezoelectric element 60 included in the discharge module 23-3 so that the ink is discharged from the discharge portion 600 included in the discharge module 23-3 and the drive circuit 52*b*3 that outputs the drive signal COMB3 for driving the piezoelectric element 60 included in the discharge module 23-3 so that the ink is discharged from the discharge portion 600 of the discharge module 23-3 are located adjacent to each other along the X2 direction in the first layer 831 of the wiring substrate 810 so that the drive circuit 52*b*2 is on the +X2 side, the drive circuit 52*a*3 is on the −X2 side, and the drive circuit 52*b*3 is on the +X2 side.

The drive circuit 52*a*4 that outputs the drive signal COMA4 for driving the piezoelectric element 60 included in the discharge module 23-4 so that the ink is discharged from the discharge portion 600 included in the discharge module 23-4 and the drive circuit 52*b*4 that outputs the drive signal COMB4 for driving the piezoelectric element 60 included in the discharge module 23-4 so that the ink is discharged from the discharge portion 600 of the discharge module 23-4 are located adjacent to each other along the X2 direction in the first layer 831 of the wiring substrate 810 so the drive circuit 52*b*3 is on the +X2 side, the drive circuit 52*a*4 is on the −X2 side, and the drive circuit 52*b*4 is on the +X2 side.

The drive circuit 52*a*5 that outputs the drive signal COMA5 for driving the piezoelectric element 60 included in the discharge module 23-5 so that the ink is discharged from the discharge portion 600 included in the discharge module 23-5 and the drive circuit 52*b*5 that outputs the drive signal COMB5 for driving the piezoelectric element 60 included in the discharge module 23-5 so that the ink is discharged from the discharge portion 600 of the discharge module 23-5 are located adjacent to each other along the X2 direction in the first layer 831 of the wiring substrate 810 so that the drive circuit **52*b*4 is on the +X2 side, the drive circuit 52*a*5 is on the −X2 side, and the drive circuit 52*b*5** is on the +X2 side.

The drive circuit **52*a*6 that outputs the drive signal COMA6 for driving the piezoelectric element 60 included in the discharge module 23-6 so that the ink is discharged from the discharge portion 600 included in the discharge module 23-6 and the drive circuit 52*b*6 that outputs the drive signal COMB6 for driving the piezoelectric element 60 included in the discharge module 23-6 so that the ink is discharged from the discharge portion 600 of the discharge module 23-6 are located adjacent to each other along the X2 direction in the first layer 831 of the wiring substrate 810 so that the drive circuit 52*b*5 is on the +X2 side, the drive circuit 52*a*6 is on the −X2 side, and the drive circuit 52*b*6** is on the +X2 side.

In addition, the drive circuit **52*c*1 that outputs the drive signal COMC1 for driving the piezoelectric element 60 included in the discharge module 23-1 so that the ink is not discharged from the discharge portion 600 included in the discharge module 23-1 is located on the +X2 side of the drive circuit 52*b*6 along the X2 direction in the first layer 831 of the wiring substrate 810. The drive circuit 52*c*2 that outputs the drive signal COMC2 for driving the piezoelectric element 60 included in the discharge module 23-2 so that the ink is not discharged from the discharge portion 600 included in the discharge module 23-2 is located on the +X2 side of the drive circuit 52*c*1 along the X2 direction in the first layer 831 of the wiring substrate 810. The drive circuit 52*c*3 that outputs the drive signal COMC3 for driving the piezoelectric element 60 included in the discharge module 23-3 so that the ink is not discharged from the discharge portion 600 included in the discharge module 23-3 is located on the +X2 side of the drive circuit 52*c*2 along the X2 direction in the first layer 831 of the wiring substrate 810. The drive circuit 52*c*4 that outputs the drive signal COMC4 for driving the piezoelectric element 60 included in the discharge module 23-4 so that the ink is not discharged from the discharge portion 600 included in the discharge module 23-4 is located on the +X2 side of the drive circuit 52*c*3 along the X2 direction in the first layer 831 of the wiring substrate 810. The drive circuit 52*c*5 that outputs the drive signal COMC5 for driving the piezoelectric element 60 included in the discharge module 23-5 so that the ink is not discharged from the discharge portion 600 included in the discharge module 23-5 is located on the +X2 side of the drive circuit 52*c*4 along the X2 direction in the first layer 831 of the wiring substrate 810. The drive circuit 52*c*6 that outputs the drive signal COMC6 for driving the piezoelectric element 60 included in the discharge module 23-6 so that the ink is not discharged from the discharge portion 600 included in the discharge module 23-6 is located on the +X2 side of the drive circuit 52*c*5 along the X2 direction in the first layer 831 of the wiring substrate 810**.

That is, in the head drive module 10, the drive circuits **52*a*1 to 52*a*6, and 52*b*1 to 52*b*6 that output the drive signals COMA1 to COMA6 and COMB1 to COMB6 for driving the piezoelectric element 60 so as to discharge the ink are located adjacent to each of the corresponding discharge modules 23 along the X2 direction in the first layer 831 of the wiring substrate 810. The drive circuits 52*c*1 to 52*c*6 that output the drive signals COMC1 to COMC6 for driving the piezoelectric element 60 so as not to discharge the ink are located in the order of the drive circuits 52*c*1, 52*c*2, 52*c*3, 52*c*4, 52*c*5, and 52*c*6 on the +X2 side of the drive circuits 52*a*1 to 52*a*6 and 52*b*1 to 52*b*6 along the X2 direction in the first layer 831 of the wiring substrate 810**.

In the drive circuit substrate 800 configured as described above, the image information signal IP input via the coupling portion CN1 is supplied to the integrated circuit 101. The integrated circuit 101 generates and outputs the basic drive signals dA1 to dA6, dB1 to dB6, and dC1 to dC6, and the data signal DATA based on the input image information signal IP. The basic drive signals dA1 to dA6, dB1 to dB6, and dC1 to dC6 output by the integrated circuit 101 propagate through a wiring pattern (not illustrated) included in the wiring substrate 810 and are input to the corresponding drive circuit 52. The plurality of drive circuits 52 generate and output the drive signals COMA1 to COMA6, COMB1 to COMB6, and COMC1 to COMC6 based on the input basic drive signals dA1 to dA6, dB1 to dB6, and dC1 to dC6. A plurality of signals including the drive signals COMA1 to COMA6, COMB1 to COMB6, and COMC1 to COMC6 output by each of the plurality of drive circuits 52 and a signal based on the data signal DATA output by the integrated circuit 101 are supplied to the liquid discharge module 20 via the coupling portion CN2.

As described above, among the signals supplied from the head drive module 10 to the liquid discharge module 20, the drive signals COMA1 to COMA6, COMB1 to COMB6, and COMC1 to COMC6 output by each of the plurality of drive circuits 52 are analog signals supplied to the corresponding piezoelectric element 60 to drive the piezoelectric element 60, as described above. When waveform distortion occurs in such drive signals COMA1 to COMA6, COMB1 to COMB6, and COMC1 to COMC6, the waveform distortion directly contributes to the ink discharge status from the corresponding discharge portion 600. That is, from the viewpoint of improving a discharge accuracy of the ink discharged from the liquid discharge module 20, the fact that the possibility of waveform distortion occurs in the drive signals COMA1 to COMA6, COMB1 to COMB6, and COMC1 to COMC6 is reduced is one of the important factors from the viewpoint of improving the discharge accuracy of the ink discharged from the liquid discharge module 20.

Figure 16:
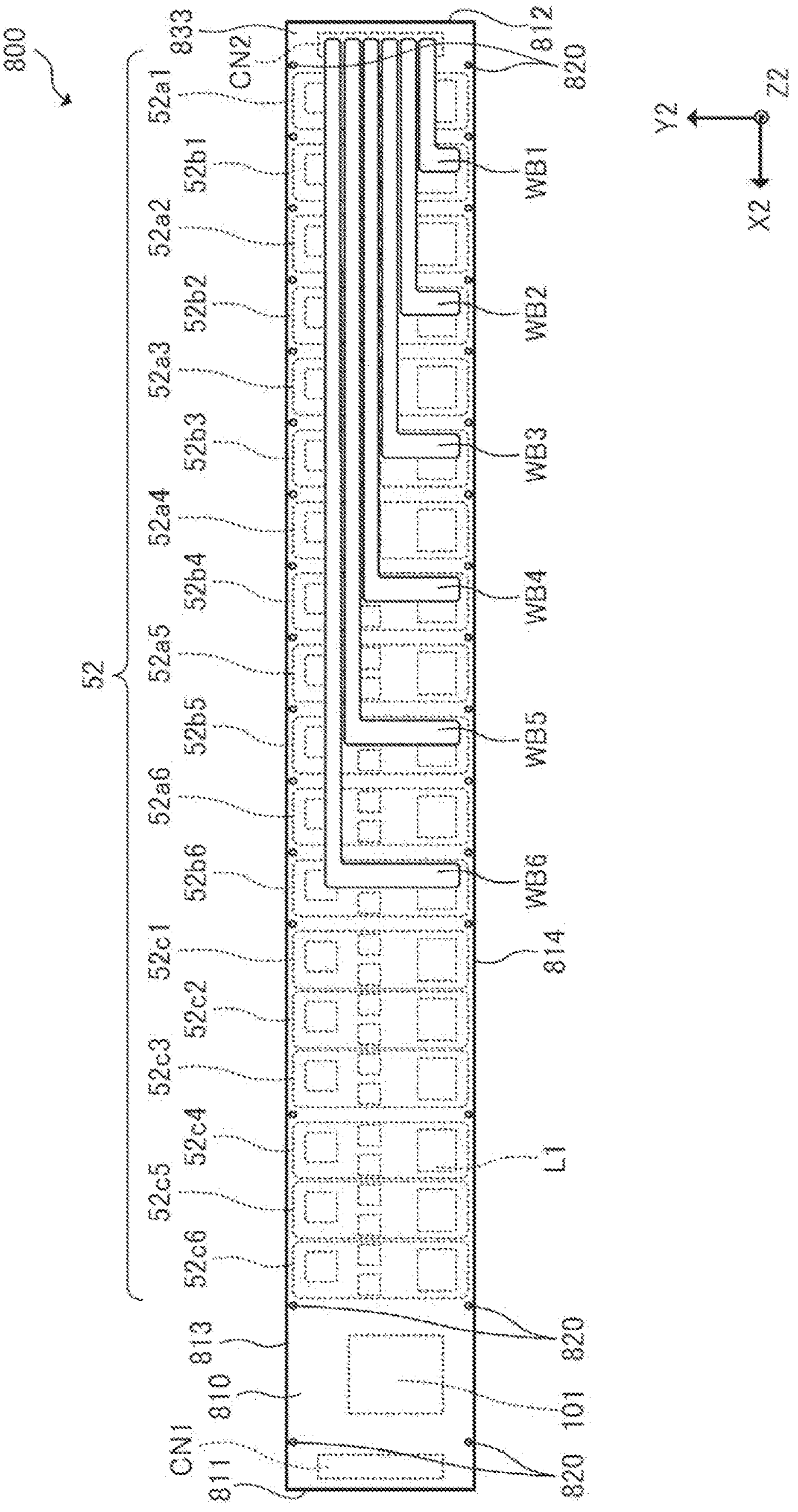
FIG. 16 is a diagram illustrating an example of a wiring pattern provided on a third layer of the wiring substrate.
Figure 17:
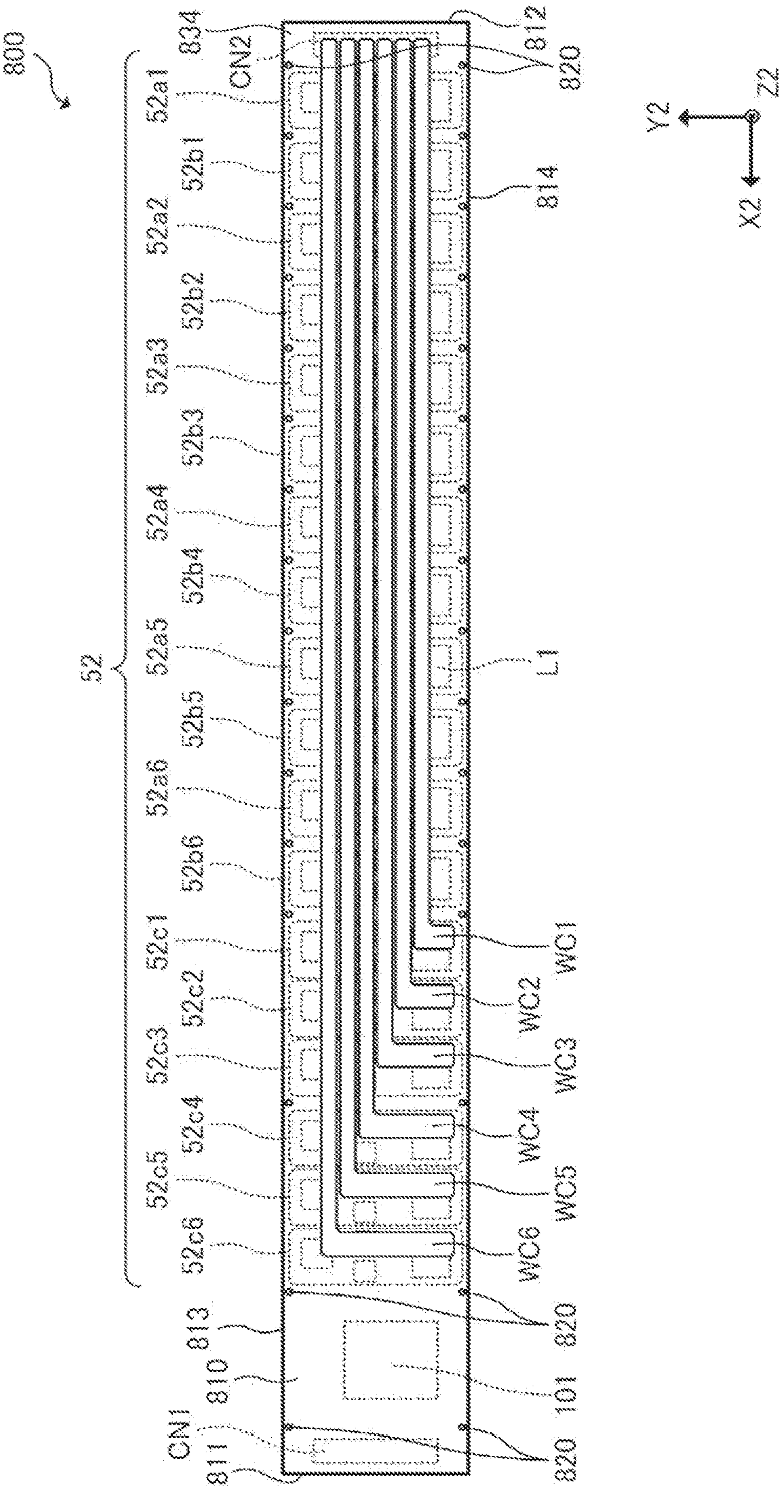
FIG. 17 is a diagram illustrating an example of a wiring pattern provided on a fourth layer of the wiring substrate.

Therefore, in the head drive module 10, an example of the configuration of the wiring pattern through which the drive signals COMA1 to COMA6, COMB1 to COMB6, and COMC1 to COMC6 output by each of the drive circuits **52*a*1 to 52*a*6, 52*b*1 to 52*b*6, and 52*c*1 to 52*c*6 propagate will be described with reference to FIGS. 15 to 17**.

Figure 15:
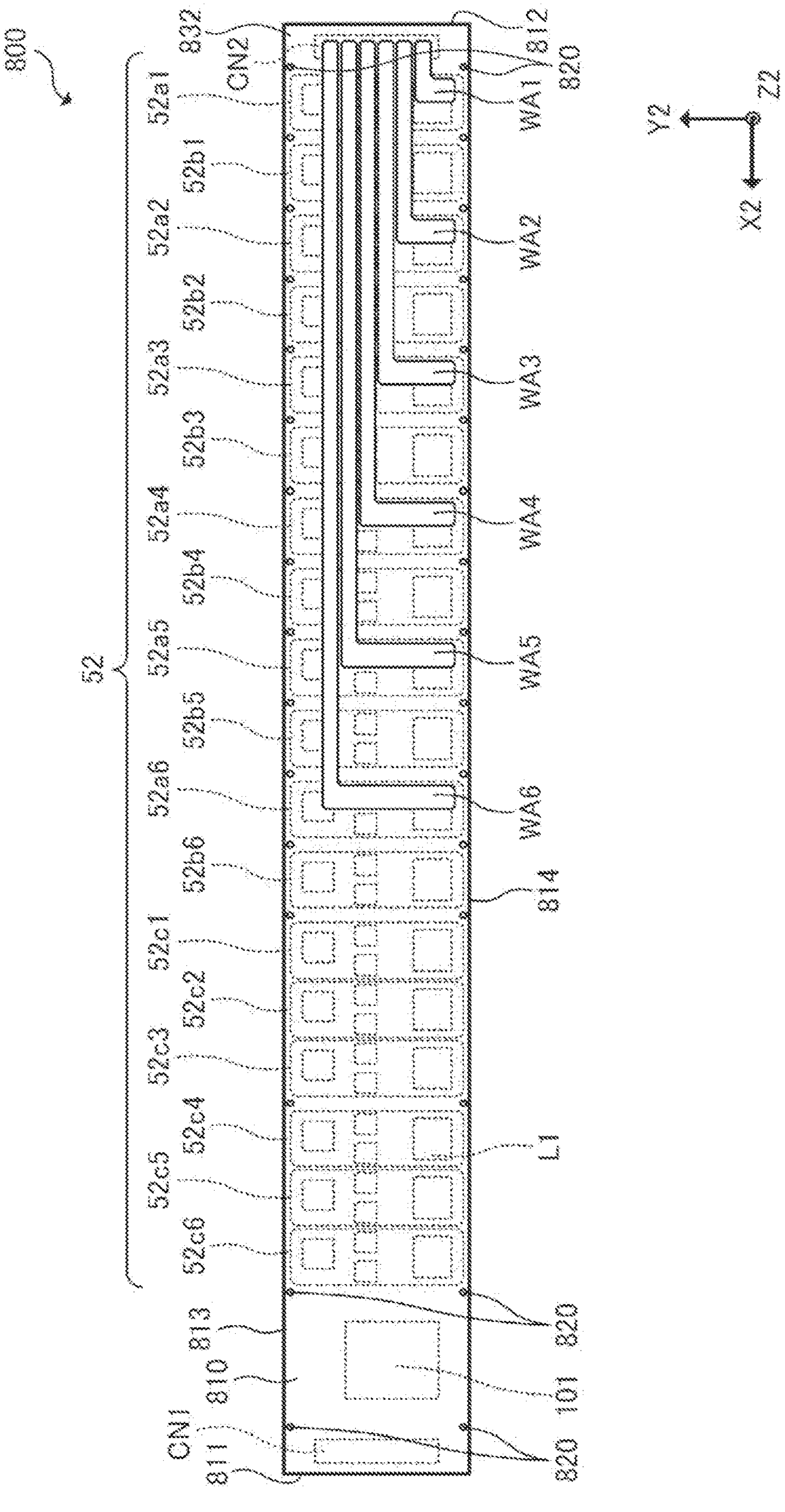
FIG. 15 is a diagram illustrating an example of a wiring pattern provided on a second layer of the wiring substrate.

FIG. 15 is a diagram illustrating an example of a wiring pattern provided on the second layer 832 of the wiring substrate 810. FIG. 16 is a diagram illustrating an example of the wiring pattern provided on the third layer 833 of the wiring substrate 810. FIG. 17 is a diagram illustrating an example of a wiring pattern provided on the fourth layer 834 of the wiring substrate 810. Here, in the head drive module 10 of the first embodiment, it is described that a plurality of wiring patterns through which the drive signals COMA1 to COMA6 propagate are provided on the second layer 832 of the wiring substrate 810, a plurality of wiring patterns through which the drive signals COMB1 to COMB6 propagate are provided on the third layer 833 of the wiring substrate 810, and the plurality of wiring patterns through which the drive signals COMC1 to COMC6 propagate are provided on the fourth layer 834 of the wiring substrate 810. FIGS. 15 to 17 are perspective views when the wiring substrate 810 is viewed from the +Z2 side to the −Z2 side along the Z2 direction, and in FIGS. 15 to 17, the plurality of drive circuits 52, the coupling portions CN1 and CN2, and the integrated circuit 101 provided on the first layer 831 of the wiring substrate 810 are illustrated by broken lines.

As illustrated in FIG. 14, the drive circuit 52*a*1 that outputs the drive signal COMA1 is located on the +X2 side of the coupling portion CN2 in the first layer 831. As illustrated in FIG. 15, one end of the inductor L1 from which the drive circuit 52*a*1 outputs the drive signal COMA1 is electrically coupled to one end of the wiring WA1 provided on the second layer 832 via a through-hole (not illustrated). The wiring WA1 extends along the X2 direction in the second layer 832. The other end of the wiring WA1 is electrically coupled to the coupling portion CN2 provided on the first layer 831 via a through-hole (not illustrated). That is, the wiring substrate 810 includes a wiring WA1 that electrically couples the drive circuit 52*a*1 and the coupling portion CN2 and propagates the drive signal COMA'. As a result, the drive signal COMA1 output by the drive circuit 52*a*1 is propagated to the coupling portion CN2.

In addition, as illustrated in FIG. 14, the drive circuit 52*b*1 that outputs the drive signal COMB' is located on the +X2 side of the drive circuit 52*a*1 in the first layer 831. As illustrated in FIG. 16, one end of the inductor L1 from which the drive circuit 52*b*1 outputs the drive signal COMB1 is electrically coupled to one end of the wiring WB1 provided on the third layer 833 via a through-hole (not illustrated). The wiring WB1 extends along the X2 direction in the third layer 833. The other end of the wiring WB1 is electrically coupled to the coupling portion CN2 provided on the first layer 831 via a through-hole (not illustrated). That is, the wiring substrate 810 includes a wiring WB1 that electrically couples the drive circuit 52*b*1 and the coupling portion CN2 and propagates the drive signal COMB1. As a result, the drive signal COMB1 output by the drive circuit 52*b*1 is propagated to the coupling portion CN2.

In addition, as illustrated in FIG. 14, the drive circuit 52*a*2 that outputs the drive signal COMA2 is located on the +X2 side of the drive circuit 52*b*1 in the first layer 831. As illustrated in FIG. 15, one end of the inductor L1 from which the drive circuit 52*a*2 outputs the drive signal COMA2 is electrically coupled to one end of the wiring WA2 provided on the second layer 832 via a through-hole (not illustrated). The wiring WA2 extends along the X2 direction in the second layer 832. The other end of the wiring WA2 is electrically coupled to the coupling portion CN2 provided on the first layer 831 via a through-hole (not illustrated). That is, the wiring substrate 810 includes the wiring WA2 that electrically couples the drive circuit 52*a*2 and the coupling portion CN2 and propagates the drive signal COMA2. As a result, the drive signal COMA2 output by the drive circuit 52*a*2 is propagated to the coupling portion CN2.

In addition, as illustrated in FIG. 14, the drive circuit 52*b*2 that outputs the drive signal COMB2 is located on the +X2 side of the drive circuit 52*a*2 in the first layer 831. As illustrated in FIG. 16, one end of the inductor L1 from which the drive circuit 52*b*2 outputs the drive signal COMB2 is electrically coupled to one end of the wiring WB2 provided on the third layer 833 via a through-hole (not illustrated). The wiring WB2 extends along the X2 direction in the third layer 833. The other end of the wiring WB2 is electrically coupled to the coupling portion CN2 provided on the first layer 831 via a through-hole (not illustrated). That is, the wiring substrate 810 includes the wiring WB2 that electrically couples the drive circuit 52*b*2 and the coupling portion CN2 and propagates the drive signal COMB2. As a result, the drive signal COMB2 output by the drive circuit 52*b*2 is propagated to the coupling portion CN2.

In addition, as illustrated in FIG. 14, the drive circuit 52*a*3 that outputs the drive signal COMA3 is located on the +X2 side of the drive circuit 52*b*2 in the first layer 831. As illustrated in FIG. 15, one end of the inductor L1 from which the drive circuit 52*a*3 outputs the drive signal COMA3 is electrically coupled to one end of the wiring WA3 provided on the second layer 832 via a through-hole (not illustrated). The wiring WA3 extends along the X2 direction in the second layer 832. The other end of the wiring WA3 is electrically coupled to the coupling portion CN2 provided on the first layer 831 via a through-hole (not illustrated). That is, the wiring substrate 810 includes a wiring WA3 that electrically couples the drive circuit 52*a*3 and the coupling portion CN2 and propagates the drive signal COMA3. As a result, the drive signal COMA3 output by the drive circuit 52*a*3 is propagated to the coupling portion CN2.

In addition, as illustrated in FIG. 14, the drive circuit 52*b*3 that outputs the drive signal COMB3 is located on the +X2 side of the drive circuit 52*a*3 in the first layer 831. As illustrated in FIG. 16, one end of the inductor L1 from which the drive circuit 52*b*3 outputs the drive signal COMB3 is electrically coupled to one end of the wiring WB3 provided on the third layer 833 via a through-hole (not illustrated). The wiring WB3 extends along the X2 direction in the third layer 833. The other end of the wiring WB3 is electrically coupled to the coupling portion CN2 provided on the first layer 831 via a through-hole (not illustrated). That is, the wiring substrate 810 includes a wiring WB3 that electrically couples the drive circuit 52*b*3 and the coupling portion CN2 and propagates the drive signal COMB3. As a result, the drive signal COMB3 output by the drive circuit 52*b*3 is propagated to the coupling portion CN2.

In addition, as illustrated in FIG. 14, the drive circuit 52*a*4 that outputs the drive signal COMA4 is located on the +X2 side of the drive circuit 52*b*3 in the first layer 831. As illustrated in FIG. 15, one end of the inductor L1 from which the drive circuit 52*a*4 outputs the drive signal COMA4 is electrically coupled to one end of the wiring WA4 provided on the second layer 832 via a through-hole (not illustrated). The wiring WA4 extends along the X2 direction in the second layer 832. The other end of the wiring WA4 is electrically coupled to the coupling portion CN2 provided on the first layer 831 via a through-hole (not illustrated). That is, the wiring substrate 810 includes a wiring WA4 that electrically couples the drive circuit 52*a*4 and the coupling portion CN2 and propagates the drive signal COMA4. As a result, the drive signal COMA4 output by the drive circuit 52*a*4 is propagated to the coupling portion CN2.

In addition, as illustrated in FIG. 14, the drive circuit 52*b*4 that outputs the drive signal COMB4 is located on the +X2 side of the drive circuit 52*a*4 in the first layer 831. As illustrated in FIG. 16, one end of the inductor L1 from which the drive circuit 52*b*4 outputs the drive signal COMB4 is electrically coupled to one end of the wiring WB4 provided on the third layer 833 via a through-hole (not illustrated). The wiring WB4 extends along the X2 direction in the third layer 833. The other end of the wiring WB4 is electrically coupled to the coupling portion CN2 provided on the first layer 831 via a through-hole (not illustrated). That is, the wiring substrate 810 includes a wiring WB4 that electrically couples the drive circuit 52*b*4 and the coupling portion CN2 and propagates the drive signal COMB4. As a result, the drive signal COMB4 output by the drive circuit 52*b*4 is propagated to the coupling portion CN2.

In addition, as illustrated in FIG. 14, the drive circuit 52*a*5 that outputs the drive signal COMA5 is located on the +X2 side of the drive circuit 52*b*4 in the first layer 831. As illustrated in FIG. 15, one end of the inductor L1 from which the drive circuit 52*a*5 outputs the drive signal COMA5 is electrically coupled to one end of the wiring WA5 provided on the second layer 832 via a through-hole (not illustrated). The wiring WA5 extends along the X2 direction in the second layer 832. The other end of the wiring WA5 is electrically coupled to the coupling portion CN2 provided on the first layer 831 via a through-hole (not illustrated). That is, the wiring substrate 810 includes a wiring WA5 that electrically couples the drive circuit 52*a*5 and the coupling portion CN2 and propagates the drive signal COMA5. As a result, the drive signal COMA5 output by the drive circuit 52*a*5 is propagated to the coupling portion CN2.

In addition, as illustrated in FIG. 14, the drive circuit 52*b*5 that outputs the drive signal COMB5 is located on the +X2 side of the drive circuit 52*a*5 in the first layer 831. As illustrated in FIG. 16, one end of the inductor L1 from which the drive circuit 52*b*5 outputs the drive signal COMB5 is electrically coupled to one end of the wiring WB5 provided on the third layer 833 via a through-hole (not illustrated). The wiring WB5 extends along the X2 direction in the third layer 833. The other end of the wiring WB5 is electrically coupled to the coupling portion CN2 provided on the first layer 831 via a through-hole (not illustrated). That is, the wiring substrate 810 includes a wiring WB5 that electrically couples the drive circuit 52*b*5 and the coupling portion CN2 and propagates the drive signal COMB5. As a result, the drive signal COMB5 output by the drive circuit 52*b*5 is propagated to the coupling portion CN2.

In addition, as illustrated in FIG. 14, the drive circuit 52*a*6 that outputs the drive signal COMA6 is located on the +X2 side of the drive circuit 52*b*5 in the first layer 831. As illustrated in FIG. 15, one end of the inductor L1 from which the drive circuit 52*a*6 outputs the drive signal COMA6 is electrically coupled to one end of the wiring WA6 provided on the second layer 832 via a through-hole (not illustrated). The wiring WA6 extends along the X2 direction in the second layer 832.

The other end of the wiring WA6 is electrically coupled to the coupling portion CN2 provided on the first layer 831 via a through-hole (not illustrated). That is, the wiring substrate 810 includes a wiring WA6 that electrically couples the drive circuit 52*a*6 and the coupling portion CN2 and propagates the drive signal COMA6. As a result, the drive signal COMA6 output by the drive circuit 52*a*6 is propagated to the coupling portion CN2.

In addition, as illustrated in FIG. 14, the drive circuit 52*b*6 that outputs the drive signal COMB6 is located on the +X2 side of the drive circuit 52*a*6 in the first layer 831. As illustrated in FIG. 16, one end of the inductor L1 from which the drive circuit 52*b*6 outputs the drive signal COMB6 is electrically coupled to one end of the wiring WB6 provided on the third layer 833 via a through-hole (not illustrated). The wiring WB6 extends along the X2 direction in the third layer 833. The other end of the wiring WB6 is electrically coupled to the coupling portion CN2 provided on the first layer 831 via a through-hole (not illustrated). That is, the wiring substrate 810 includes a wiring WB6 that electrically couples the drive circuit 52*b*6 and the coupling portion CN2 and propagates the drive signal COMB6. As a result, the drive signal COMB6 output by the drive circuit 52*b*6 is propagated to the coupling portion CN2.

In addition, as illustrated in FIG. 14, the drive circuit 52*c*1 that outputs the drive signal COMC1 is located on the +X2 side of the drive circuit 52*b*6 in the first layer 831. As illustrated in FIG. 17, one end of the inductor L1 from which the drive circuit 52*c*1 outputs the drive signal COMC1 is electrically coupled to one end of the wiring WC1 provided on the fourth layer 834 via a through-hole (not illustrated). The wiring WC1 extends along the X2 direction in the fourth layer 834. The other end of the wiring WC1 is electrically coupled to the coupling portion CN2 provided on the first layer 831 via a through-hole (not illustrated). That is, the wiring substrate 810 includes a wiring WC1 that electrically couples the drive circuit 52*c*1 and the coupling portion CN2 and propagates the drive signal COMC1. As a result, the drive signal COMC1 output by the drive circuit 52*c*1 is propagated to the coupling portion CN2.

In addition, as illustrated in FIG. 14, the drive circuit 52*c*2 that outputs the drive signal COMC2 is located on the +X2 side of the drive circuit 52*c*1 in the first layer 831. As illustrated in FIG. 17, one end of the inductor L1 from which the drive circuit 52*c*2 outputs the drive signal COMC2 is electrically coupled to one end of the wiring WC2 provided on the fourth layer 834 via a through-hole (not illustrated). The wiring WC2 extends along the X2 direction in the fourth layer 834. The other end of the wiring WC2 is electrically coupled to the coupling portion CN2 provided on the first layer 831 via a through-hole (not illustrated). That is, the wiring substrate 810 includes a wiring WC2 that electrically couples the drive circuit 52*c*2 and the coupling portion CN2 and propagates the drive signal COMC2. As a result, the drive signal COMC2 output by the drive circuit 52*c*2 is propagated to the coupling portion CN2.

In addition, as illustrated in FIG. 14, the drive circuit 52*c*3 that outputs the drive signal COMC3 is located on the +X2 side of the drive circuit 52*c*2 in the first layer 831. As illustrated in FIG. 17, one end of the inductor L1 from which the drive circuit 52*c*3 outputs the drive signal COMC3 is electrically coupled to one end of the wiring WC3 provided on the fourth layer 834 via a through-hole (not illustrated). The wiring WC3 extends along the X2 direction in the fourth layer 834. The other end of the wiring WC3 is electrically coupled to the coupling portion CN2 provided on the first layer 831 via a through-hole (not illustrated). That is, the wiring substrate 810 includes a wiring WC3 that electrically couples the drive circuit 52*c*3 and the coupling portion CN2 and propagates the drive signal COMC3. As a result, the drive signal COMC3 output by the drive circuit 52*c*3 is propagated to the coupling portion CN2.

In addition, as illustrated in FIG. 14, the drive circuit 52*c*4 that outputs the drive signal COMC4 is located on the +X2 side of the drive circuit 52*c*3 in the first layer 831. As illustrated in FIG. 17, one end of the inductor L1 from which the drive circuit 52*c*4 outputs the drive signal COMC4 is electrically coupled to one end of the wiring WC4 provided on the fourth layer 834 via a through-hole (not illustrated). The wiring WC4 extends along the X2 direction in the fourth layer 834. The other end of the wiring WC4 is electrically coupled to the coupling portion CN2 provided on the first layer 831 via a through-hole (not illustrated). That is, the wiring substrate 810 includes a wiring WC4 that electrically couples the drive circuit 52*c*4 and the coupling portion CN2 and propagates the drive signal COMC4. As a result, the drive signal COMC4 output by the drive circuit 52*c*4 is propagated to the coupling portion CN2.

In addition, as illustrated in FIG. 14, the drive circuit 52*c*5 that outputs the drive signal COMC5 is located on the +X2 side of the drive circuit 52*c*4 in the first layer 831. As illustrated in FIG. 17, one end of the inductor L1 from which the drive circuit 52*c*5 outputs the drive signal COMC5 is electrically coupled to one end of the wiring WC5 provided on the fourth layer 834 via a through-hole (not illustrated). The wiring WC5 extends along the X2 direction in the fourth layer 834. The other end of the wiring WC5 is electrically coupled to the coupling portion CN2 provided on the first layer 831 via a through-hole (not illustrated). That is, the wiring substrate 810 includes a wiring WC5 that electrically couples the drive circuit 52*c*5 and the coupling portion CN2 and propagates the drive signal COMC5. As a result, the drive signal COMC5 output by the drive circuit 52*c*5 is propagated to the coupling portion CN2.

In addition, as illustrated in FIG. 14, the drive circuit 52*c*6 that outputs the drive signal COMC6 is located on the +X2 side of the drive circuit 52*c*5 in the first layer 831. As illustrated in FIG. 17, one end of the inductor L1 from which the drive circuit 52*c*6 outputs the drive signal COMC6 is electrically coupled to one end of the wiring WC6 provided on the fourth layer 834 via a through-hole (not illustrated). The wiring WC6 extends along the X2 direction in the fourth layer 834. The other end of the wiring WC6 is electrically coupled to the coupling portion CN2 provided on the first layer 831 via a through-hole (not illustrated). That is, the wiring substrate 810 includes a wiring WC6 that electrically couples the drive circuit 52*c*6 and the coupling portion CN2 and propagates the drive signal COMC6. As a result, the drive signal COMC6 output by the drive circuit 52*c*6 is propagated to the coupling portion CN2.

As described above, in the liquid discharge device 1 of the first embodiment, the drive circuit substrate 800 of the head drive module 10 is provided with the drive circuits 52*a*1 to 52*a*6, 52*b*1 to 52*b*6, and 52*c*1 to 52*c*6 as the plurality of drive circuits 52, and the wiring substrate 810 included in the drive circuit substrate 800 includes the wirings WA1 to WA6, WB1 to WB6, and WC1 to WC6 as the plurality of wiring patterns for electrically coupling each of the plurality of drive circuits 52 and the coupling portion CN2. The drive circuits 52*a*1 to 52*a*6, 52*b*1 to 52*b*6, and 52*c*1 to 52*c*6 are arranged side by side in the order of the drive circuits 52*a*1, 52*b*1, 52*a*2, 52*b*2, 52*a*3, 52*b*3, 52*a*4, 52*b*4, 52*a*5, 52*b*5, 52*a*6, 52*b*6, 52*c*1, 52*c*2, 52*c*3, 52*c*4, 52*c*5, and 52*c*6 from the +X2 side to the −X2 side along the X2 direction in the wiring substrate 810.

That is, the drive circuits 52*a*1, 52*b*1, and 52*c*1 that output the drive signals COMA1, COMB1, and COMC1 to the piezoelectric element 60 included in the discharge module 23-1 are located in the order of the drive circuit 52*a*1, the drive circuit 52*b*1, and the drive circuit 52*c*1 along the X2 direction from the side 812 where the coupling portion CN2 is located to the side 811 where the coupling portion CN1 is located, in the first layer 831 of the wiring substrate 810. Therefore, the length of the wiring WA1 that electrically couples the drive circuit 52*a*1 and the coupling portion CN2 is shorter than the lengths of the wiring WB1 that electrically couples the drive circuit 52*b*1 and the coupling portion CN2 and the wiring WC1 that electrically couples the drive circuit 52*c*1 and the coupling portion CN2. The length of the wiring WB1 that electrically couples the drive circuit 52*b*1 and the coupling portion CN2 is shorter than the length of the wiring WC1 that electrically couples the drive circuit 52*c*1 and the coupling portion CN2. That is, the wiring WB1 is longer than the wiring WA1 and shorter than the wiring WC1.

In addition, the drive circuits 52*a*2, 52*b*2, and 52*c*2 that output the drive signals COMA2, COMB2, and COMC2 to the piezoelectric element 60 included in the discharge module 23-2 are located in the order of the drive circuit 52*a*2, the drive circuit 52*b*2, and the drive circuit 52*c*2 along the X2 direction from the side 812 where the coupling portion CN2 is located to the side 811 where the coupling portion CN1 is located, in the first layer 831 of the wiring substrate 810. Therefore, the length of the wiring WA2 that electrically couples the drive circuit 52*a*2 and the coupling portion CN2 is shorter than the lengths of the wiring WB2 that electrically couples the drive circuit 52*b*2 and the coupling portion CN2 and the wiring WC2 that electrically couples the drive circuit 52*c*2 and the coupling portion CN2. The length of the wiring WB2 that electrically couples the drive circuit 52*b*2 and the coupling portion CN2 is shorter than the length of the wiring WC2 that electrically couples the drive circuit 52*c*2 and the coupling portion CN2. That is, the wiring WB2 is longer than the wiring WA2 and shorter than the wiring WC2.

In addition, the drive circuits 52*a*3, 52*b*3, and 52*c*3 that output the drive signals COMA3, COMB3, and COMC3 to the piezoelectric element 60 included in the discharge module 23-3 are located in the order of the drive circuit 52*a*3, the drive circuit 52*b*3, and the drive circuit 52*c*3 along the X2 direction from the side 812 where the coupling portion CN2 is located to the side 811 where the coupling portion CN1 is located, in the first layer 831 of the wiring substrate 810. Therefore, the length of the wiring WA3 that electrically couples the drive circuit 52*a*3 and the coupling portion CN2 is shorter than the lengths of the wiring WB3 that electrically couples the drive circuit 52*b*3 and the coupling portion CN2 and the wiring WC3 that electrically couples the drive circuit 52*c*3 and the coupling portion CN2. The length of the wiring WB3 that electrically couples the drive circuit 52*b*3 and the coupling portion CN2 is shorter than the length of the wiring WC3 that electrically couples the drive circuit 52*c*3 and the coupling portion CN2. That is, the wiring WB3 is longer than the wiring WA3 and shorter than the wiring WC3.

In addition, the drive circuits 52*a*4, 52*b*4, and 52*c*4 that output the drive signals COMA4, COMB4, and COMC4 to the piezoelectric element 60 included in the discharge module 23-4 are located in the order of the drive circuit 52*a*4, the drive circuit 52*b*4, and the drive circuit 52*c*4 along the X2 direction from the side 812 where the coupling portion CN2 is located to the side 811 where the coupling portion CN1 is located, in the first layer 831 of the wiring substrate 810. Therefore, the length of the wiring WA4 that electrically couples the drive circuit 52*a*4 and the coupling portion CN2 is shorter than the lengths of the wiring WB4 that electrically couples the drive circuit 52*b*4 and the coupling portion CN2 and the wiring WC4 that electrically couples the drive circuit 52*c*4 and the coupling portion CN2. The length of the wiring WB4 that electrically couples the drive circuit 52*b*4 and the coupling portion CN2 is shorter than the length of the wiring WC4 that electrically couples the drive circuit 52*c*4 and the coupling portion CN2. That is, the wiring WB4 is longer than the wiring WA4 and shorter than the wiring WC4.

In addition, the drive circuits 52*a*5, 52*b*5, and 52*c*5 that output the drive signals COMA5, COMB5, and COMC5 to the piezoelectric element 60 included in the discharge module 23-5 are located in the order of the drive circuit 52*a*5, the drive circuit 52*b*5, and the drive circuit 52*c*5 along the X2 direction from the side 812 where the coupling portion CN2 is located to the side 811 where the coupling portion CN1 is located, in the first layer 831 of the wiring substrate 810. Therefore, the length of the wiring WA5 that electrically couples the drive circuit 52*a*5 and the coupling portion CN2 is shorter than the lengths of the wiring WB5 that electrically couples the drive circuit 52*b*5 and the coupling portion CN2 and the wiring WC5 that electrically couples the drive circuit 52*c*5 and the coupling portion CN2. The length of the wiring WB5 that electrically couples the drive circuit 52*b*5 and the coupling portion CN2 is shorter than the length of the wiring WC5 that electrically couples the drive circuit 52*c*5 and the coupling portion CN2. That is, the wiring WB5 is longer than the wiring WA5 and shorter than the wiring WC5.

In addition, the drive circuits 52_a_6, 52_b_6, and 52_c_6 that output the drive signals COMA6, COMB6, and COMC6 to the piezoelectric element 60 included in the discharge module 23-6 are located in the order of the drive circuit 52_a_6, the drive circuit 52_b_6, and the drive circuit 52_c_6 along the X2 direction from the side 812 where the coupling portion CN2 is located to the side 811 where the coupling portion CN1 is located, in the first layer 831 of the wiring substrate 810. Therefore, the length of the wiring WA6 that electrically couples the drive circuit 52_a_6 and the coupling portion CN2 is shorter than the lengths of the wiring WB6 that electrically couples the drive circuit 52_b_6 and the coupling portion CN2 and the wiring WC6 that electrically couples the drive circuit 52_c_6 and the coupling portion CN2. The length of the wiring WB6 that electrically couples the drive circuit 52_b_6 and the coupling portion CN2 is shorter than the length of the wiring WC6 that electrically couples the drive circuit 52_c_6 and the coupling portion CN2. That is, the wiring WB6 is longer than the wiring WA6 and shorter than the wiring WC6.

As illustrated in FIG. 14, in the liquid discharge device 1 of the first embodiment, the drive circuits 52_a_1 and 52_b_1 that output the drive signals COMA1 and COMB1 for driving the corresponding piezoelectric element 60 so that the ink is discharged from the discharge portion 600 included in the discharge module 23-1, the drive circuits 52_a_2 and 52_b_2 that output the drive signals COMA2 and COMB2 for driving the corresponding piezoelectric element 60 so that the ink is discharged from the discharge portion 600 included in the discharge module 23-2, the drive circuits 52_a_3 and 52_b_3 that output the drive signals COMA3 and COMB3 for driving the corresponding piezoelectric element 60 so that the ink is discharged from the discharge portion 600 included in the discharge module 23-3, the drive circuits 52_a_4 and 52_b_4 that output the drive signals COMA4 and COMB4 for driving the corresponding piezoelectric element 60 so that the ink is discharged from the discharge portion 600 included in the discharge module 23-4, the drive circuits 52_a_5 and 52_b_5 that output the drive signals COMA5 and COMB5 for driving the corresponding piezoelectric element 60 so that the ink is discharged from the discharge portion 600 included in the discharge module 23-5, and the drive circuits 52_a_6 and 52_b_6 that output the drive signals COMA6 and COMB6 for driving the corresponding piezoelectric element 60 so that the ink is discharged from the discharge portion 600 included in the discharge module 23-6 are located in this order from the side 812 where the coupling portion CN2 is located toward the side 811 where the coupling portion CN1 is located on the first layer 831 of the wiring substrate 810. The drive circuits 52_c_1 to 52_c_6 that output the drive signals COMC1 to COMC6 for driving the corresponding piezoelectric elements 60 so that the ink does not discharge are located in the order of the drive circuits 52_c_1, 52_c_2, 52_c_3, 52_c_4, 52_c_5, and 52_c_6 on the +X2 side of the drive circuits 52_a_1 to 52_a_6 and 52_b_1 to 52_b_6 from the side 812 where the coupling portion CN2 is located toward the side 811 where the coupling portion CN1 is located on the first layer 831 of the wiring substrate 810.

That is, the drive circuit 52_a_1 that outputs the drive signal COMA1 for driving the corresponding piezoelectric element 60 so that the ink is discharged from the discharge portion 600 included in the discharge module 23-1 is located closest in the vicinity of the coupling portion CN2 among the plurality of drive circuits 52 arranged side by side on the wiring substrate 810 along the X2 direction. The drive circuit 52_c_6 that outputs the drive signal COMC6 for driving the corresponding piezoelectric element 60 so that the ink is not discharged from the discharge portion 600 included in the discharge module 23-6 is located farthest from the coupling portion CN2 among the plurality of drive circuits 52 arranged side by side on the wiring substrate 810 along the X2 direction.

Therefore, the length of the wiring WA1 that electrically couples the drive circuit 52_a_1 and the coupling portion CN2 is shorter than the length of the wirings WA2 to WA6, WB1 to WB6, WC1 to WC6 that electrically couples each of the drive circuits 52_a_2 to 52_a_6, 52_b_1 to 52_b_6, and 52_c_1 to 52_c_6 and the coupling portion CN2. The length of the wiring WC6 that electrically couples the drive circuit 52_c_6 and the coupling portion CN2 is longer than the length of the wirings WA1 to WA6, WB1 to WB6, and WC1 to WC5 that electrically couples each of the drive circuits 52_a_1 to 52_a_6, 52_b_1 to 52_b_6, and 52_c_1 to 52_c_5 and the coupling portion CN2. That is, the wiring substrate 810 includes the plurality of wiring patterns that electrically couple the plurality of drive circuits 52 and the coupling portion CN2, and among the plurality of wiring patterns, the length of the wiring WA1 that electrically couples the drive circuit 52_a_1 and the coupling portion CN2 is the shortest, and the length of the wiring WC6 that electrically couples the drive circuit 52_c_6 and the coupling portion CN2 is the longest.

In the head drive module 10 configured as described above, as described above, the voltage amplitudes of the drive signals COMA1 and COMB1 drive the piezoelectric element 60 so that the ink is discharged from the nozzle N of the discharge module 23-1. Therefore, the voltage amplitude is larger than the voltage amplitude of the drive signal COMC1 for driving the piezoelectric element 60 so that the ink is not discharged from the nozzle N of the discharge module 23-1. That is, the amount of current generated by the propagation of the drive signals COMA1 and COMB1 is larger than the amount of current generated by the propagation of the drive signals COMC1. Therefore, the drive signals COMA1 and COMB1 are easily affected by the impedance generated in the wiring pattern as compared with the drive signal COMC1. By making the wiring lengths of the wirings WA1 and WB1 through which the drive signals COMA1 and COMB1 easily affected by the impedance generated in such a wiring pattern propagate shorter than the wiring length of the wiring WC1 through which the drive signal COMC1 propagates, it is possible to improve the waveform accuracy of the drive signals COMA1 and COMB1 that directly contribute to the discharge of ink. As a result, the discharge accuracy of the ink in the liquid discharge device 1 is improved.

Furthermore, the amount of ink discharged from the corresponding nozzle N when the drive signal COMA1 is supplied to the piezoelectric element 60 is larger than the amount of ink discharged from the corresponding nozzle N when the drive signal COMB1 is supplied to the piezoelectric element 60. Therefore, the voltage amplitude of the drive signal COMA1 is larger than the voltage amplitude of the drive signal COMB1, and the amount of current generated by the propagation of the drive signal COMA1 is larger than the amount of current generated by the propagation of the drive signal COMB1. Therefore, by making the wiring length of the wiring WA1 through which the drive signal COMA1 propagates shorter than the wiring length of the wiring WB1 through which the drive signal COMB1 propagates, the possibility that the waveform accuracy of the drive signal COMA1 is decreased due to the influence of the impedance generated in the wiring pattern is reduced.

Similarly, the amount of current generated by the propagation of the drive signals COMA2 and COMB2 supplied to the piezoelectric element 60 included in the discharge module 23-2 is larger than the amount of current generated by the propagation of the drive signal COMC2, and the amount of current generated by the propagation of the drive signal COMA2 is larger than the amount of current generated by the propagation of the drive signal COMB2. Therefore, by making the wiring lengths of the wiring WA2 and WB2 through which the drive signals COMA2 and COMB2 propagate shorter than the wiring length of the wiring WC2 propagating by the drive signal COMC2, the waveform accuracy of the drive signals COMA2 and COMB2 output from the head drive module 10 can be improved. Furthermore, by making the wiring length of the wiring WA2 through which the drive signal COMA2 propagates shorter than the wiring length of the wiring WB2 through which the drive signal COMB2 propagates, the possibility that the waveform accuracy of the drive signal COMA2 is decreased is reduced, and the discharge accuracy of the ink in the liquid discharge device 1 is improved.

Similarly, the amount of current generated by the propagation of the drive signals COMA3 and COMB3 supplied to the piezoelectric element 60 included in the discharge module 23-3 is larger than the amount of current generated by the propagation of the drive signal COMC3, and the amount of current generated by the propagation of the drive signal COMA3 is larger than the amount of current generated by the propagation of the drive signal COMB3. Therefore, by making the wiring lengths of the wiring WA3 and WB3 through which the drive signals COMA3 and COMB3 propagate shorter than the wiring length of the wiring WC3 through which the drive signal COMC3 propagates, the waveform accuracy of the drive signals COMA3 and COMB3 output from the head drive module 10 can be improved. Furthermore, by making the wiring length of the wiring WA3 through which the drive signal COMA3 propagates shorter than the wiring length of the wiring WB3 through which the drive signal COMB3 propagates, the possibility that the waveform accuracy of the drive signal COMA3 is decreased is reduced, and the discharge accuracy of the ink in the liquid discharge device 1 is improved.

Similarly, the amount of current generated by the propagation of the drive signals COMA4 and COMB4 supplied to the piezoelectric element 60 included in the discharge module 23-4 is larger than the amount of current generated by the propagation of the drive signal COMC4, and the amount of current generated by the propagation of the drive signal COMA4 is larger than the amount of current generated by the propagation of the drive signal COMB4. Therefore, by making the wiring lengths of the wiring WA4 and WB4 through which the drive signals COMA4 and COMB4 propagate shorter than the wiring length of the wiring WC4 through which the drive signal COMC4 propagates, the waveform accuracy of the drive signals COMA4 and COMB4 output from the head drive module 10 can be improved. Furthermore, by making the wiring length of the wiring WA4 through which the drive signal COMA4 propagates shorter than the wiring length of the wiring WB4 through which the drive signal COMB4 propagates, the possibility that the waveform accuracy of the drive signal COMA4 is decreased is reduced, and the discharge accuracy of the ink in the liquid discharge device 1 is improved.

Similarly, the amount of current generated by the propagation of the drive signals COMA5 and COMB5 supplied to the piezoelectric element 60 included in the discharge module 23-5 is larger than the amount of current generated by the propagation of the drive signal COMC5, and the amount of current generated by the propagation of the drive signal COMA5 is larger than the amount of current generated by the propagation of the drive signal COMB5. Therefore, by making the wiring lengths of the wiring WA5 and WB5 through which the drive signals COMA5 and COMB5 propagate shorter than the wiring length of the wiring WC5 through which the drive signal COMC5 propagates, the waveform accuracy of the drive signals COMA5 and COMB5 output from the head drive module 10 can be improved. Furthermore, by making the wiring length of the wiring WA5 through which the drive signal COMA5 propagates shorter than the wiring length of the wiring WB5 through which the drive signal COMB5 propagates, the possibility that the waveform accuracy of the drive signal COMA5 is decreased is reduced, and the discharge accuracy of the ink in the liquid discharge device 1 is improved.

Similarly, the amount of current generated by the propagation of the drive signals COMA6 and COMB6 supplied to the piezoelectric element 60 included in the discharge module 23-6 is larger than the amount of current generated by the propagation of the drive signal COMC6, and the amount of current generated by the propagation of the drive signal COMA6 is larger than the amount of current generated by the propagation of the drive signal COMB6. Therefore, by making the wiring lengths of the wiring WA6 and WB6 through which the drive signals COMA6 and COMB6 propagate shorter than the wiring length of the wiring WC6 through which the drive signal COMC6 propagates, the waveform accuracy of the drive signals COMA6 and COMB6 output from the head drive module 10 can be improved. Furthermore, by making the wiring length of the wiring WA6 through which the drive signal COMA6 propagates shorter than the wiring length of the wiring WB6 through which the drive signal COMB6 propagates, the possibility that the waveform accuracy of the drive signal COMA6 is decreased is reduced, and the discharge accuracy of the ink in the liquid discharge device 1 is improved.

Furthermore, in the liquid discharge device 1 of the first embodiment, the drive circuits **52*a*1 to 52*a*6 and 52*b*1 to 52*b*6 that output the drive signals COMA1 to COMA6 and COMB1 to COMB6 for driving the piezoelectric element 60 included in the discharge modules 23-1 to 23-6 so that the ink is discharged from the corresponding nozzle N are located in the vicinity of the coupling portion CN2 than the drive circuits 52*c*1 to 52*c*6 that output the drive signals COMC1 to COMC6 for driving the piezoelectric elements 60 included in the discharge modules 23-1 to 23-6 so that the ink is not discharged from the corresponding nozzle N. As a result, as illustrated in FIGS. 15 to 17, the wiring lengths of the wirings WA1 to WA6 and WB1 to WB6 that electrically couple each of the drive circuits 52*a*1, 52*b*1, 52*a*2, 52*b*2, 52*a*3, 52*b*3, 52*a*4, 52*b*4, 52*a*5, 52*b*5, 52*a*6, and 52*b*6 and the coupling portion CN2 and propagate the drive signals COMA1 to COMA6 and COMB1 to COMB6 can be made shorter than the wiring lengths of the wirings WC1 to WC6 that electrically couples each of the drive circuits 52*c*1, 52*c*2, 52*c*3, 52*c*4, 52*c*5, and 52*c*6 and the coupling portion CN2 and propagate the drive signals COMC1 to COMC6**.

That is, the wiring lengths of the wirings WA1 to WA6 and WB1 to WB6 through which the drive signals COMA1 to COMA6 and COMB1 to COMB6 having a large amount of current generated by propagation propagate can be made shorter than the wiring lengths of the wirings WC1 to WC6 through which the drive signals COMC1 to COMC6 having a small amount of current generated by propagation propagate. As a result, the waveform accuracy of the drive signals COMA1 to COMA6 and COMB1 to COMB6 that directly contribute to the discharge of ink can be further improved. The discharge accuracy of the ink of the liquid discharge device 1 is further improved.

Here, in the drive circuit substrate 800 of the first embodiment, it is described that the drive circuits 52*a*1 to 52*a*6, 52*b*1 to 52*b*6, and 52*c*1 to 52*c*6 are provided on the first layer 831 of the wiring substrate 810, the wirings WA1 to WA6 propagating the drive signals COMA1 to COMA6 are provided on the second layer 832 of the wiring substrate 810, the wirings WB1 to WB6 propagating the drive signals COMB1 to COMB6 are provided on the third layer 833, and the wirings WC1 to WC6 propagating the drive signals COMC1 to COMC6 are provided on the fourth layer 834, but the disclosure is not limited thereto. For example, a part of the drive circuits 52*a*1 to 52*a*6, 52*b*1 to 52*b*6, and 52*c*1 to 52*c*6 may be provided on the second layer 832, the third layer 833, the fourth layer 834, and the fifth layer 835. In addition, at least a part of the wirings WA1 to WA6 propagating the drive signals COMA1 to COMA6, the wirings WB1 to WB6 propagating the drive signals COMB1 to COMB6, and the wirings WC1 to WC6 propagating the drive signals COMC1 to COMC6 may be provided on the same wiring layer. Furthermore, on the drive circuit substrate 800 of the first embodiment, the case where the second layer 832, the third layer 833, and the fourth layer 834 are laminated in the order of the second layer 832, the third layer 833, and the fourth layer 834 from the +Z2 side to the −Z2 side along the Z2 direction is illustrated, but the laminating order on the wiring substrate 810 is not limited thereto. Further, in the first embodiment, it is described that the wiring substrate 810 includes the second layer 832, the third layer 833, and the fourth layer 834 as inner layers, but the wiring substrate 810 may include a plurality of inner layers such as a layer in which the reference voltage signals VBS1 to VBS6 are propagated, a layer in which various control signals including the data signal DATA are propagated, and a layer held at the ground potential as an inner layer.

In addition, as illustrated in FIG. 14, the wiring substrate 810 includes a plurality of through-holes 820 through which a plurality of screws 780 are inserted. Some of the plurality of through-holes 820 are arranged side by side along the side 813 of the wiring substrate 810, and some of the different through-holes 820 are arranged side by side along the side 814 of the wiring substrate 810. That is, the wiring substrate 810 includes a plurality of through-holes 820 arranged side by side in two rows along the X2 direction. Here, being arranged side by side along the side 813 of the wiring substrate 810 means that the plurality of through-holes 820 are arranged side by side along the X2 direction in a state where the shortest distance between each of the plurality of through-holes 820 arranged side by side and the side 813 of the wiring substrate 810 is shorter than the shortest distance from the side 814 of the wiring substrate 810. Being arranged side by side along the side 814 of the wiring substrate 810 means that the plurality of through-holes 820 are arranged side by side along the X2 direction in a state where the shortest distance between each of the plurality of through-holes 820 arranged side by side and the side 814 of the wiring substrate 810 is shorter than the shortest distance from the side 813 of the wiring substrate 810.

At least one of the plurality of through-holes 820 arranged side by side along the side 813 of the wiring substrate 810, and at least one of the plurality of through-holes 820 arranged side by side along the side 814 of the wiring substrate 810 are located between the coupling portion CN2 and the drive circuit 52*a*1. That is, at least one of the plurality of through-holes 820 is located between the coupling portion CN2 and the drive circuit 52*a*1 in the direction along the X2 direction.

At least one different of the plurality of through-holes 820 arranged side by side along the sides 813 of the wiring substrate 810, and at least one different of the plurality of through-holes 820 arranged side by side along the sides 814 of the wiring substrate 810 are located between the drive circuit 52*a*1 and the drive circuit 52*b*1. That is, at least one of the plurality of through-holes 820 is located between the drive circuit 52*a*1 and the drive circuit 52*b*1 in the direction along the X2 direction.

At least one different of the plurality of through-holes 820 arranged side by side along the sides 813 of the wiring substrate 810, and at least one different of the plurality of through-holes 820 arranged side by side along the sides 814 of the wiring substrate 810 are located between the drive circuit 52*b*1 and the drive circuit 52*a*2. That is, at least one of the plurality of through-holes 820 is located between the drive circuit 52*b*1 and the drive circuit 52*a*2 in the direction along the X2 direction.

At least one different of the plurality of through-holes 820 arranged side by side along the sides 813 of the wiring substrate 810, and at least one different of the plurality of through-holes 820 arranged side by side along the sides 814 of the wiring substrate 810 are located between the drive circuit 52*a*2 and the drive circuit 52*b*2. That is, at least one of the plurality of through-holes 820 is located between the drive circuit 52*a*2 and the drive circuit 52*b*2 in the direction along the X2 direction.

At least one different of the plurality of through-holes 820 arranged side by side along the sides 813 of the wiring substrate 810, and at least one different of the plurality of through-holes 820 arranged side by side along the sides 814 of the wiring substrate 810 are located between the drive circuit 52*b*2 and the drive circuit 52*a*3. That is, at least one of the plurality of through-holes 820 is located between the drive circuit 52*b*2 and the drive circuit 52*a*3 in the direction along the X2 direction.

At least one different of the plurality of through-holes 820 arranged side by side along the sides 813 of the wiring substrate 810, and at least one different of the plurality of through-holes 820 arranged side by side along the sides 814 of the wiring substrate 810 are located between the drive circuit 52*a*3 and the drive circuit 52*b*3. That is, at least one of the plurality of through-holes 820 is located between the drive circuit 52*a*3 and the drive circuit 52*b*3 in the direction along the X2 direction.

At least one different of the plurality of through-holes 820 arranged side by side along the sides 813 of the wiring substrate 810, and at least one different of the plurality of through-holes 820 arranged side by side along the sides 814 of the wiring substrate 810 are located between the drive circuit 52*b*3 and the drive circuit 52*a*4. That is, at least one of the plurality of through-holes 820 is located between the drive circuit 52*b*3 and the drive circuit 52*a*4 in the direction along the X2 direction.

At least one different of the plurality of through-holes 820 arranged side by side along the sides 813 of the wiring substrate 810, and at least one different of the plurality of through-holes 820 arranged side by side along the sides 814 of the wiring substrate 810 are located between the drive circuit 52*a*4 and the drive circuit 52*b*4. That is, at least one of the plurality of through-holes 820 is located between the drive circuit 52*a*4 and the drive circuit 52*b*4 in the direction along the X2 direction.

At least one different of the plurality of through-holes 820 arranged side by side along the sides 813 of the wiring substrate 810, and at least one different of the plurality of through-holes 820 arranged side by side along the sides 814 of the wiring substrate 810 are located between the drive circuit 52*b*4 and the drive circuit 52*a*5. That is, at least one of the plurality of through-holes 820 is located between the drive circuit 52*b*4 and the drive circuit 52*a*5 in the direction along the X2 direction.

At least one different of the plurality of through-holes 820 arranged side by side along the sides 813 of the wiring substrate 810, and at least one different of the plurality of through-holes 820 arranged side by side along the sides 814 of the wiring substrate 810 are located between the drive circuit 52*a*5 and the drive circuit 52*b*5. That is, at least one of the plurality of through-holes 820 is located between the drive circuit 52*a*5 and the drive circuit 52*b*5 in the direction along the X2 direction.

At least one different of the plurality of through-holes 820 arranged side by side along the sides 813 of the wiring substrate 810, and at least one different of the plurality of through-holes 820 arranged side by side along the sides 814 of the wiring substrate 810 are located between the drive circuit 52*b*5 and the drive circuit 52*a*6. That is, at least one of the plurality of through-holes 820 is located between the drive circuit 52*b*5 and the drive circuit 52*a*6 in the direction along the X2 direction.

At least one different of the plurality of through-holes 820 arranged side by side along the sides 813 of the wiring substrate 810, and at least one different of the plurality of through-holes 820 arranged side by side along the sides 814 of the wiring substrate 810 are located between the drive circuit 52*a*6 and the drive circuit 52*b*6. That is, at least one of the plurality of through-holes 820 is located between the drive circuit 52*a*6 and the drive circuit 52*b*6 in the direction along the X2 direction.

At least one different of the plurality of through-holes 820 arranged side by side along the sides 813 of the wiring substrate 810, and at least one different of the plurality of through-holes 820 arranged side by side along the sides 814 of the wiring substrate 810 are located between the drive circuit 52*b*6 and the drive circuit 52*c*1. That is, at least one of the plurality of through-holes 820 is located between the drive circuit 52*b*6 and the drive circuit 52*c*1 in the direction along the X2 direction.

At least one different of the plurality of through-holes 820 arranged side by side along the sides 813 of the wiring substrate 810, and at least one different of the plurality of through-holes 820 arranged side by side along the sides 814 of the wiring substrate 810 are located between the drive circuit 52*c*3 and the drive circuit 52*c*4. At least one different of the plurality of through-holes 820 arranged side by side along the sides 813 of the wiring substrate 810, and at least one different of the plurality of through-holes 820 arranged side by side along the sides 814 of the wiring substrate 810 are located between the drive circuit 52*c*6 and the integrated circuit 101. At least one different of the plurality of through-holes 820 arranged side by side along the sides 813 of the wiring substrate 810, and at least one different of the plurality of through-holes 820 arranged side by side along the sides 814 of the wiring substrate 810 are located between the integrated circuit 101 and the coupling portion CN1.

That is, on the wiring substrate 810, the through-holes 820 are located between the drive circuits 52*a*1 and 52*b*1 that output the drive signals COMA1 and COMB1 for driving the piezoelectric element 60 so that the ink is discharged from the discharge module 23-1, between the drive circuits 52*a*2 and 52*b*2 that output the drive signals COMA2 and COMB2 for driving the piezoelectric element 60 so that the ink is discharged from the discharge module 23-2, between the drive circuits 52*a*3 and 52*b*3 that output the drive signals COMA3 and COMB3 for driving the piezoelectric element 60 so that the ink is discharged from the discharge module 23-3, between the drive circuits 52*a*4 and 52*b*4 that output the drive signals COMA4 and COMB4 for driving the piezoelectric element 60 so that the ink is discharged from the discharge module 23-4, between the drive circuits 52*a*5 and 52*b*5 that output the drive signals COMA5 and COMB5 for driving the piezoelectric element 60 so that the ink is discharged from the discharge module 23-5, and between the drive circuits 52*a*6 and 52*b*6 that output the drive signals COMA6 and COMB6 for driving the piezoelectric element 60 so that the ink is discharged from the discharge module 23-6, respectively.

In addition, when the drive circuits 52*a*1 and 52*b*1 that output the drive signals COMA1 and COMB1 as illustrated in FIG. 14 and the drive circuits 52*a*2 and 52*b*2 that output the drive signals COMA2 and COMB2 are located adjacent to each other along the X2 direction, it is preferable that the through-hole 820 is also located between the drive circuits 52*a*1 and 52*b*1 and the drive circuits 52*a*2 and 52*b*2. Similarly, when the drive circuits 52*a*2 and 52*b*2 that output the drive signals COMA2 and COMB2 and the drive circuits 52*a*3 and 52*b*3 that output the drive signals COMA3 and COMB3 are located adjacent to each other along the X2 direction, it is preferable that the through-hole 820 is also located between the drive circuits 52*a*2 and 52*b*2 and the drive circuits 52*a*3 and 52*b*3. When the drive circuits 52*a*3 and 52*b*3 that output the drive signals COMA3 and COMB3 and the drive circuits 52*a*4 and 52*b*4 that output the drive signals COMA4 and COMB4 are located adjacent to each other along the X2 direction, it is preferable that the through-hole 820 is also located between the drive circuits 52*a*3 and 52*b*3 and the drive circuits 52*a*4 and 52*b*4. When the drive circuits 52*a*4 and 52*b*4 that output the drive signals COMA4 and COMB4 and the drive circuits 52*a*5 and 52*b*5 that output the drive signals COMA5 and COMB5 are located adjacent to each other along the X2 direction, it is preferable that the through-hole 820 is also located between the drive circuits 52*a*4 and 52*b*4 and the drive circuits 52*a*5 and 52*b*5. When the drive circuits 52*a*5 and 52*b*5 that output the drive signals COMA5 and COMB5 and the drive circuits 52*a*6 and 52*b*6 that output the drive signals COMA6 and COMB6 are located adjacent to each other along the X2 direction, it is preferable that the through-hole 820 is also located between the drive circuits 52*a*5 and 52*b*5 and the drive circuits 52*a*6 and 52*b*6.

Returning to FIG. 12, next, a specific example of the structure of the heat sink 710 included in the head drive module 10 will be described. The heat sink 710 is located on the +Z2 side of the drive circuit substrate 800. The heat sink 710 includes a bottom portion 711, side portions 712 and 713, protruding portions 715, 716, and 717, and a plurality of fin portions 718.

The bottom portion 711 is a substantially rectangular shape located facing the wiring substrate 810 and extending in a plane formed by the X2 direction and the Y2 direction. The side portion 712 protrudes from the end portion of the bottom portion 711 on the −Y2 side toward the −Z2 side and extends along the X2 direction. At least a part of the end portion of the side portion 712 on the −Z2 side is in contact with the end portion of the wiring substrate 810 on the −Y2 side. The side portion 713 protrudes from the end portion of the bottom portion 711 on the +Y2 side toward the −Z2 side and extends along the X2 direction. At least a part of the end portion of the side portion 713 on the −Z2 side is in contact with the end portion of the wiring substrate 810 on the +Y2 side. That is, the heat sink 710 includes the bottom portion 711 and the side portions 712 and 713, and constitutes an accommodation space that opens on the −Z2 side. The plurality of drive circuits 52 included in the drive circuit substrate 800 are accommodated in the accommodation space constituted by the heat sink 710. In other words, the heat sink 710 is attached to the wiring substrate 810 and is provided so as to cover the plurality of drive circuits 52.

The protruding portions 715, 716, and 717 are provided corresponding to each of the inductor L1, the transistors M1 and M2, and the integrated circuit 500 provided on the wiring substrate 810 inside the accommodation space configured to include the bottom portion 711 and the side portions 712 and 713. The protruding portion 715 is located corresponding to the inductor L1 provided on the wiring substrate 810, protrudes from the bottom portion 711 toward the −Z2 side, and extends along the X2 direction. The protruding portion 716 is located corresponding to the transistors M1 and M2 provided on the wiring substrate 810, protrudes from the bottom portion 711 toward the −Z2 side, and extends along the X2 direction. The protruding portion 717 is located corresponding to the integrated circuit 500 provided on the wiring substrate 810, protrudes from the bottom portion 711 toward the −Z2 side, and extends along the X2 direction.

Each of the plurality of fin portions 718 protrudes from the bottom portion 711 toward the −Z2 side, extends along the X2 direction, and is located apart from each other in the Y2 direction. Since the heat sink 710 includes the plurality of fin portions 718, the surface area of the heat sink 710 is increased. As a result, the heat radiation performance of the heat sink 710 is improved. The number of the plurality of fin portions 718 included in such a heat sink 710 is set based on the amount of heat released by the heat sink 710 from the heat generated in the drive circuit substrate 800, the length of the fin portions 718 along the Z2 direction, the optimum interval defined according to the air flow applied to the fin portion 718, and the like.

The heat sink 710 configured as described above is attached to the wiring substrate 810 of the drive circuit substrate 800 to release the heat generated by the plurality of drive circuits 52 provided on the wiring substrate 810. That is, the head drive module 10 is attached to the wiring substrate 810 and includes the heat sink 710 that releases heat of at least one of the plurality of drive circuits 52. Such a heat sink 710 is a substance having sufficient rigidity for protecting the drive circuit 52 in addition to high thermal conductivity, and is configured to contain a metal such as aluminum, iron, or copper.

Furthermore, in the head drive module 10 of the first embodiment, the heat sink 710 is configured to contain a metal such as aluminum, iron, or copper, and is provided so as to cover the plurality of drive circuits 52. As a result, the heat sink 710 releases heat generated by the plurality of drive circuits 52, and also functions as a shielding material reducing the possibility that disturbance noise contributes to the plurality of drive circuits 52. As a result, the waveform accuracy of the drive signals COMA1 to COMA6, COMB1 to COMB6, and COMC1 to COMC6 output by the plurality of drive circuits 52 is further improved.

The heat conductive member group 720 is located between the drive circuit substrate 800 and the heat sink 710 in the direction along the Z2 direction. The heat conductive member group 720 enhances the conduction efficiency of heat conducted from the drive circuit substrate 800 to the heat sink 710 by coming into contact with both the heat-generating electronic component of the drive circuit substrate 800 and the heat sink 710. Such a heat conductive member group 720 is preferably a substance having elasticity, flame retardancy, and electrical insulation, in addition to thermal conductivity. For example, a gel sheet or rubber sheet containing silicone or acrylic resin and having high thermal conductivity can be used. As a result, the heat conductive member group 720 functions as a heat conductive member that conducts the heat generated in the drive circuit substrate 800 to the heat sink 710, functions as an insulating member for ensuring electrical insulation performance between the drive circuit substrate 800 and the heat sink 710, and also functions as a cushioning member for relieving stress generated when the heat sink 710 is attached to the drive circuit substrate 800.

The heat conductive member group 720 includes heat conductive members 730, 740, 750, and 760. The heat conductive member 730 is located between the inductor L1 included in each of the plurality of drive circuits 52 and the protruding portion 715 included in the heat sink 710, and comes into contact with both the inductor L1 and the protruding portion 715 included in each of the plurality of drive circuits 52 in a state where the heat sink 710 is attached to the drive circuit substrate 800. As a result, the heat conductive member 730 enhances the conduction efficiency of heat generated by the inductor L1 to the heat sink 710. The heat conductive member 740 is located between the transistor M1 included in each of the plurality of drive circuits 52 and the protruding portion 716 included in the heat sink 710, and comes into contact with both the transistor M1 and the protruding portion 716 included in each of the plurality of drive circuits 52 in a state where the heat sink 710 is attached to the drive circuit substrate 800. As a result, the heat conductive member 740 enhances the conduction efficiency of heat generated by the transistor M1 to the heat sink 710. The heat conductive member 750 is located between the transistor M2 included in each of the plurality of drive circuits 52 and the protruding portion 716 included in the heat sink 710, and comes into contact with both the transistor M2 and the protruding portion 716 included in each of the plurality of drive circuits 52 in a state where the heat sink 710 is attached to the drive circuit substrate 800. As a result, the heat conductive member 750 enhances the conduction efficiency of heat generated by the transistor M2 to the heat sink 710. The heat conductive member 760 is located between the integrated circuit 500 included in each of the plurality of drive circuits 52 and the protruding portion 717 included in the heat sink 710, and comes into contact with both the integrated circuit 500 and the protruding portion 717 included in each of the plurality of drive circuits 52 in a state where the heat sink 710 is attached to the drive circuit substrate 800. As a result, the heat conductive member 760 enhances the conduction efficiency of heat generated by the transistor M2 to the heat sink 710.

Each of the plurality of screws 780 is made of metal such as steel, iron, aluminum, and stainless steel, inserts each of the plurality of through-holes 820 included in the wiring substrate 810 included in the drive circuit substrate 800 from the −Z2 side toward the +Z2 side, and is fastened to the heat sink 710 located on the +Z2 side of the drive circuit substrate 800 to attach the heat sink 710 to the wiring substrate 810 included in the drive circuit substrate 800.

Specifically, some of the plurality of screws 780 insert through-holes 820 located between the coupling portion CN2 and the drive circuit 52*a*1 among the plurality of through-holes 820 formed in the wiring substrate 810. The screw 780 is fastened to the side portions 712 and 713 of the heat sink 710 to attach the heat sink 710 to the wiring substrate 810.

Similarly, some of the plurality of screws 780 insert the through-hole 820 located between the drive circuit **52*a*1 and the drive circuit 52*b*1, the through-hole 820 located between the drive circuit 52*b*1 and the drive circuit 52*a*2, the through-hole 820 located between the drive circuit 52*a*2 and the drive circuit 52*b*2, the through-hole 820 located between the drive circuit 52*b*2 and the drive circuit 52*a*3, the through-hole 820 located between the drive circuit 52*a*3 and the drive circuit 52*b*3, the through-hole 820 located between the drive circuit 52*b*3 and the drive circuit 52*a*4, the through-hole 820 located between the drive circuit 52*a*4 and the drive circuit 52*b*4, the through-hole 820 located between the drive circuit 52*b*4 and the drive circuit 52*a*5, the through-hole 820 located between the drive circuit 52*a*5 and the drive circuit 52*b*5, the through-hole 820 located between the drive circuit 52*b*5 and the drive circuit 52*a*6, the through-hole 820 located between the drive circuit 52*a*6 and the drive circuit 52*b*6, the through-hole 820 located between the drive circuit 52*b*6 and the drive circuit 52*c*1, the through-hole 820 located between the drive circuit 52*c*3 and the drive circuit 52*c*4, the through-hole 820 located between the drive circuit 52*c*6 and the integrated circuit 101, and the through-hole 820 located between the integrated circuit 101 and the coupling portion CN1, in the through-holes 820 arranged side by side along the side 813 of the wiring substrate 810. The screw 780 is fastened to the side portions 712 and 713 of the heat sink 710 to attach the heat sink 710 to the wiring substrate 810**.

As described above, the plurality of screws 780 are inserted into the plurality of through-holes 820 included in the wiring substrate 810 and fastened to the side portions 712 and 713, so that the heat sink 710 including the side portions 712 and 713 is attached to the wiring substrate 810 included in the drive circuit substrate 800. As a result, the heat conductive member 730 is in close contact with both the inductor L1 and the protruding portion 715, the heat conductive member 740 is in close contact with both the transistor M1 and the protruding portion 716, the heat conductive member 750 is in close contact with both the transistor M2 and the protruding portion 716, and the heat conductive member 750 is in close contact with both the integrated circuit 500 and the protruding portion 717. That is, the thermal contact efficiency between the inductor L1, the transistors M1 and M2, the integrated circuit 500, which have a large amount of heat, and the heat sink 710 is improved. As a result, the heat of the inductor L1, the transistors M1 and M2, and the integrated circuit 500, which have a large amount of heat, can be more efficiently conducted to the heat sink 710, and the temperature rise of the drive circuit 52 included in the drive circuit substrate 800 is reduced.

Here, the drive circuit **52*a*1 outputs the drive signal COMA1 for driving the piezoelectric element 60 included in the discharge module 23-1 so that a large amount of ink is discharged from the liquid discharge module 20, the drive circuit 52*b*1 outputs the drive signal COMB1 for driving the piezoelectric element 60 included in the discharge module 23-1 so that a small amount of ink is discharged from the liquid discharge module 20, and the drive circuit 52*c*1 outputs the drive signal COMC1 for driving the piezoelectric element 60 included in the discharge module 23-1 so that ink is not discharged from the liquid discharge module 20. Therefore, the amount of heat of the drive circuits 52*a*1 and 52*b*1 is larger than the amount of heat of the drive circuit 52*c*1, and the amount of heat of the drive circuit 52*a*1 is larger than the amount of heat of the drive circuit 52*b*1**.

Such drive circuits **52*a*1, 52*b*1, and 52*c*1 are located side by side in the order of the drive circuits 52*a*1, 52*b*1, and 52*c*1 in the first layer 831 of the wiring substrate 810 along the X2 direction, and the through-hole 820 through which the screw 780 is inserted is located between the drive circuit 52*a*1 having a large amount of heat and the drive circuit 52*b*1. That is, the heat sink 710 is attached to the wiring substrate 810 by a metal screw 780 between the drive circuit 52*a*1 that outputs the drive signal COMA1 for driving the piezoelectric element 60 so that ink is discharged and the drive circuit 52*b*1 that outputs the drive signal COMB1 for driving the piezoelectric element 60 so that ink is discharged. As a result, of the heat generated in the drive circuit 52*a*1 and the drive circuit 52*b*1, the heat conducted to the wiring substrate 810 is released to the heat sink 710 via the metal screw 780. That is, the heat generated in the drive circuit 52*a*1 and the drive circuit 52*b*1 is conducted to the heat sink 710 via the heat conductive members 730, 740, 750, and 760, and is also conducted to the heat sink 710 via the metal screw 780. As a result, the heat radiation efficiency of the drive circuits 52*a*1 and 52*b*1** having a large amount of heat is improved.

Similarly, the amount of heat of the drive circuits **52*a*2 and 52*b*2 is larger than the amount of heat of the drive circuit 52*c*2, and the amount of heat of the drive circuit 52*a*2 is larger than the amount of heat of the drive circuit 52*b*2. Such drive circuits 52*a*2, 52*b*2, and 52*c*2 are located side by side in the order of the drive circuits 52*a*2, 52*b*2, and 52*c*2 in the first layer 831 of the wiring substrate 810 along the X2 direction, and the through-hole 820 through which the screw 780 is inserted is located between the drive circuit 52*a*2 and the drive circuit 52*b*2. As a result, of the heat generated in the drive circuit 52*a*2 and the drive circuit 52*b*2, the heat conducted to the wiring substrate 810 is released to the heat sink 710 via the metal screw 780. That is, the heat generated in the drive circuit 52*a*2 and the drive circuit 52*b*2 is conducted to the heat sink 710 via the heat conductive members 730, 740, 750, and 760, and is also conducted to the heat sink 710 via the metal screw 780. As a result, the heat radiation efficiency of the drive circuits 52*a*2 and 52*b*2** having a large amount of heat is improved.

Similarly, the amount of heat of the drive circuits **52*a*3 and 52*b*3 is larger than the amount of heat of the drive circuit 52*c*3, and the amount of heat of the drive circuit 52*a*3 is larger than the amount of heat of the drive circuit 52*b*3. Such drive circuits 52*a*3, 52*b*3, and 52*c*3 are located side by side in the order of the drive circuits 52*a*3, 52*b*3, and 52*c*3 in the first layer 831 of the wiring substrate 810 along the X2 direction, and the through-hole 820 through which the screw 780 is inserted is located between the drive circuit 52*a*3 and the drive circuit 52*b*3. As a result, of the heat generated by the drive circuit 52*a*3 and the drive circuit 52*b*3, the heat conducted to the wiring substrate 810 is released to the heat sink 710 via the metal screw 780. That is, the heat generated in the drive circuit 52*a*3 and the drive circuit 52*b*3 is conducted to the heat sink 710 via the heat conductive members 730, 740, 750, and 760, and is also conducted to the heat sink 710 via the metal screw 780. As a result, the heat radiation efficiency of the drive circuits 52*a*3 and 52*b*3** having a large amount of heat is improved.

Similarly, the amount of heat of the drive circuits **52*a*4 and 52*b*4 is larger than the amount of heat of the drive circuit 52*c*4, and the amount of heat of the drive circuit 52*a*4 is larger than the amount of heat of the drive circuit 52*b*4. Such drive circuits 52*a*4, 52*b*4, and 52*c*4 are located side by side in the order of the drive circuits 52*a*4, 52*b*4, and 52*c*4 in the first layer 831 of the wiring substrate 810 along the X2 direction, and the through-hole 820 through which the screw 780 is inserted is located between the drive circuit 52*a*4 and the drive circuit 52*b*4. As a result, of the heat generated by the drive circuit 52*a*4 and the drive circuit 52*b*4, the heat conducted to the wiring substrate 810 is released to the heat sink 710 via the metal screw 780. That is, the heat generated in the drive circuit 52*a*4 and the drive circuit 52*b*4 is conducted to the heat sink 710 via the heat conductive members 730, 740, 750, and 760, and is also conducted to the heat sink 710 via the metal screw 780. As a result, the heat radiation efficiency of the drive circuits 52*a*4 and 52*b*4** having a large amount of heat is improved.

Similarly, the amount of heat of the drive circuits 52*a*5 and 52*b*5 is larger than the amount of heat of the drive circuit 52*c*5, and the amount of heat of the drive circuit 52*a*5 is larger than the amount of heat of the drive circuit 52*b*5. Such drive circuits 52*a*5, 52*b*5, and 52*c*5 are located side by side in the order of the drive circuits 52*a*5, 52*b*5, and 52*c*5 in the first layer 831 of the wiring substrate 810 along the X2 direction, and the through-hole 820 through which the screw 780 is inserted is located between the drive circuit 52*a*5 and the drive circuit 52*b*5. As a result, of the heat generated in the drive circuit 52*a*5 and the drive circuit 52*b*5, the heat conducted to the wiring substrate 810 is released to the heat sink 710 via the metal screw 780. That is, the heat generated in the drive circuit 52*a*5 and the drive circuit 52*b*5 is conducted to the heat sink 710 via the heat conductive members 730, 740, 750, and 760, and is also conducted to the heat sink 710 via the metal screw 780. As a result, the heat radiation efficiency of the drive circuits 52*a*5 and 52*b*5 having a large amount of heat is improved.

Similarly, the amount of heat of the drive circuits 52*a*6 and 52*b*6 is larger than the amount of heat of the drive circuit 52*c*6, and the amount of heat of the drive circuit 52*a*6 is larger than the amount of heat of the drive circuit 52*b*6. Such drive circuits 52*a*6, 52*b*6, and 52*c*6 are located side by side in the order of the drive circuits 52*a*6, 52*b*6, and 52*c*6 in the first layer 831 of the wiring substrate 810 along the X2 direction, and the through-hole 820 through which the screw 780 is inserted is located between the drive circuit 52*a*6 and the drive circuit 52*b*6. As a result, of the heat generated by the drive circuit 52*a*6 and the drive circuit 52*b*6, the heat conducted to the wiring substrate 810 is released to the heat sink 710 via the metal screw 780. That is, the heat generated in the drive circuit 52*a*6 and the drive circuit 52*b*6 is conducted to the heat sink 710 via the heat conductive members 730, 740, 750, and 760, and is also conducted to the heat sink 710 via the metal screw 780. As a result, the heat radiation efficiency of the drive circuits 52*a*6 and 52*b*6 having a large amount of heat is improved.

Furthermore, in the liquid discharge device 1 according to the first embodiment, the drive circuits 52*a*1 to 52*a*6 and 52*b*1 to 52*b*6 that output the drive signals COMA1 to COMA6 and COMB1 to COMB6 for driving the piezoelectric element 60 so that ink is discharged are located adjacent to each other for each corresponding discharge module 23 along the X2 direction of the wiring substrate 810. The drive circuits 52*c*1 to 52*c*6 that output the drive signals COMC1 to COMC6 for driving the piezoelectric element 60 so that ink is not discharged are located adjacent to each other in the order of the drive circuits 52*c*1, 52*c*2, 52*c*3, 52*c*4, 52*c*5, and 52*c*6 on the +X2 side of the drive circuits 52*a*1 to 52*a*6 and 52*b*1 to 52*b*6 along the X2 direction of the wiring substrate 810.

In such a head drive module 10, the wiring substrate 810 includes the through-holes 820 between the drive circuit 52*b*1 and the drive circuit 52*a*2, between the drive circuit 52*b*2 and the drive circuit 52*a*3, between the drive circuit 52*b*3 and the drive circuit 52*a*4, between the drive circuit 52*b*4 and the drive circuit 52*a*5, and the drive circuit 52*b*5 and the drive circuit 52*a*6, respectively, and the heat sink 710 is attached to the wiring substrate 810 by the screws 780 that insert the through-holes 820 located between the drive circuit 52*b*1 and the drive circuit 52*a*2, between the drive circuit 52*b*2 and the drive circuit 52*a*3, between the drive circuit 52*b*3 and the drive circuit 52*a*4, between the drive circuit 52*b*4 and the drive circuit 52*a*5, and the drive circuit 52*b*5 and the drive circuit 52*a*6, respectively. Therefore, even when the drive circuits 52*a*1 to 52*a*6 and 52*b*1 to 52*b*6 having a large amount of heat are centrally disposed on the wiring substrate 810, the release efficiency of heat generated by the drive circuits 52*a*1 to 52*a*6 and 52*b*1 to 52*b*6 can be further enhanced.

Here, in the head drive module 10, the heat sink 710 may be attached to the drive circuit substrate 800 by using, for example, metal rivets instead of the plurality of metal screws 780. In addition, the heat sink 710 may be attached to the drive circuit substrate 800 by inserting a part of the heat sink 710 into the through-hole 820 and attaching a part of the heat sink 710 through which the through-hole 820 is inserted to a metal portion of the drive circuit substrate 800 by soldering or the like. However, when the plurality of drive circuits 52 included in the drive circuit substrate 800 as described in the first embodiment are housed inside the heat sink 710, in a case in which the heat sink 710 is attached to the drive circuit substrate 800 by using metal rivets, solder, or the like, the maintainability of the drive circuit substrate 800 is lowered. That is, from the viewpoint of improving the maintainability of the drive circuit substrate 800, it is preferable to use the metal screw 780 that can be easily attached to and detached from the drive circuit substrate 800 and the heat sink 710 and has excellent thermal conductivity.

The cooling fan 770 is located on the −Z2 side of the heat sink 710. The cooling fan 770 introduces the outside air into the head drive module 10 through an opening portion 714 provided in an upper portion of the heat sink 710 on the +X2 side.

Specifically, the cooling fan 770 is attached so as to cover the opening portion 714. The opening portion 714 is a through-hole that penetrates the heat sink 710 along the Z2 direction, and communicates with the inside of the head drive module 10 when the heat sink 710 is attached to the drive circuit substrate 800. When the cooling fan 770 operates, the outside air is introduced into the inside of the head drive module 10 through the opening portion 714. As a result, the circulation efficiency of the air floating inside the head drive module 10 is improved, and the release efficiency of heat generated in the drive circuit substrate 800 by the heat sink 710 is improved.

Here, the cooling fan 770 may be attached so as to increase the circulation efficiency of the air floating inside the head drive module 10, and may be provided on any one of the +X2 side, the −X2 side, the +Y2 side, and the −Y2 side of the head drive module 10. In addition, the fact that the cooling fan 770 operates so as to introduce outside air into the head drive module 10 is not limited to the fact that the cooling fan 770 operates so as to take in outside air into the head drive module 10, and includes the case where the cooling fan 770 operates so as to exhaust the air floating inside the head drive module 10.

In the liquid discharge device 1 configured as described above, the piezoelectric element 60 included in the discharge module 23-1 is an example of a first piezoelectric element, and the discharge portion 600 included in the discharge module 23-1 that discharges ink in response to the drive of the first piezoelectric element is an example of a first discharge portion. The discharge module 23-1 including the plurality of discharge portions 600 including the discharge portion 600 corresponding to the first discharge portion is an example of a first discharge portion group. In addition, the piezoelectric element 60 included in the discharge module 23-2 is an example of a second piezoelectric element, and the discharge portion 600 included in the discharge module 23-2 that discharges ink in response to the drive of the second piezoelectric element is an example of a second discharge portion. The discharge module 23-2 including the plurality of discharge portions 600 including the discharge portion 600 corresponding to the second discharge portion is an example of a second discharge portion group. The liquid discharge module 20 including the discharge modules 23-1 and 23-2 is an example of a discharge head. The head drive module 10 for driving the liquid discharge module 20 corresponds to the head drive circuit.

In addition, the drive signal COMA1 that drives the piezoelectric element 60 included in the discharge module 23-1 is an example of a first drive signal, the drive signal COMB1 is an example of a fifth drive signal, and the drive signal COMC1 is an example of a second drive signal. The drive circuit 52*a*1 that outputs the drive signal COMA1 is an example of a first drive circuit, the drive circuit 52*b*1 that outputs the drive signal COMB1 is an example of a fifth drive circuit, and the drive circuit 52*c*1 that outputs the drive signal COMC1 is an example a second drive circuit. The amount of ink discharged when the drive signal COMA1 is supplied to the piezoelectric element 60 is an example of a first discharge amount, and the amount of ink that is smaller than the first discharge amount and is discharged when the drive signal COMB1 is supplied to the piezoelectric element 60 is an example of a third discharge amount. The amount of current generated by the propagation of the drive signal COMA1 is an example of a first current amount, and the amount of current that is smaller than the first current amount and is generated by the propagation of the drive signal COMC1 is an example of a second current amount.

In addition, the drive signal COMA2 that drives the piezoelectric element 60 included in the discharge module 23-2 is an example of a third drive signal, the drive signal COMB2 is an example of a sixth drive signal, and the drive signal COMC2 is an example of a fourth drive signal. The drive circuit 52*a*2 that outputs the drive signal COMA2 is an example of a third drive circuit, the drive circuit 52*b*2 that outputs the drive signal COMB2 is an example of a sixth drive circuit, and the drive circuit 52*c*2 that outputs the drive signal COMC2 is an example a fourth drive circuit. The amount of ink discharged when the drive signal COMA2 is supplied to the piezoelectric element 60 is an example of a second discharge amount, and the amount of ink discharged when the drive signal COMB2 is supplied to the piezoelectric element 60 is an example of a fourth discharge amount. The amount of current generated by the propagation of the drive signal COMA2 is an example of a third current amount, and the amount of current that is smaller than the third current amount and is generated by the propagation of the drive signal COMC2 is an example of a fourth current amount.

In addition, the wiring substrate 810 provided with the drive circuits 52*a*1, 52*b*1, 52*c*1, 52*a*2, 52*b*2, and 52*c*2 is an example of a substrate, and the X2 direction where the drive circuits 52*a*1, 52*b*1, 52*c*1, 52*a*2, 52*b*2, and 52*c*2 are arranged is an example of one direction in the wiring substrate 810.

1.6 Action and Effect

In the liquid discharge device 1 of the first embodiment configured as described above, the head drive module 10 includes the drive circuit 52*a*1 that outputs the drive signal COMA1 for driving the piezoelectric element 60 so that the liquid discharge module 20 discharges a large amount of ink, the drive circuit 52*b*1 that outputs the drive signal COMB1 for driving the piezoelectric element 60 so that the liquid discharge module 20 discharges a small amount of ink, the drive circuit 52*c*1 that outputs the drive signal COMC1 for driving the piezoelectric element 60 so that the liquid discharge module 20 does not discharge ink, the wiring substrate 810 located side by side in the order of the drive circuit 52*a*1, the drive circuit 52*b*1, and the drive circuit 52*c*1 along the X2 direction, and the heat sink 710 attached to the wiring substrate 810.

In such a head drive module 10, the heat generated by the drive circuits 52*a*1 and 52*b*1 that output the drive signals COMA1 and COMB1 for driving the piezoelectric element 60 so that the liquid discharge module 20 discharges ink is large than the heat generated by the drive circuit 52*c*1 that outputs the drive signal COMC1 for driving the piezoelectric element 60 so that the liquid discharge module 20 does not discharge ink, and the through-hole 820 through which the screw 780 for attaching the heat sink 710 to the wiring substrate 810 is inserted is located between the drive circuit 52*a*1 and the drive circuit 52*b*1 that generate a large amount of heat. Therefore, of the heat generated in the drive circuit 52*a*1 and the drive circuit 52*b*1, the heat conducted to the wiring substrate 810 is released to the heat sink 710 via the screw 780. As a result, the heat generated by the head drive module 10 can be more efficiently released.

In addition, when the head drive module 10 includes the drive circuit 52*a*2 and 52*b*2 that output the drive signals COMA2 and COMB2 for driving the piezoelectric element 60 so that the liquid discharge module 20 discharges ink, and the drive circuit 52*c*2 that outputs the drive signal COMC2 for driving the piezoelectric element 60 so that the liquid discharge module 20 does not discharge ink, in addition to the drive circuits 52*a*1, 52*b*1, and 52*c*1, the through-holes 820 through which the screws 780 for attaching the heat sink 710 to the wiring substrate 810 are inserted are located between the drive circuit 52*a*2 and the drive circuit 52*b*2, and between the drive circuit 52*b*1 and the drive circuit 52*a*2, respectively, in addition to between the drive circuit 52*a*1 and the drive circuit 52*b*1. Therefore, of the heat generated in the drive circuit 52*a*1, the drive circuit 52*b*1, the drive circuit 52*a*2, and the drive circuit 52*b*2, the heat conducted to the wiring substrate 810 can be released to the heat sink 710 via the screw 780. That is, even when the head drive module 10 includes a plurality of sets of drive circuits 52 that supply the drive signals COM to different piezoelectric elements 60, the heat generated by the head drive module 10 can be more efficiently released.

Furthermore, in the liquid discharge device 1 of the present embodiment, in the head drive module 10, the heat conducted to the wiring substrate 810 can be efficiently conducted to the heat sink 710 of the heat generated by the plurality of drive circuits 52. Therefore, even when the transistors M1 and M2 included in the drive circuit 52 are surface mount-types that conduct a large amount of heat to the wiring substrate 810, the heat generated by the drive circuit 52 can be efficiently conducted to the heat sink 710.

In addition, in the liquid discharge device 1 of the first embodiment, the head drive module 10 is provided with the drive circuit **52*a*1 that outputs the drive signal COMA1 for driving the piezoelectric element 60 included in the discharge module 23-1 so that the ink is discharged from the corresponding discharge portion 600, the drive circuit 52*c*1 that outputs the drive signal COMC1 for driving the piezoelectric element 60 included in the discharge module 23-1 so that the ink is not discharged from the corresponding discharge portion 600, the drive circuit 52*a*2 that outputs the drive signal COMA2 for driving the piezoelectric element 60 included in the discharge module 23-2 so that the ink is discharged from the corresponding discharge portion 600, and the drive circuit 52*c*2 that outputs the drive signal COMC2 for driving the piezoelectric element 60 included in the discharge module 23-2 so that the ink is not discharged from the corresponding discharge portion 600**.

Here, since the piezoelectric element 60 included in the discharge module 23-1 is driven so that the ink is discharged from the corresponding discharge portion 600, the voltage amplitude of the drive signal COMA1 output by the drive circuit **52*a*1 is larger than the voltage amplitude of the drive signal COMC1 that drives the piezoelectric element 60 included in the discharge module 23-1 so that the ink is not discharged from the corresponding discharge portion 600. Similarly, since the piezoelectric element 60 included in the discharge module 23-2 is driven so that the ink is discharged from the corresponding discharge portion 600, the voltage amplitude of the drive signal COMA2 output by the drive circuit 52*a*2 is larger than the voltage amplitude of the drive signal COMC2 that drives the piezoelectric element 60 included in the discharge module 23-2 so that the ink is not discharged from the corresponding discharge portion 600. Therefore, the amount of heat of the drive circuit 52*a*1 is larger than the amount of heat of the drive circuit 52*c*1, and the amount of heat of the drive circuit 52*a*2 is larger than the amount of heat of the drive circuit 52*c*2. That is, the liquid discharge device 1 of the first embodiment is provided with the drive circuits 52*a*1, 52*c*1, 52*a*2, and 52*c*2 having different amount of heats as the plurality of drive circuits 52**.

In such a liquid discharge device 1 of the first embodiment, the drive circuits **52*a*1, 52*c*1, 52*a*2, and 52*c*2 are arranged side by side along the X2 direction on the wiring substrate 810 so that the drive circuit 52*a*2 is located between the drive circuit 52*a*1 and the drive circuit 52*c*1 along the X2 direction, and the shortest distance between the drive circuit 52*c*2 and the drive circuit 52*c*1 is shorter than the shortest distance between the drive circuit 52*c*2 and the drive circuit 52*a*2. That is, the drive circuits 52*a*1, 52*c*1, 52*a*2, and 52*c*2 are located side by side in the order of the drive circuits 52*a*1, 52*a*2, 52*c*1, and 52*c*2 in the direction along the X2 direction of the wiring substrate 810. In other words, in the wiring substrate 810, the drive circuit 52*a*1 and the drive circuit 52*a*2 having a large amount of heat are disposed in the vicinity, and the drive circuit 52*c*1 and the drive circuit 52*c*2 having a small amount of heat are disposed in the vicinity. As a result, in the head drive module 10, it is easy to centrally dispose the heat radiation members such as the heat sink 710 for releasing the heat of the drive circuit 52 in the drive circuit 52*a*1 and the drive circuit 52*a*2 having a large amount of heat. Furthermore, it is possible to easily select whether or not to dispose the heat generating member for the drive circuit 52*c*1 and the drive circuit 52*c*2 having a small amount of heat according to the usage environment and operating conditions of the liquid discharge device 1. That is, in the liquid discharge device 1 of the first embodiment, the drive circuits 52 having a large amount of heat are collectively disposed on the wiring substrate 810, and the drive circuits 52 having a small amount of heat are collectively disposed on the wiring substrate 810. Therefore, it is possible to appropriately select whether or not to dispose the heat radiation member according to the amount of heat generated by the multiple drive circuits 52, while reducing the possibility that the structure of the heat radiation member such as the heat sink 710 radiating heat from the multiple drive circuits 52 is complicated. As a result, even when the liquid discharge device 1 is provided with the multiple drive circuits 52, it is possible to apply an optimum heat radiation structure according to the amount of heat generated by the multiple drive circuits 52, and the heat generated by the multiple drive circuits 52** can be efficiently released.

In addition, in the liquid discharge device 1 of the first embodiment, the head drive module 10 is provided with the drive circuit **52*b*1 that outputs the drive signal COMB1 for driving the piezoelectric element 60 included in the discharge module 23-1 so that the ink is discharged from the corresponding discharge portion 600, and the drive circuit 52*a*2 that outputs the drive signal COMB2 for driving the piezoelectric element 60 included in the discharge module 23-2 so that the ink is discharged from the corresponding discharge portion 600. As a result, the discharge amount of the ink discharged from the discharge module 23-1 can be controlled by the drive signals COMA1 and COMB1, and similarly, the discharge amount of the ink discharged from the discharge module 23-2 can be controlled by the drive signals COMA2 and COMB2. That is, it is possible to perform more detailed control of the discharge amount of the ink discharged from each of the discharge modules 23-1 and 23-2**, and the image quality formed on the medium is improved.

In such a liquid discharge device 1 of the first embodiment, since the piezoelectric element 60 included in the discharge module 23-1 is driven so that the ink is discharged from the corresponding discharge portion 600, the voltage amplitude of the drive signal COMB1 output by the drive circuit **52*b*1 is larger than the voltage amplitude of the drive signal COMC1 that drives the piezoelectric element 60 included in the discharge module 23-1 so that the ink is not discharged from the corresponding discharge portion 600. Similarly, since the piezoelectric element 60 included in the discharge module 23-2 is driven so that the ink is discharged from the corresponding discharge portion 600, the voltage amplitude of the drive signal COMB2 output by the drive circuit 52*b*2 is larger than the voltage amplitude of the drive signal COMC2 that drives the piezoelectric element 60 included in the discharge module 23-2 so that the ink is not discharged from the corresponding discharge portion 600. Therefore, the amount of heat of the drive circuit 52*b*1 is larger than the amount of heat of the drive circuit 52*c*1, and the amount of heat of the drive circuit 52*b*2 is larger than the amount of heat of the drive circuit 52*c*2**.

In the liquid discharge device 1 of the first embodiment, when the liquid discharge device 1 is provided with the drive circuit **52*b*1 that outputs the drive signal COMB1 for driving the piezoelectric element 60 included in the discharge module 23-1 so that the ink is discharged from the corresponding discharge portion 600, and the drive circuit 52*a*2 that outputs the drive signal COMB2 for driving the piezoelectric element 60 included in the discharge module 23-2 so that the ink is discharged from the corresponding discharge portion 600, the drive circuit 52*b*1 and the drive circuit 52*b*2 are located between the drive circuit 52*a*1 and the drive circuit 52*c*1 and between the drive circuit 52*a*1** and the drive circuit 52*c*2 along the X2 direction. That is, the drive circuits **52*b*1 and 52*b*2 having a large amount of heat are not disposed between the drive circuits 52*c*1 and 52*c*2** having a small amount of heat.

As a result, even when the liquid discharge device 1 is provided with the drive circuit **52*b*1 that outputs the drive signal COMB1 for driving the piezoelectric element 60 included in the discharge module 23-1 so that the ink is discharged from the corresponding discharge portion 600, and the drive circuit 52*a*2 that outputs the drive signal COMB2 for driving the piezoelectric element 60 included in the discharge module 23-2 so that the ink is discharged from the corresponding discharge portion 600, the drive circuit 52 having a large amount of heat can be collectively disposed on the wiring substrate 810, and the drive circuits 52 having a small amount of heat can be collectively disposed on the wiring substrate 810. As a result, it is possible to appropriately select whether or not to dispose according to the amount of heat generated by the multiple drive circuits 52, while reducing the possibility that the structure of the heat radiation member such as the heat sink 710 radiating heat from the drive circuit 52 is complicated. As a result, even when the liquid discharge device 1 is provided with the multiple drive circuits 52, the heat generated by the multiple drive circuits 52** can be efficiently released.

In the liquid discharge device 1 according to the first embodiment, the drive circuit **52*a*1 and the drive circuit 52*b*1 that output the drive signals COMA1 and COMB1 supplied to the discharge module 23-1 are located adjacent to each other on the wiring substrate 810 and the drive circuit 52*a*2 and the drive circuit 52*b*2 that output the drive signals COMA2 and COMB2 supplied to the discharge modules 23-2 are located adjacent to each other on the wiring substrate 810. As a result, the difference between the wiring length in which the drive signal COMA1 supplied to the discharge module 23-1 is propagated and the wiring length in which the drive signal COMB1 is propagated can be reduced. Similarly, the difference between the wiring length in which the drive signal COMA2 supplied to the discharge module 23-2 is propagated and the wiring length in which the drive signal COMB2 is propagated can be reduced. As a result, the possibility of a time difference due to signal propagation between the drive signal COMA1 and the drive signal COMB1 for discharging ink from the discharge module 23-1 is reduced. Similarly, the possibility of a time difference due to signal propagation between the drive signal COMA2 and the drive signal COMB2 for discharging ink from the discharge module 23-2 is reduced. Therefore, the discharge accuracy of the ink discharged from the discharge modules 23-1 and 23-2** is further improved.

In addition, in the liquid discharge device 1 of the first embodiment, the drive circuit substrate 800 included in the head drive module 10 includes the plurality of drive circuits 52 including the drive circuit **52*a*1 that outputs the drive signal COMA1 for driving the piezoelectric element 60 so that the discharge portion 600 included in the discharge module 23-1 discharges a large amount of ink, the drive circuit 52*c*1 that outputs the drive signal COMC1 for driving the piezoelectric element 60 so that the discharge portion 600 included in the discharge module 23-1 does not discharge ink, the drive circuit 52*a*6 that outputs the drive signal COMA6 for driving the piezoelectric element 60 so that the discharge portion 600 included in the discharge module 23-6 discharges a large amount of ink, and the drive circuit 52*c*6 that outputs the drive signal COMC6 for driving the piezoelectric element 60 so that the discharge portion 600 included in the discharge module 23-6 does not discharge ink, the coupling portion CN2 that electrically couples the head drive module 10 and the liquid discharge module 20, and the wiring substrate 810 provided with the plurality of drive circuits 52 and the coupling portion CN2. The wiring substrate 810 includes the wiring WA1 that propagates the drive signal COMA1 from the drive circuit 52*a*1 to the coupling portion CN2, the wiring WC1 that propagates the drive signal COMC1 from the drive circuit 52*c*1 to the coupling portion CN2, the wiring WA6 that propagates the drive signal COMA6 from the drive circuit 52*a*6 to the coupling portion CN2, and the wiring WC6 that propagates the drive signal COMC6 from the drive circuit 52*c*6 to the coupling portion CN2, and further includes the plurality of wiring patterns that electrically couples each of the plurality of drive circuits 52 and the coupling portion CN2. In such a head drive module 10, the drive circuits 52*a*1, 52*c*1, 52*a*6, and 52*c*6 are provided on the wiring substrate 810** so that the wiring WA1 is shorter than the wiring WC1, WA6, and WC6, and the wiring WC6 is longer than the wiring WA1, WC1, and WA6.

Here, the drive signal COMA1 drives the piezoelectric element 60 so that the discharge portion 600 included in the discharge module 23-1 discharges a large amount of ink, and the drive signal COMC1 drives the piezoelectric element 60 so that the discharge portion 600 included in the discharge module 23-1 does not discharge ink. Therefore, the amount of current generated when the drive signal COMA1 is propagated is larger than the amount of current generated when the drive signal COMC1 is propagated. In addition, the drive signal COMA6 drives the piezoelectric element 60 so that the discharge portion 600 included in the discharge module 23-6 discharges a large amount of ink, and the drive signal COMC6 drives the piezoelectric element 60 so that the discharge portion 600 included in the discharge module 23-6 does not discharge ink. Therefore, the amount of current generated when the drive signal COMA6 is propagated is larger than the amount of current generated when the drive signal COMC6 is propagated. That is, in the liquid discharge device 1 according to the first embodiment, the wiring length at which the signal having a large amount of current generated when the drive signal COM is propagated propagates is shorter than the wiring length at which the signal having a small amount of current generated when the signal is propagated propagates. As a result, the influence of the impedance components of the drive signals COMA1 and COMA propagating the wirings WA1 and WA6, which can generate a large current due to propagation, is small. As a result, the possibility that a voltage drop due to the impedance components of the wirings WA1 and WA6 occurs in the drive signals COMA1 and COMA6 is reduced. That is, the waveform accuracy of the drive signals COMA1 and COMA6 supplied to the liquid discharge module 20 is improved. As a result, the discharge accuracy of the ink of the discharge modules 23-1 and 23-6 included in the liquid discharge module 20 is improved.

In addition, in the liquid discharge device 1 of the first embodiment, in addition to the drive circuits **52*a*1, 52*c*1, 52*a*6, and 52*c*6, the head drive module 10 includes the drive circuit 52*b*1 that outputs the drive signal COMB1 for driving the piezoelectric element 60 so that the discharge portion 600 included in the discharge module 23-1 discharges a small amount of ink, and the drive circuit 52*b*6 that outputs the drive signal COMB6 for driving the piezoelectric element 60 so that the discharge portion 600 included in the discharge module 23-6 discharges a small amount of ink. The wiring substrate 810** includes the wiring WB1 that propagates the drive signal COMB1 from the drive circuit 52*b*1 to the coupling portion CN2, and the wiring WB6 that propagates the drive signal COMB6 from the drive circuit 52*b*6 to the coupling portion CN2. In the head drive module 10, the drive circuit 52*b*1 is provided on the wiring substrate 810 so that the wiring WB1 is longer than the wiring WA1 and shorter than the wiring WC1. The drive circuit 52*b*6 is provided on the wiring substrate 810 so that the wiring WB6 is longer than the wiring WA6 and shorter than the wiring WC6.

Since the piezoelectric element 60 is driven so that the discharge portion 600 included in the discharge module 23-1 discharges a small amount of ink, the amount of current generated when the drive signal COMB1 is propagated is smaller than the amount of current generated when the drive signal COMA1 is propagated, and larger than the amount of current generated when the drive signal COMC1 is propagated. In addition, since the piezoelectric element 60 is driven so that the discharge portion 600 included in the discharge module 23-6 discharges a small amount of ink, the amount of current generated when the drive signal COMB6 is propagated is smaller than the amount of current generated when the drive signal COMA6 is propagated, and larger than the amount of current generated when the drive signal COMC6 is propagated. In such a head drive module 10, the drive circuit 52*b*1 is provided on the wiring substrate 810 so that the wiring WB1 is longer than the wiring WA1 and shorter than the wiring WC1, and the drive circuit 52*b*6 is provided on the wiring substrate 810 so that the wiring WB6 is longer than the wiring WA6 and shorter than the wiring WC6. Therefore, even when the head drive module 10 includes the drive circuit 52*b*1 that outputs the drive signal COMB1 and the drive circuit 52*b*6 that outputs the drive signal COMB6, it is possible to reduce the possibility that a voltage drop due to the impedance components of the wirings WA1 and WA6 occurs in the drive signals COMA1 and COMA6, and it is possible to reduce the possibility that a voltage drop due to the impedance components of the wirings WB1 and WB6 occurs in the drive signals COMB1 and COMB6. As a result, the discharge accuracy of the ink of the discharge modules 23-1 and 23-6 included in the liquid discharge module 20 is improved.

2. Second Embodiment

Next, a liquid discharge device 1 of a second embodiment will be described. In describing the liquid discharge device 1 of the second embodiment, the same reference numerals are given to the same configurations as those of the liquid discharge device 1 of the first embodiment, and the description thereof will be simplified or omitted. In the liquid discharge device 1 of the second embodiment, the disposition of the plurality of drive circuits 52 provided on the wiring substrate 810 is different from that of the liquid discharge device 1 of the first embodiment.

Figure 18:
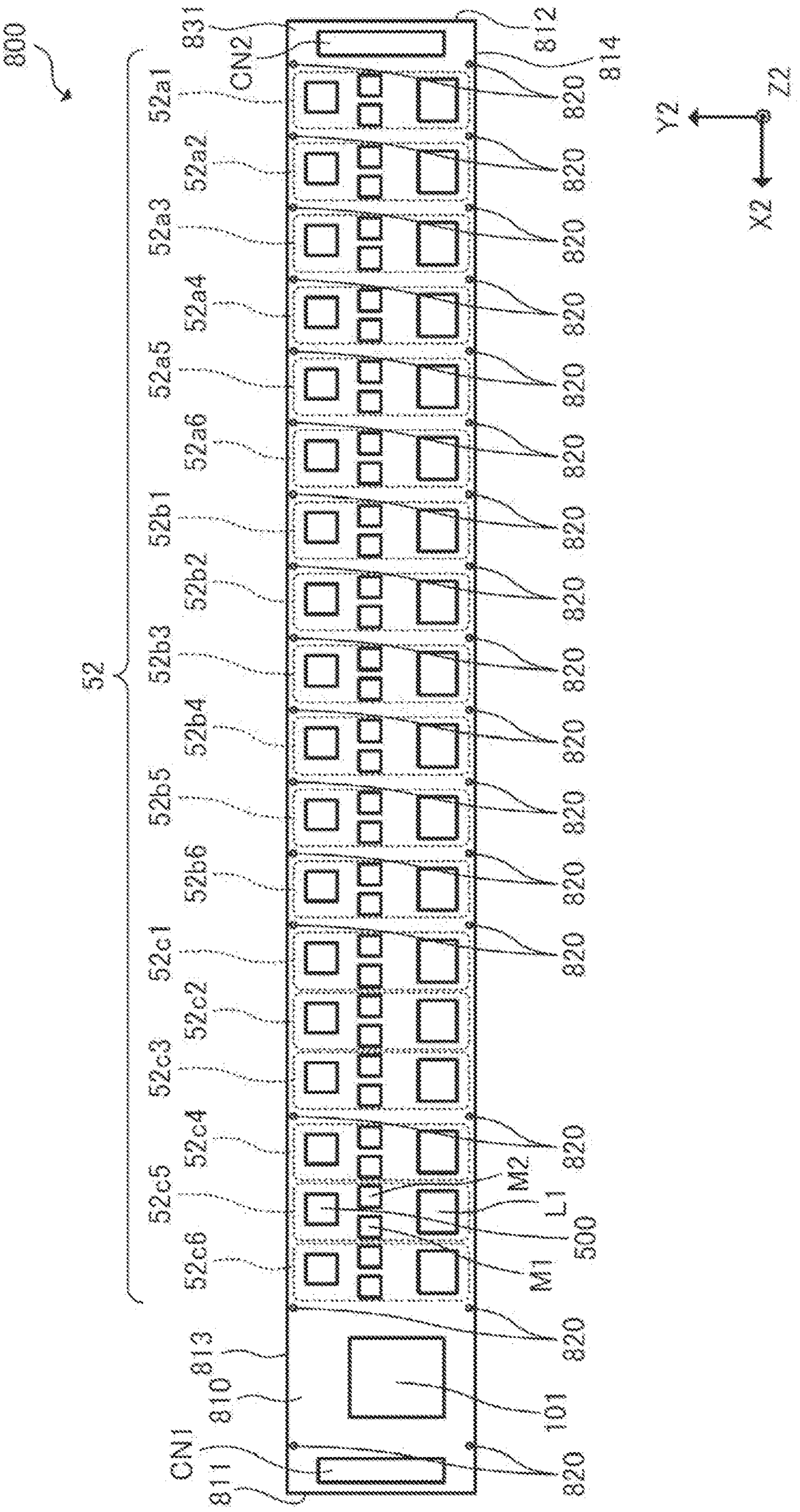
FIG. 18 is a diagram illustrating an example of a configuration of a first layer of a wiring substrate of a second embodiment.

FIG. 18 is a diagram illustrating an example of the configuration of the first layer 831 of the wiring substrate 810 included in the liquid discharge device 1 of the second embodiment. As illustrated in FIG. 18, in the liquid discharge device 1 of the second embodiment, the plurality of drive circuits 52 are located between the integrated circuit 101 and the coupling portion CN2, and are arranged side by side along the X2 direction.

Specifically, the drive circuit 52*a*1 that outputs the drive signal COMA1 for driving the piezoelectric element 60 so that a large amount of ink is discharged from the discharge module 23-1, and the drive circuit 52*a*2 that outputs the drive signal COMA2 for driving the piezoelectric element 60 so that a large amount of ink is discharged from the discharge module 23-2 are located adjacent to each other along the X2 direction. The drive circuit 52*a*2 and the drive circuit 52*a*3 that outputs the drive signal COMA3 for driving the piezoelectric element 60 so that a large amount of ink is discharged from the discharge module 23-3 are located adjacent to each other along the X2 direction. The drive circuit 52*a*3 and the drive circuit 52*a*4 that outputs the drive signal COMA4 for driving the piezoelectric element 60 so that a large amount of ink is discharged from the discharge module 23-4 are located adjacent to each other along the X2 direction. The drive circuit 52*a*4 and the drive circuit 52*a*5 that outputs the drive signal COMA5 for driving the piezoelectric element 60 so that a large amount of ink is discharged from the discharge module 23-5 are located adjacent to each other along the X2 direction. The drive circuit 52*a*5 and the drive circuit 52*a*6 that outputs the drive signal COMA6 for driving the piezoelectric element 60 so that a large amount of ink is discharged from the discharge module 23-6 are located adjacent to each other along the X2 direction.

In addition, the drive circuit 52*b*1 that outputs the drive signal COMB1 for driving the piezoelectric element 60 so that a small amount of ink is discharged from the discharge module 23-1 is located on the +X2 side of the drive circuit 52*a*6. The drive circuit 52*b*1 and the drive circuit 52*b*2 that outputs the drive signal COMB2 for driving the piezoelectric element 60 so that a small amount of ink is discharged from the discharge module 23-2 are located adjacent to each other along the X2 direction. The drive circuit 52*b*2 and the drive circuit 52*b*3 that outputs the drive signal COMB3 for driving the piezoelectric element 60 so that a small amount of ink is discharged from the discharge module 23-3 are located adjacent to each other along the X2 direction. The drive circuit 52*b*3 and the drive circuit 52*b*4 that outputs the drive signal COMB4 for driving the piezoelectric element 60 so that a small amount of ink is discharged from the discharge module 23-4 are located adjacent to each other along the X2 direction. The drive circuit 52*b*4 and the drive circuit 52*b*5 that outputs the drive signal COMB5 for driving the piezoelectric element 60 so that a small amount of ink is discharged from the discharge module 23-5 are located adjacent to each other along the X2 direction. The drive circuit 52*b*5 and the drive circuit 52*b*6 that outputs the drive signal COMB6 for driving the piezoelectric element 60 so that a small amount of ink is discharged from the discharge module 23-6 are located adjacent to each other along the X2 direction.

That is, in the head drive module 10, the drive circuits 52*a*1 to 52*a*6 that output the drive signals COMA1 to COMA6 for driving the piezoelectric element 60 so that a large amount of ink is discharged are located adjacent to each other on the first layer 831 of the wiring substrate 810. The drive circuits 52*b*1 to 52*b*6 that output the drive signals COMB1 to COMB6 for driving the piezoelectric element 60 so that a small amount of ink is discharged are located adjacent to each other on the first layer 831 of the wiring substrate 810.

The drive circuits 52*c*1 to 52*c*6 that output the drive signals COMC1 to COMC6 for driving the piezoelectric element 60 so that ink is not discharged are located side by side in the order of the drive circuits 52*c*1, 52*c*2, 52*c*3, 52*c*4, 52*c*5, and 52*c*6 along the X2 direction from the side 812 to the side 811, on the side 811 side of the wiring substrate 810 from the drive circuits 52*b*1 to 52*b*6.

That is, in the liquid discharge device 1 of the second embodiment, the drive circuits 52*a*1 to 52*a*6 having a significantly large amount of heat because a large amount of ink is discharged are collectively disposed on the first layer 831 of the wiring substrate 810. The drive circuits **52*b*1 to 52*b*6 having a large amount of heat because a small amount of ink is discharged are collectively disposed on the first layer 831 of the wiring substrate 810, and the drive circuits 52*c*1 to 52*c*6 having a smaller amount of heat are collectively disposed on the first layer 831 of the wiring substrate 810. As a result, similar to the liquid discharge device 1 of the first embodiment, it is possible to appropriately select whether or not to dispose according to the amount of heat generated by the multiple drive circuits 52, while reducing the possibility that the structure of the heat radiation member such as the heat sink 710 radiating heat from the multiple drive circuits 52 is complicated. As a result, even when the liquid discharge device 1 is provided with the multiple drive circuits 52, the heat generated by the multiple drive circuits 52** can be efficiently released.

Figure 19:
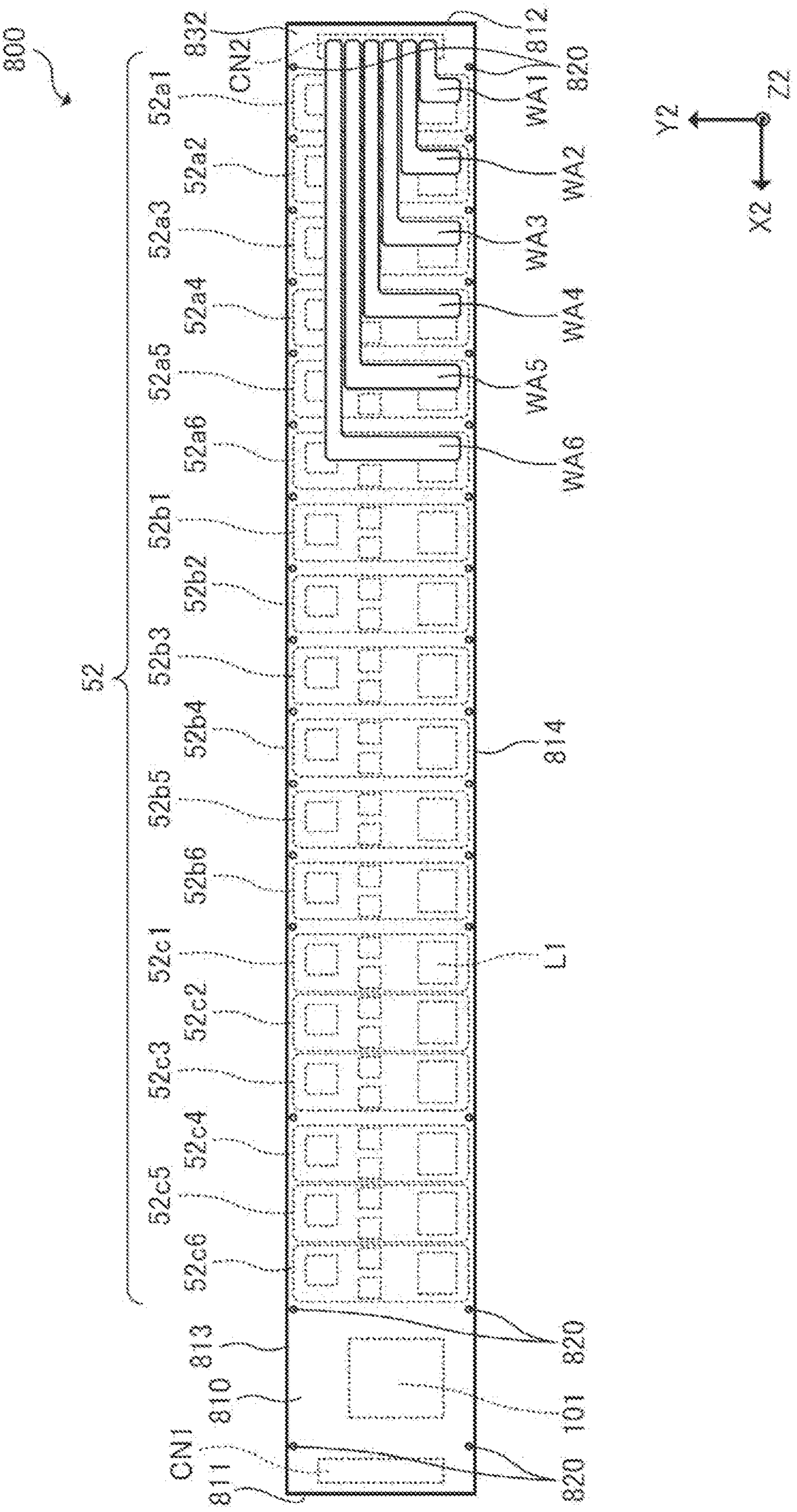
FIG. 19 is a diagram illustrating an example of a wiring pattern provided on a second layer of the wiring substrate of the second embodiment.
Figure 20:
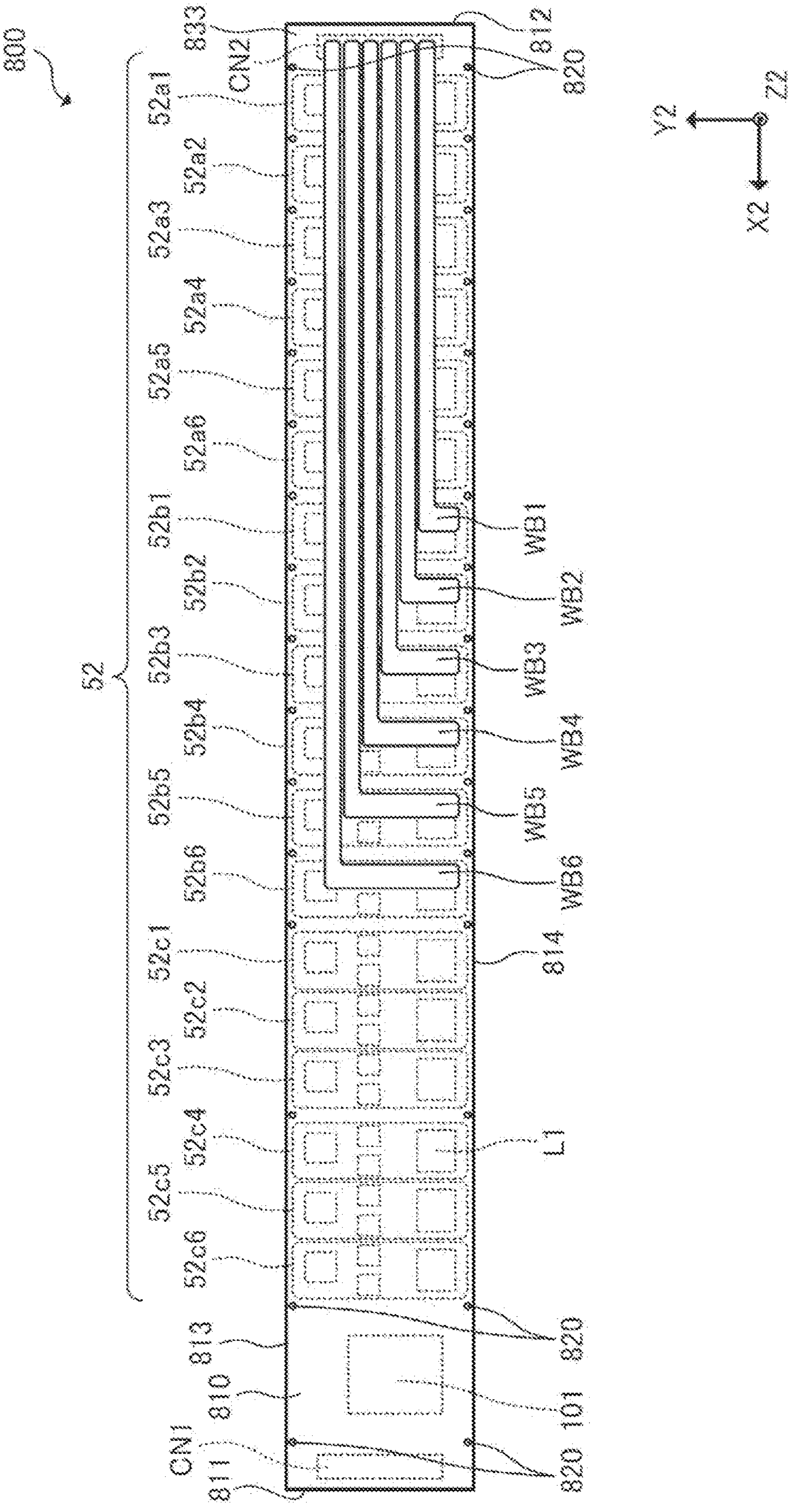
FIG. 20 is a diagram illustrating an example of a wiring pattern provided on a third layer of the wiring substrate of the second embodiment.
Figure 21:
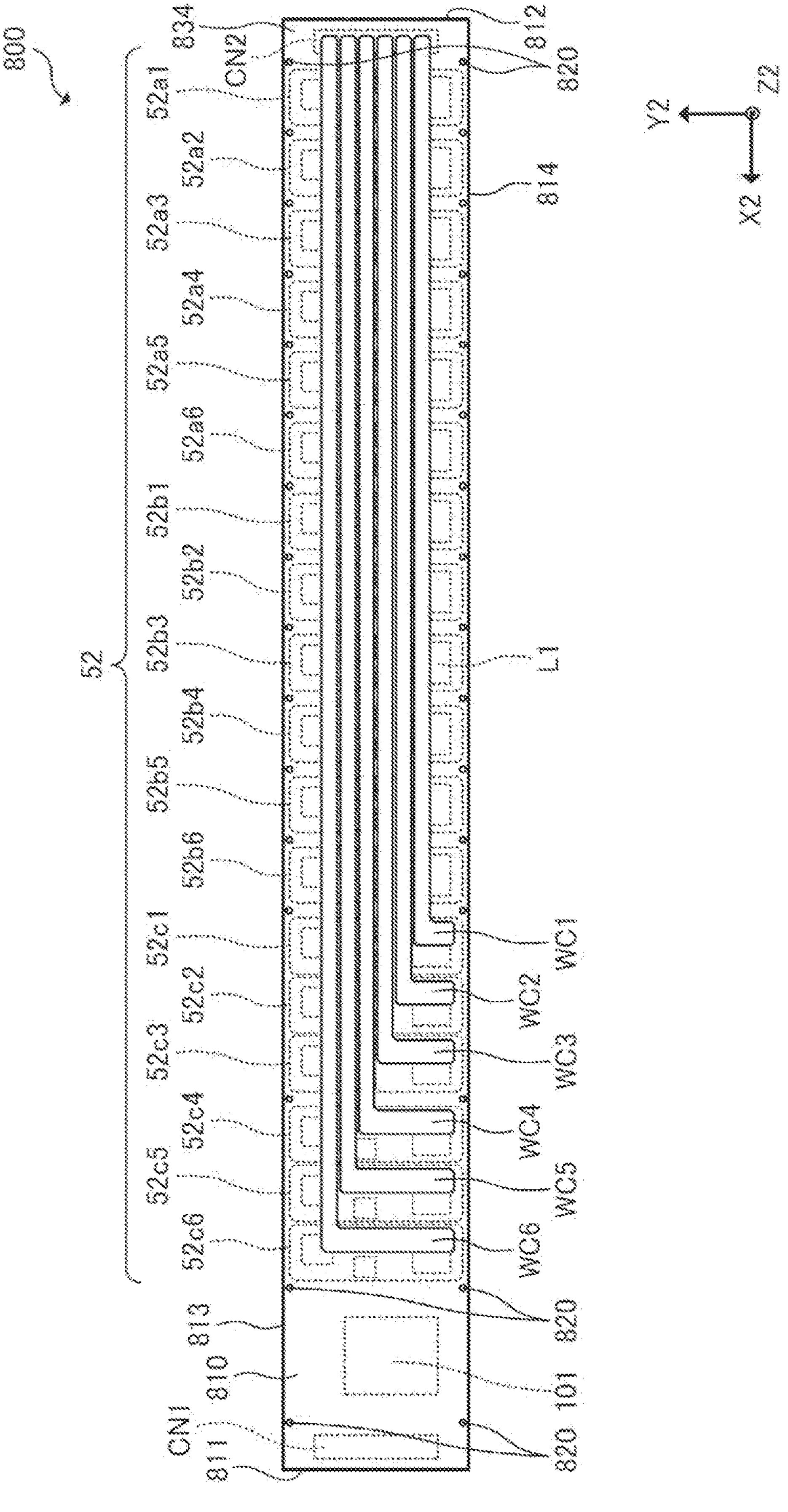
FIG. 21 is a diagram illustrating an example of a wiring pattern provided on a fourth layer of the wiring substrate of the second embodiment.

Next, in the liquid discharge device 1 of the second embodiment, an example of the configuration of the wiring pattern through which the drive signals COMA1 to COMA6, COMB1 to COMB6, and COMC1 to COMC6 propagate will be described with reference to FIGS. 19 to 21. FIG. 19 is a diagram illustrating an example of a wiring pattern provided on the second layer 832 of the wiring substrate 810 of the second embodiment. FIG. 20 is a diagram illustrating an example of a wiring pattern provided on the third layer 833 of the wiring substrate 810 of the second embodiment. FIG. 21 is a diagram illustrating an example of a wiring pattern provided on the fourth layer 834 of the wiring substrate 810 of the second embodiment.

As illustrated in FIG. 18, in the liquid discharge device 1 of the second embodiment, the drive circuits **52*a*1 to 52*a*6, 52*b*1 to 52*b*6, and 52*c*1 to 52*c*6 as the plurality of drive circuits 52 are arranged side by side on the first layer 831 of the wiring substrate 810 in the order of the drive circuits 52*a*1, 52*a*2, 52*a*3, 52*a*4, 52*a*5, 52*a*6, 52*b*1, 52*b*2, 52*b*3, 52*b*4, 52*b*5, 52*b*6, 52*c*1, 52*c*2, 52*c*3, 52*c*4, 52*c*5, and 52*c*6 from the −X2 side to the +X2 side along the X2 direction. That is, in the liquid discharge device 1 according to the second embodiment, the drive circuits 52*a*1 to 52*a*6 that output the drive signals COMA1 to COMA6 for driving the piezoelectric elements 60 included in the discharge modules 23-1 to 23-6 so that a large amount of ink is discharged from the corresponding nozzles N are collectively located in the vicinity of the coupling portion CN2. The drive circuits 52*b*1 to 52*b*6 that output the drive signals COMB1 to COMB6 for driving the piezoelectric elements 60 included in the discharge modules 23-1 to 23-6 so that a small amount of ink is discharged from the corresponding nozzles N are collectively located farther from the coupling portion CN2 than the drive circuits 52*a*1 to 52*a*6. The drive circuits 52*c*1 to 52*c*6 that output the drive signals COMC1 to COMC6 for driving the piezoelectric elements 60 included in the discharge modules 23-1 to 23-6 so that the ink is not discharged from the corresponding nozzles N are collectively located farther from the coupling portion CN2 than the drive circuits 52*b*1 to 52*b*6**.

As a result, in the liquid discharge device 1 of the second embodiment, as illustrated in FIGS. 19 to 21, the wiring lengths of the wirings WA1 to WA6 that electrically couple each of the drive circuits **52*a*1 to 52*a*6 and the coupling portion CN2 and propagate the drive signals COMA1 to COMA6 can be made shorter than the wiring lengths of the wirings WB1 to WB6 that electrically couple each of the drive circuits 52*b*1 to 52*b*6 and the coupling portion CN2 and propagate the drive signals COMB1 to COMB6. The wiring lengths of the wirings WA1 to WA6 and WB1 to WB6 that electrically couple each of the drive circuits 52*a*1 to 52*a*6 and 52*b*1 to 52*b*6 and the coupling portion CN2 and propagate the drive signals COMA1 to COMA6 and COMB1 to COMB6 can be made shorter than the wiring lengths of the wirings WC1 to WC6 that electrically couple each of the drive circuits 52*c*1 to 52*c*6 and the coupling portion CN2 and propagate the drive signals COMC1 to COMC6**.

As described above, in the head drive module 10, since the piezoelectric element 60 is driven so that a large amount of ink is discharged from the nozzles N included in the discharge modules 23-1 to 23-6, the voltage amplitude of the drive signals COMA1 to COMA6 is larger than the voltage amplitude of the drive signals COMB1 to COMB6 for driving the piezoelectric element 60 so that a small amount of ink is not discharged from the nozzles N included in the discharge modules 23-1 to 23-6. Since the piezoelectric element 60 is driven so that the ink is discharged from the nozzles N included in the discharge modules 23-1 to 23-6, the voltage amplitude of the drive signals COMA1 to COMA6 and COMB1 to COMB6 is larger than the voltage amplitude of the drive signals COMC1 to COMC6 for driving the piezoelectric element 60 so that the ink is not discharged from the nozzles N included in the discharge modules 23-1 to 23-6.

That is, the amount of current generated by the propagation of the drive signals COMA1 to COMA6 is larger than the amount of current generated by the propagation of the drive signals COMB1 to COMB6, and COMC1 to COMC6, and the amount of current generated by the propagation of the drive signals COMB1 to COMB6 is larger than the amount of current generated by the propagation of the drive signals COMC1 to COMC6. Therefore, the drive signals COMA1 to COMA6 are easily affected by the impedance generated in the wiring pattern as compared with the drive signals COMB1 to COMB6 and COMC1 to COMC6, and the drive signals COMB1 to COMB6 are easily affected by the impedance generated in the wiring pattern as compared with the drive signals COMC1 to COMC6. The wiring lengths of the wirings WA1 to WA6 through which the drive signals COMA1 to COMA6 propagate, which are easily affected by the impedance generated in such a wiring pattern, are made shorter than the wiring lengths of the wirings WB1 to WB6 and WC1 to WC6 through which the drive signals COMB1 to COMB6 and COMC1 to COMC6 propagate, and the wiring lengths of the wiring WB1 to WB6 through which the drive signals COMB1 to COMB6 propagate are made shorter than the wiring lengths of the wirings WC1 to WC6 through which the drive signals COMC1 to COMC6 propagate. Therefore, the waveform accuracy of the drive signals COMA1 to COMA6 can be further improved as compared with the liquid discharge device 1 of the first embodiment.

In addition, as illustrated in FIG. 18, in the liquid discharge device 1 according to the second embodiment, some of the plurality of through-holes 820 through which the screw 780 for attaching the heat sink 710 to the wiring substrate 810 is inserted are located between the drive circuit **52*a*1 and the drive circuit 52*a*2 located adjacent to each other, between the drive circuit 52*a*2 and the drive circuit 52*a*3 located adjacent to each other, between the drive circuit 52*a*3 and the drive circuit 52*a*4 located adjacent to each other, between the drive circuit 52*a*4 and the drive circuit 52*a*5 located adjacent to each other, between the drive circuit 52*a*5 and the drive circuit 52*a*6 located adjacent to each other, between the drive circuit 52*a*6** and the drive circuit 52*b*1 located adjacent to each other, between the drive circuit 52*b*1 and the drive circuit 52*b*2 located adjacent to each other, between the drive circuit 52*b*2 and the drive circuit 52*b*3 located adjacent to each other, between the drive circuit 52*b*3 and the drive circuit 52*b*4 located adjacent to each other, between the drive circuit 52*b*4 and the drive circuit 52*b*5 located adjacent to each other, and between the drive circuit 52*b*5 and the drive circuit 52*b*6 located adjacent to each other.

That is, when the heat sink 710 is attached to the wiring substrate 810, the screws 780 are located between the drive circuits **52*a*1 to 52*a*6 and the drive circuits 52*b*1 to 52*b*6 arranged side by side on the wiring substrate 810. As a result, similar to the liquid discharge device 1 of the first embodiment, the heat conducted to the wiring substrate 810 of the heat generated in the drive circuits 52*a*1 to 52*a*6 and the drive circuits 52*b*1 to 52*b*6 having a large amount of heat can be released to the heat sink 710 via the screw 780, and the heat generated in the head drive module 10** can be efficiently released.

3. Third Embodiment

Figure 22:
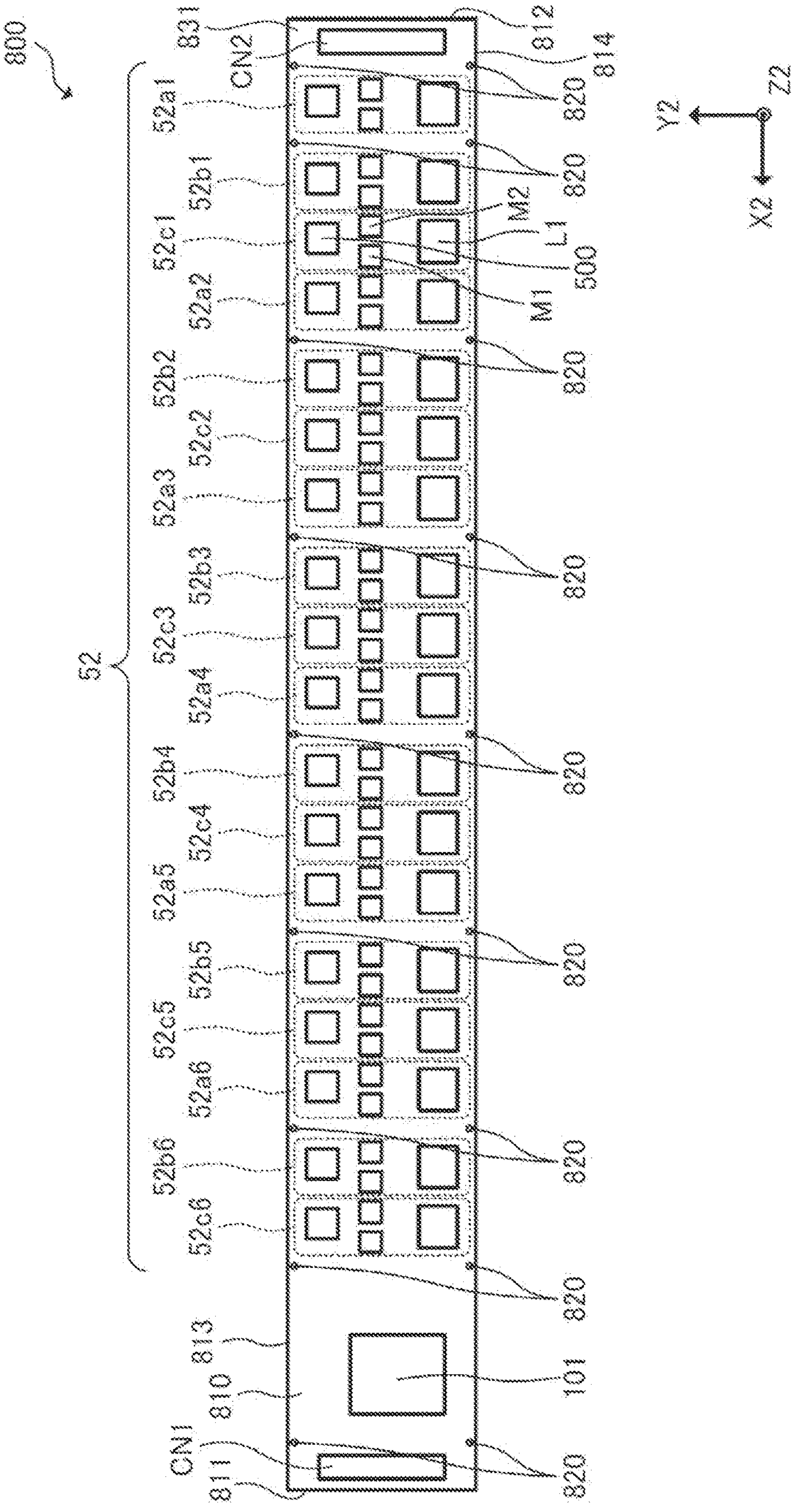
FIG. 22 is a diagram illustrating an example of a configuration of a first layer of a wiring substrate of a third embodiment.
Figure 23:
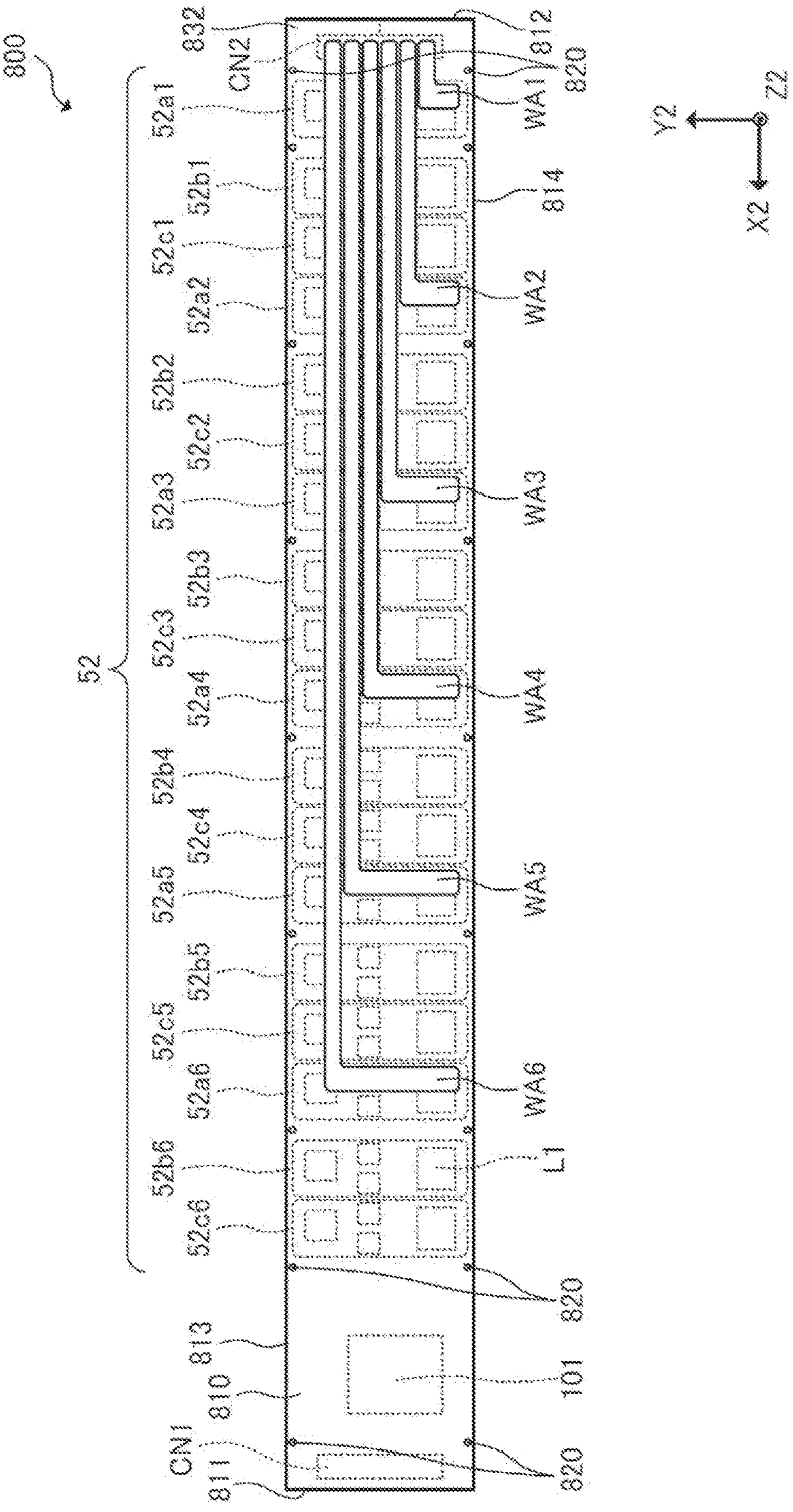
FIG. 23 is a diagram illustrating an example of a wiring pattern provided on a second layer of the wiring substrate of the third embodiment.
Figure 24:
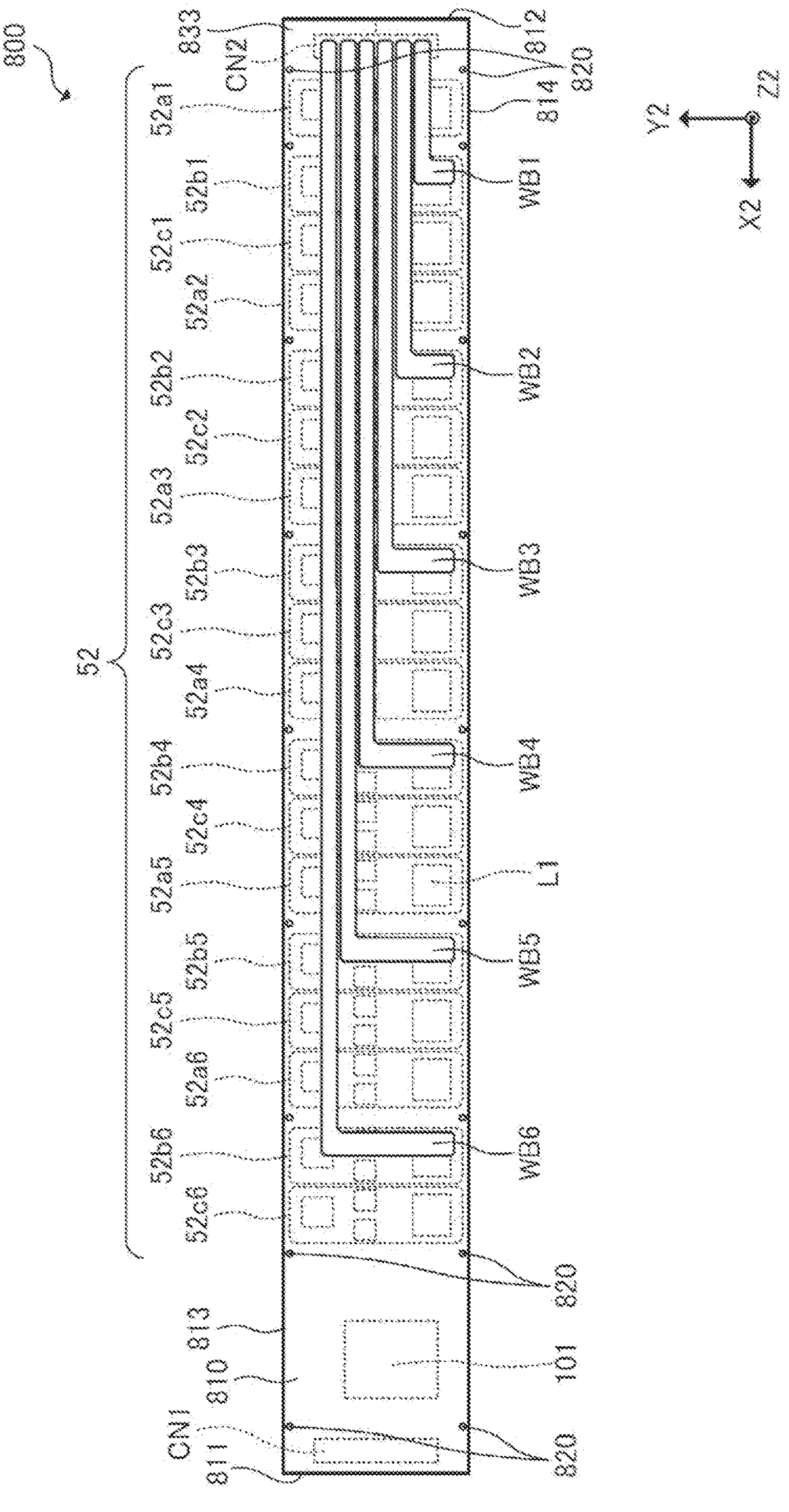
FIG. 24 is a diagram illustrating an example of a wiring pattern provided on a third layer of the wiring substrate of the third embodiment.
Figure 25:
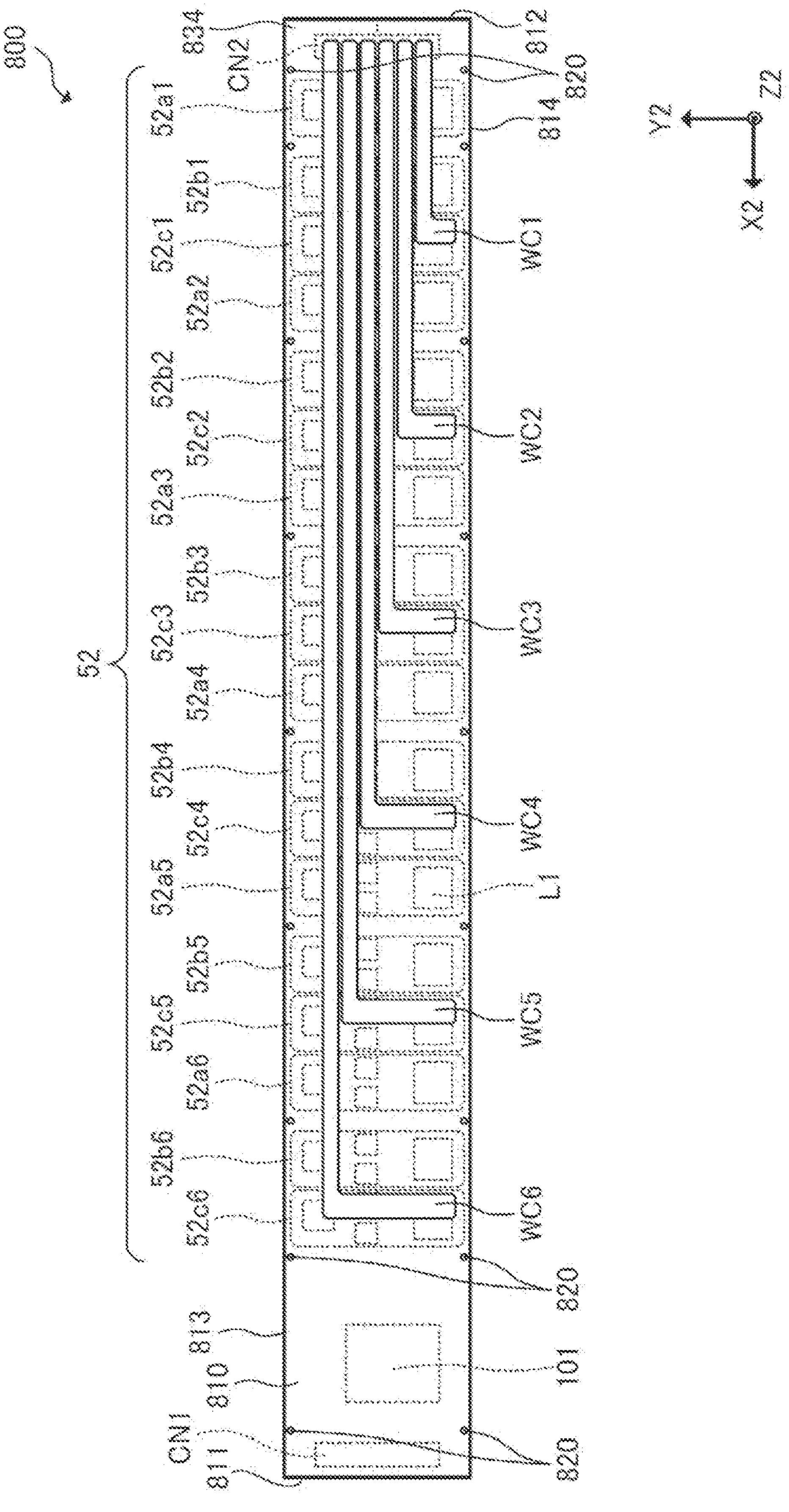
FIG. 25 is a diagram illustrating an example of a wiring pattern provided on a fourth layer of the wiring substrate of the third embodiment.

Next, a liquid discharge device 1 of a third embodiment will be described. In describing the liquid discharge device 1 of the third embodiment, the same reference numerals are given to the same configurations as the liquid discharge devices 1 of the first embodiment and the second embodiment, and the description thereof will be simplified or omitted. In the liquid discharge device 1 of the third embodiment, the disposition of the plurality of drive circuits 52 provided on the wiring substrate 810 is different from that of the liquid discharge device 1 of the first embodiment and the second embodiment. FIG. 22 is a diagram illustrating an example of the configuration of the first layer 831 when the wiring substrate 810 of the third embodiment is viewed from the Z2 side along the Z2 direction. FIG. 23 is a diagram illustrating an example of a wiring pattern provided on the second layer 832 of the wiring substrate 810 of the third embodiment. FIG. 24 is a diagram illustrating an example of a wiring pattern provided on the third layer 833 of the wiring substrate 810 of the third embodiment. FIG. 25 is a diagram illustrating an example of a wiring pattern provided on the fourth layer 834 of the wiring substrate 810 of the third embodiment.

As illustrated in FIG. 22, in the liquid discharge device 1 of the third embodiment, the drive circuits **52*a*1 to 52*a*6, 52*b*1 to 52*b*6, and 52*c*1 to 52*c*6 as the plurality of drive circuits 52 are arranged side by side on the first layer 831 of the wiring substrate 810 in the order of the drive circuits 52*a*1, 52*b*1, 52*c*1, 52*a*2, 52*b*2, 52*c*2, 52*a*3, 52*b*3, 52*c*3, 52*a*4, 52*b*4, 52*c*4, 52*a*5, 52*b*5, 52*c*5, 52*a*6, 52*b*6, and 52*c*6 from the −X2 side to the +X2 side along the X2 direction. That is, in the liquid discharge device 1 according to the third embodiment, the drive circuits 52*a*1, 52*b*1, and 52*c*1 that output the drive signals COMA1, COMB1, and COMC1 for driving the piezoelectric element 60 included in the discharge module 23-1 are located in the vicinity of the coupling portion CN2. The drive circuits 52*a*2, 52*b*2, and 52*c*2 that output the drive signals COMA2, COMB2, and COMC2 for driving the piezoelectric element 60 included in the discharge module 23-2 are located on the +X2 side of the drive circuits 52*a*1, 52*b*1, and 52*c*2. The drive circuits 52*a*3, 52*b*3, and 52*c*3 that output the drive signals COMA3, COMB3, and COMC3 for driving the piezoelectric element 60 included in the discharge module 23-3 are located on the +X2 side of the drive circuits 52*a*2, 52*b*2, and 52*c*2. The drive circuits 52*a*4, 52*b*4, and 52*c*4 that output the drive signals COMA4, COMB4, and COMC4 for driving the piezoelectric element 60 included in the discharge module 23-4 are located on the +X2 side of the drive circuits 52*a*3, 52*b*3, and 52*c*3. The drive circuits 52*a*5, 52*b*5, and 52*c*5 that output the drive signals COMA5, COMB5, and COMC5 for driving the piezoelectric element 60 included in the discharge module 23-5 are located on the +X2 side of the drive circuits 52*a*4, 52*b*4, and 52*c*4. The drive circuits 52*a*6, 52*b*6, and 52*c*6 that output the drive signals COMA6, COMB6, and COMC6 for driving the piezoelectric element 60 included in the discharge module 23-6 are located on the +X2 side of the drive circuits 52*a*5, 52*b*5, and 52*c*5**.

As a result, as illustrated in FIGS. 23 to 25, the wiring length of the wiring WA1 that electrically couples the drive circuit **52*a*1 and the coupling portion CN2 and propagates the drive signal COMA1 can be made shorter than the wiring length of the wiring WB1 that electrically couples the drive circuit 52*b*1 and the coupling portion CN2 and propagates the drive signal COMB1. The wiring lengths of the wirings WA1 and WB1 can be made shorter than the wiring length of the wiring WC1 that electrically couples the drive circuit 52*c*1 and the coupling portion CN2 and propagates the drive signal COMC1**.

Similarly, the wiring length of the wiring WA2 that electrically couples the drive circuit **52*a*2 and the coupling portion CN2 and propagates the drive signal COMA2 can be made shorter than the wiring length of the wiring WB2 that electrically couples the drive circuit 52*b*2 and the coupling portion CN2 and propagates the drive signal COMB2. The wiring lengths of the wirings WA2 and WB2 can be made shorter than the wiring length of the wiring WC2 that electrically couples the drive circuit 52*c*2 and the coupling portion CN2 and propagates the drive signal COMC2**.

Similarly, the wiring length of the wiring WA3 that electrically couples the drive circuit **52*a*3 and the coupling portion CN2 and propagates the drive signal COMA3 can be made shorter than the wiring length of the wiring WB3 that electrically couples the drive circuit 52*b*3 and the coupling portion CN2 and propagates the drive signal COMB3. The wiring lengths of the wirings WA3 and WB3 can be made shorter than the wiring length of the wiring WC3 that electrically couples the drive circuit 52*c*3 and the coupling portion CN2 and propagates the drive signal COMC3**.

Similarly, the wiring length of the wiring WA4 that electrically couples the drive circuit **52*a*4 and the coupling portion CN2 and propagates the drive signal COMA4 can be made shorter than the wiring length of the wiring WB4 that electrically couples the drive circuit 52*b*4 and the coupling portion CN2 and propagates the drive signal COMB4. The wiring lengths of the wirings WA4 and WB4 can be made shorter than the wiring length of the wiring WC4 that electrically couples the drive circuit 52*c*4 and the coupling portion CN2 and propagates the drive signal COMC4**.

Similarly, the wiring length of the wiring WA5 that electrically couples the drive circuit **52*a*5 and the coupling portion CN2 and propagates the drive signal COMA5 can be made shorter than the wiring length of the wiring WB5 that electrically couples the drive circuit 52*b*5 and the coupling portion CN2 and propagates the drive signal COMB5. The wiring lengths of the wirings WA5 and WB5 can be made shorter than the wiring length of the wiring WC5 that electrically couples the drive circuit 52*c*5 and the coupling portion CN2 and propagates the drive signal COMC5**.

Similarly, the wiring length of the wiring WA6 that electrically couples the drive circuit **52*a*6 and the coupling portion CN2 and propagates the drive signal COMA6** can be made shorter than the wiring length of the wiring WB6 that electrically couples the drive circuit 52b6 and the coupling portion CN2 and propagates the drive signal COMB6. The wiring lengths of the wirings WA6 and WB6 can be made shorter than the wiring length of the wiring WC6 that electrically couples the drive circuit 52c6 and the coupling portion CN2 and propagates the drive signal COMC6.

As a result, for each discharge module 23, the wiring lengths of the wirings WA1 to WA6 through which the drive signals COMA1 to COMA6 easily affected by the impedance generated in the wiring pattern propagate can be made shorter than the wiring length of the wirings WB1 to WB6 and WC1 to WC6 through which the drive signals COMB1 to COMB6 and COMC1 to COMC6 propagate, the wiring length of the wiring WB1 to WB6 through which the drive signals COMB1 to COMB6 propagate can be made shorter than the wiring length of the wirings WC1 to WC6 through which the drive signals COMC1 to COMC6 propagate, and the discharge accuracy of the ink for each discharge module 23 is improved.

Furthermore, in the liquid discharge device 1 according to the third embodiment, the difference in length between the wiring length of the wiring WA1 that supplies the drive signal COMA1 to the discharge module 23-1, the wiring length of the wiring WB1 that supplies the drive signal COMB1, and the wiring length of the wiring WC1 that supplies the drive signal COMC1 can be reduced, and the supply error that may occur due to the difference in wiring lengths of the drive signals COMA1, COMB1, and COMC1 supplied to the discharge module 23-1 cab be reduced.

Similarly, the difference in length between the wiring length of the wiring WA2 that supplies the drive signal COMA2 to the discharge module 23-2, the wiring length of the wiring WB2 that supplies the drive signal COMB2, and the wiring length of the wiring WC2 that supplies the drive signal COMC2 can be reduced. The difference in length between the wiring length of the wiring WA3 that supplies the drive signal COMA3 to the discharge module 23-3, the wiring length of the wiring WB3 that supplies the drive signal COMB3, and the wiring length of the wiring WC3 that supplies the drive signal COMC3 can be reduced. The difference in length between the wiring length of the wiring WA4 that supplies the drive signal COMA4 to the discharge module 23-4, the wiring length of the wiring WB4 that supplies the drive signal COMB4, and the wiring length of the wiring WC4 that supplies the drive signal COMC4 can be reduced. The difference in length between the wiring length of the wiring WA5 that supplies the drive signal COMA5 to the discharge module 23-5, the wiring length of the wiring WB5 that supplies the drive signal COMB5, and the wiring length of the wiring WC5 that supplies the drive signal COMC5 can be reduced. The difference in length between the wiring length of the wiring WA6 that supplies the drive signal COMA6 to the discharge module 23-6, the wiring length of the wiring WB6 that supplies the drive signal COMB6, and the wiring length of the wiring WC6 that supplies the drive signal COMC6 can be reduced.

As a result, the possibility that a timing difference due to the wiring length occurs in the signals input to the discharge modules 23-1 to 23-6 is reduced, and the discharge accuracy of the ink for each discharge module 23 is improved.

In addition, as illustrated in FIG. 22, in the liquid discharge device 1 according to the third embodiment, some of the plurality of through-holes 820 through which the screw 780 for attaching the heat sink 710 to the wiring substrate 810 is inserted are located between the drive circuit 52a1 and the drive circuit 52b1 located adjacent to each other, between the drive circuit 52a2 and the drive circuit 52b2 located adjacent to each other, between the drive circuit 52a3 and the drive circuit 52b3 located adjacent to each other, between the drive circuit 52a4 and the drive circuit 52b4 located adjacent to each other, between the drive circuit 52a5 and the drive circuit 52b5 located adjacent to each other, and between the drive circuit 52a6 and the drive circuit 52b6 located adjacent to each other.

That is, in the liquid discharge device 1 according to the third embodiment, the drive circuits 52a1 to 52a6, the drive circuits 52b1 to 52b6, and the drive circuits 52c1 to 52c6 are located side by side along the X2 direction in the order of the drive circuits 52a1, 52b1, 52c1, 52a2, 52b2, 52c2, 52a3, 52b3, 52c3, 52a4, 52b4, 52c4, 52a5, 52b5, 52c5, 52a6, 52b6, and 52c6 on the wiring substrate 810. The through-holes 820 through which the screws 780 for attaching the heat sink 710 to the wiring substrate 810 are inserted are located between the drive circuit 52a1 and the drive circuit 52b1, between the drive circuit 52a2 and the drive circuit 52b2, between the drive circuit 52a3 and the drive circuit 52b3, between the drive circuit 52a4 and the drive circuit 52b4, between the drive circuit 52a5 and the drive circuit 52b5, and between the drive circuit 52a6 and the drive circuit 52b6 in the X2 direction.

Even in the liquid discharge device 1 according to the third embodiment configured as described above, similar to the liquid discharge device 1 of the first embodiment and the second embodiment, the heat conducted to the wiring substrate 810 of the heat generated in the drive circuits 52a1 to 52a6 and the drive circuits 52b1 to 52b6 having a large amount of heat can be released to the heat sink 710 via the screw 780, and the heat generated in the head drive module 10 can be efficiently released.

Figure 26:
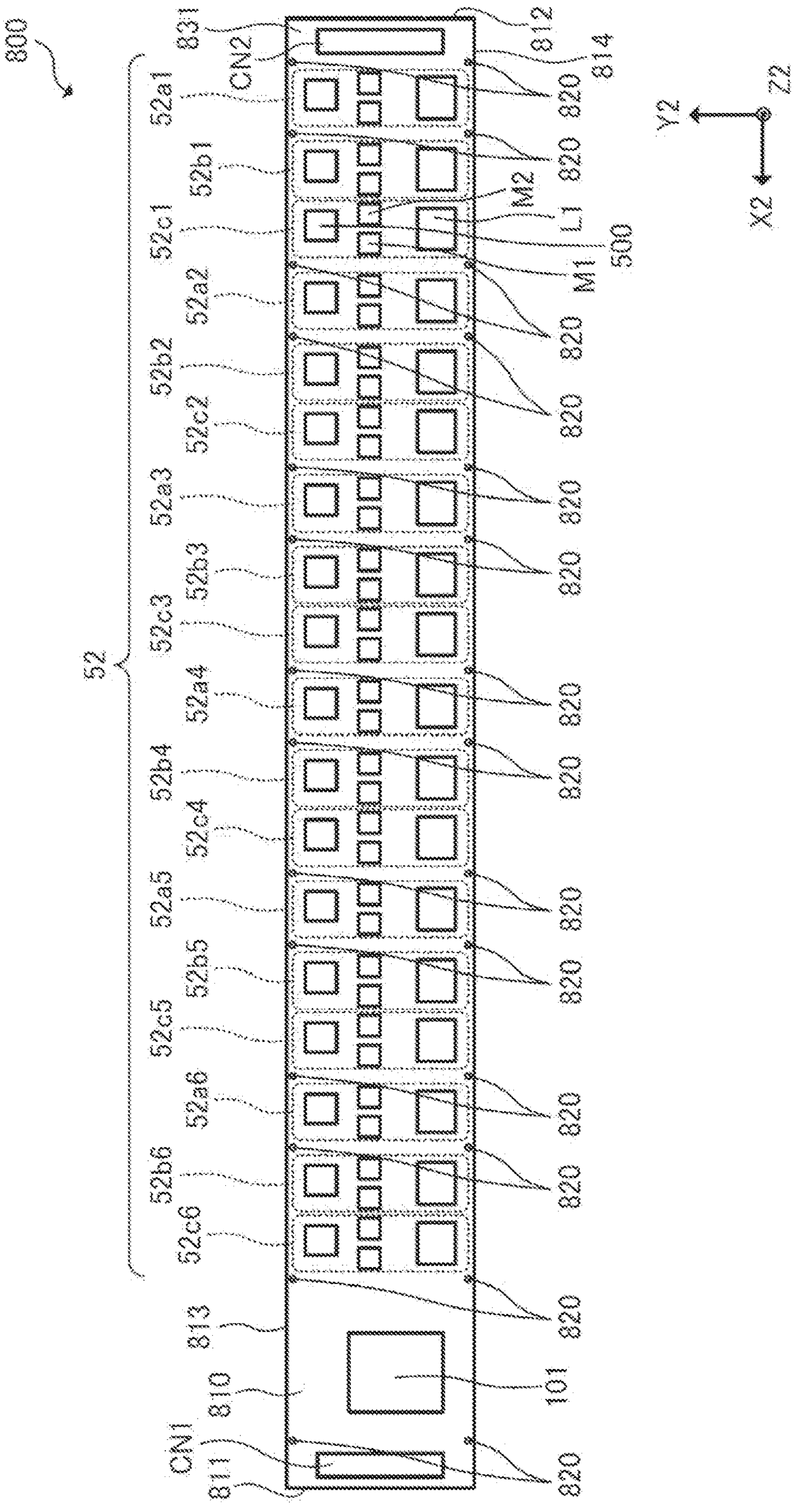
FIG. 26 is a diagram illustrating an example of a configuration of a first layer of a wiring substrate of a modification example of the third embodiment.

Here, in the liquid discharge device 1 according to the third embodiment, as illustrated in FIG. 26, a plurality of through-holes 820 through which the screws 780 for attaching the heat sink 710 to the wiring substrate 810 are inserted may be further provided between the drive circuit 52c1 and the drive circuit 52a2, between the drive circuit 52c2 and the drive circuit 52a3, between the drive circuit 52c3 and the drive circuit 52a4, between the drive circuit 52c4 and the drive circuit 52a5, and between the drive circuit 52c5 and the drive circuit 52a6 along the X2 direction. FIG. 26 is a diagram illustrating an example of a configuration of a first layer 831 when a wiring substrate 810 of a modification example of the third embodiment is viewed from the Z2 side along the Z2 direction.

In the liquid discharge device 1 according to the modification example of the third embodiment configured as described above, the heat conducted to the wiring substrate 810 of the heat generated in the drive circuits 52a1 to 52a6 having a particularly large amount of heat can be released to the heat sink 710 via two screws 780, and the release efficiency of heat generated by the head drive module 10 can be further improved.

Although the embodiments and the modification example have been described above, the present disclosure is not limited to these embodiments, and can be implemented in various aspects without departing from the gist thereof. For example, the above embodiments can be combined as appropriate.

The present disclosure includes a configuration substantially the same as the configuration described in the embodiments (for example, a configuration having the same function, method, and result, or a configuration having the same object and effect). In addition, the present disclosure also includes a configuration in which a non-essential part of the configuration described in the embodiments is replaced. In addition, the present disclosure also includes a configuration that exhibits the same action and effect as those of the configuration described in the embodiments or a configuration that can achieve the same object. In addition, the present disclosure also includes a configuration in which a known technique is added to the configuration described in the embodiments.

The following contents are derived from the above-described embodiments.

According to an aspect of the present disclosure, there is provided a liquid discharge device including a discharge head that includes a first discharge portion group having a first piezoelectric element and a first discharge portion discharging a liquid in response to a drive of the first piezoelectric element, and a second discharge portion group having a second piezoelectric element and a second discharge portion discharging a liquid in response to a drive of the second piezoelectric element, a substrate, and a first drive circuit, a second drive circuit, a third drive circuit, and a fourth drive circuit arranged side by side along one direction of the substrate, in which the first drive circuit outputs a first drive signal for driving the first piezoelectric element so that the first discharge portion discharges a liquid having a first discharge amount, the second drive circuit outputs a second drive signal for driving the first piezoelectric element so that the first discharge portion does not discharge a liquid, the third drive circuit outputs a third drive signal for driving the second piezoelectric element so that the second discharge portion discharges a liquid having a second discharge amount, the fourth drive circuit outputs a fourth drive signal for driving the second piezoelectric element so that the second discharge portion does not discharge a liquid, the third drive circuit is located between the first drive circuit and the second drive circuit along the one direction, and a shortest distance between the fourth drive circuit and the second drive circuit is shorter than a shortest distance between the fourth drive circuit and the third drive circuit.

According to the liquid discharge device, the first drive signal drives the first piezoelectric element so that the first discharge portion discharges the liquid having the first discharge amount, and the second drive signal drives the first piezoelectric element so that the first discharge portion does not discharge the liquid. Therefore, a voltage amplitude of the first drive signal is larger than a voltage amplitude of the second drive signal. Therefore, the heat generated in the first drive circuit that outputs the first drive signal is larger than the heat generated in the second drive circuit that outputs the second drive signal. In addition, similarly, the third drive signal drives the second piezoelectric element so that the second discharge portion discharges the liquid having the second discharge amount, and the fourth drive signal drives the second piezoelectric element so that the second discharge portion does not discharge the liquid. Therefore, a voltage amplitude of the third drive signal is larger than a voltage amplitude of the fourth drive signal. Therefore, the heat generated in the third drive circuit that outputs the third drive signal is larger than the heat generated in the fourth drive circuit that outputs the fourth drive signal. In this liquid discharge device, the first drive circuit, the second drive circuit, the third drive circuit, and the fourth drive circuit are arranged side by side along one direction of the substrate, the third drive circuit is located between the first drive circuit and the second drive circuit along one direction, and the shortest distance between the fourth drive circuit and the second drive circuit is shorter than the shortest distance between the fourth drive circuit and the third drive circuit. That is, the first drive circuit having a large heat generation and the third drive circuit having a large heat generation are disposed in the vicinity of the substrate, and the second drive circuit having a small heat generation and the fourth drive circuit having a small heat generation are disposed in the vicinity of the substrate. In other words, the first drive circuit and the third drive circuit having a large heat generation are collectively disposed on the substrate, and the second drive circuit and the fourth drive circuit having a small heat generation are collectively disposed. As a result, the first drive circuit having a large heat generation and the third drive circuit having a large heat generation can be centrally radiated, and whether or not to provide a heat radiation member for the second drive circuit having a small heat generation and the fourth drive circuit having a small heat generation can be appropriately selected according to the usage environment and the operating state of the liquid discharge device. As a result, even when multiple drive circuits including the first drive circuit, the second drive circuit, the third drive circuit, and the fourth drive circuit are provided, an optimum heat radiation structure according to the amount of heat generated in the first drive circuit, the second drive circuit, the third drive circuit, and the fourth drive circuit can be applied, and the heat generated in the first drive circuit, the second drive circuit, the third drive circuit, and the fourth drive circuit can be efficiently released.

In an aspect of the liquid discharge device, the device may further include a fifth drive circuit and a sixth drive circuit provided on the substrate, in which the fifth drive circuit may output a fifth drive signal for driving the first piezoelectric element so that the first discharge portion discharges a liquid having a third discharge amount, the sixth drive circuit may output a sixth drive signal for driving the second piezoelectric element so that the second discharge portion discharges a liquid having a fourth discharge amount, and along the one direction, the fifth drive circuit and the sixth drive circuit may be located between the first drive circuit and the second drive circuit, and may be located between the first drive circuit and the fourth drive circuit.

According to the liquid discharge device, even when a multi-gradation image can be formed by providing the fifth drive circuit that outputs the fifth drive signal in which the liquid having the third discharge amount different from the first discharge amount is discharged from the first discharge portion by being supplied to the first piezoelectric element, and the sixth drive circuit that outputs the sixth drive signal in which the liquid having the fourth discharge amount different from the second discharge amount is discharged from the second discharge portion by being supplied to the second piezoelectric element, the first drive circuit, the third drive circuit, the fifth drive circuit, and the sixth drive circuit, which have a large heat generation, can be centrally radiated, and whether or not to provide a heat radiation member for the second drive circuit having a small heat generation and the fourth drive circuit having a small heat generation can be appropriately selected according to the usage environment and operating state of the liquid discharge device. Therefore, even when the multiple drive circuits including the first drive circuit, the second drive circuit, the third drive circuit, the fourth drive circuit, the fifth drive circuit, and the sixth drive circuit are provided, an optimum heat radiation structure according to the amount of heat generated in the first drive circuit, the second drive circuit, the third drive circuit, the fourth drive circuit, the fifth drive circuit, and the sixth drive circuit can be applied, and the heat generated in the first drive circuit, the second drive circuit, the third drive circuit, the fourth drive circuit, the fifth drive circuit, and the sixth drive circuit can be efficiently released.

In an aspect of the liquid discharge device, along the one direction, the first drive circuit and the fifth drive circuit may be located adjacent to each other and the third drive circuit and the sixth drive circuit may be located adjacent to each other.

According to the liquid discharge device, the first drive circuit that outputs the first drive signal to the first piezoelectric element and the fifth drive circuit that outputs the fifth drive signal to the first piezoelectric element are disposed adjacent to each other, and the third drive circuit that outputs the third drive signal to the second piezoelectric element and the sixth drive circuit that outputs the sixth drive signal to the second piezoelectric element are disposed adjacent to each other. Therefore, collective cooling can be performed for each discharge portion group including the driven piezoelectric element 60, and even when the discharge portion group included in the liquid discharge device increases, the optimum heat radiation structure corresponding to the increased discharge portion group can be applied.

In addition, according to the liquid discharge device, the first drive circuit that outputs the first drive signal to the first piezoelectric element and the fifth drive circuit that outputs the fifth drive signal to the first piezoelectric element are disposed adjacent to each other, and the third drive circuit that outputs the third drive signal to the second piezoelectric element and the sixth drive circuit that outputs the sixth drive signal to the second piezoelectric element are disposed adjacent to each other. Therefore, the difference between the wiring length at which the first drive signal supplied to the first piezoelectric element propagates and the wiring length at which the fifth drive signal supplied to the first piezoelectric element propagates can be reduced, and the difference between the wiring length at which the third drive signal supplied to the second piezoelectric element propagates and the wiring length at which the sixth drive signal supplied to the second piezoelectric element propagates can be reduced. As a result, the discharge accuracy of the liquid discharged from the first discharge portion and the second discharge portion is improved.

In an aspect of the liquid discharge device, the first discharge amount may be larger than the third discharge amount, the second discharge amount may be larger than the fourth discharge amount, and along the one direction, the first drive circuit and the third drive circuit may be located adjacent to each other and the fifth drive circuit and the sixth drive circuit may be located adjacent to each other.

According to the liquid discharge device, the first drive circuit that outputs the first drive signal discharging a large amount of liquid when supplied to the first piezoelectric element and the third drive circuit that outputs the third drive signal discharging a large amount of liquid when supplied to the second piezoelectric element are disposed adjacent to each other, and the fifth drive circuit that outputs the fifth drive signal discharging a small amount of liquid when supplied to the first piezoelectric element and the sixth drive circuit that outputs the sixth drive signal discharging a small amount of liquid when supplied to the second piezoelectric element are disposed adjacent to each other. Therefore, the first drive circuit and the third drive circuit, which can generate equivalent heat generation, are disposed in the vicinity, and the fifth drive circuit and the sixth drive circuit are disposed in the vicinity of the substrate. As a result, it is possible to collectively cool for each amount of heat that can be generated, and even when the number of discharge portion groups included in the liquid discharge device increases, it is possible to apply the optimum heat radiation structure according to the increased number of discharge portion groups.

In an aspect of the liquid discharge device, a first current amount generated by propagation of the first drive signal may be larger than a second current amount generated by propagation of the second drive signal, and a third current amount generated by propagation of the third drive signal may be larger than a fourth current amount generated by propagation of the fourth drive signal.

In an aspect of the liquid discharge device, the first drive circuit may include a surface mount-type transistor.

According to the liquid discharge device, even when the first drive circuit includes the surface mount-type transistor, the heat generated by the first drive circuit can be efficiently released.

In an aspect of the liquid discharge device, the device may further include a heat sink that is attached to the substrate and releases heat from at least one of the first drive circuit, the second drive circuit, the third drive circuit, and the fourth drive circuit.

According to the liquid discharge device, by providing the heat sink having excellent heat radiation characteristics as a heat radiation member, heat generated in the first drive circuit, the second drive circuit, the third drive circuit, and the fourth drive circuit can be more efficiently released.

According to another aspect of the present disclosure, there is provided a head drive circuit that drives a discharge head which includes a first discharge portion group having a first piezoelectric element and a first discharge portion discharging a liquid in response to a drive of the first piezoelectric element, and a second discharge portion group having a second piezoelectric element and a second discharge portion discharging a liquid in response to a drive of the second piezoelectric element, the circuit including a substrate, and a first drive circuit, a second drive circuit, a third drive circuit, and a fourth drive circuit arranged side by side along one direction of the substrate, in which the first drive circuit outputs a first drive signal for driving the first piezoelectric element so that the first discharge portion discharges a liquid having a first discharge amount, the second drive circuit outputs a second drive signal for driving the first piezoelectric element so that the first discharge portion does not discharge a liquid, the third drive circuit outputs a third drive signal for driving the second piezoelectric element so that the second discharge portion discharges a liquid having a second discharge amount, the fourth drive circuit outputs a fourth drive signal for driving the second piezoelectric element so that the second discharge portion does not discharge a liquid, the third drive circuit is located between the first drive circuit and the second drive circuit along the one direction, and a shortest distance between the fourth drive circuit and the second drive circuit is shorter than a shortest distance between the fourth drive circuit and the third drive circuit.

According to the head drive circuit, the first drive signal drives the first piezoelectric element so that the first discharge portion discharges the liquid having the first discharge amount, and the second drive signal drives the first piezoelectric element so that the first discharge portion does not discharge the liquid. Therefore, a voltage amplitude of the first drive signal is larger than a voltage amplitude of the second drive signal. Therefore, the heat generated in the first drive circuit that outputs the first drive signal is larger than the heat generated in the second drive circuit that outputs the second drive signal. In addition, similarly, the third drive signal drives the second piezoelectric element so that the second discharge portion discharges the liquid having the second discharge amount, and the fourth drive signal drives the second piezoelectric element so that the second discharge portion does not discharge the liquid. Therefore, a voltage amplitude of the third drive signal is larger than a voltage amplitude of the fourth drive signal. Therefore, the heat generated in the third drive circuit that outputs the third drive signal is larger than the heat generated in the fourth drive circuit that outputs the fourth drive signal. In the head drive circuit, the first drive circuit, the second drive circuit, the third drive circuit, and the fourth drive circuit are arranged side by side along one direction of the substrate, the third drive circuit is located between the first drive circuit and the second drive circuit along one direction, and the shortest distance between the fourth drive circuit and the second drive circuit is shorter than the shortest distance between the fourth drive circuit and the third drive circuit. That is, the first drive circuit having a large heat generation and the third drive circuit having a large heat generation are disposed in the vicinity of the substrate, and the second drive circuit having a small heat generation and the fourth drive circuit having a small heat generation are disposed in the vicinity of the substrate. In other words, the first drive circuit and the third drive circuit having a large heat generation are collectively disposed on the substrate, and the second drive circuit and the fourth drive circuit having a small heat generation are collectively disposed. As a result, the first drive circuit having a large heat generation and the third drive circuit having a large heat generation can be centrally radiated, and whether or not to provide a heat radiation member for the second drive circuit having a small heat generation and the fourth drive circuit having a small heat generation can be appropriately selected according to the usage environment and the operating state of the liquid discharge device. As a result, even when multiple drive circuits including the first drive circuit, the second drive circuit, the third drive circuit, and the fourth drive circuit are provided, an optimum heat radiation structure according to the amount of heat generated in the first drive circuit, the second drive circuit, the third drive circuit, and the fourth drive circuit can be applied, and the heat generated in the first drive circuit, the second drive circuit, the third drive circuit, and the fourth drive circuit can be efficiently released.

What is claimed is:

1. A liquid discharge device comprising:

a discharge head that includes a first discharge portion group having a first piezoelectric element and a first discharge portion discharging a liquid in response to a drive of the first piezoelectric element, and a second discharge portion group having a second piezoelectric element and a second discharge portion discharging a liquid in response to a drive of the second piezoelectric element;

a substrate; and a first drive circuit, a second drive circuit, a third drive circuit, and a fourth drive circuit arranged side by side along one direction of the substrate, wherein the first drive circuit outputs a first drive signal for driving the first piezoelectric element so that the first discharge portion discharges a liquid having a first discharge amount, the second drive circuit outputs a second drive signal for driving the first piezoelectric element so that the first discharge portion does not discharge a liquid, the third drive circuit outputs a third drive signal for driving the second piezoelectric element so that the second discharge portion discharges a liquid having a second discharge amount, the fourth drive circuit outputs a fourth drive signal for driving the second piezoelectric element so that the second discharge portion does not discharge a liquid, the third drive circuit is located between the first drive circuit and the second drive circuit along the one direction, and a shortest distance between the fourth drive circuit and the second drive circuit is shorter than a shortest distance between the fourth drive circuit and the third drive circuit.

2. The liquid discharge device according to claim 1, further comprising:

a fifth drive circuit and a sixth drive circuit provided on the substrate, wherein the fifth drive circuit outputs a fifth drive signal for driving the first piezoelectric element so that the first discharge portion discharges a liquid having a third discharge amount, the sixth drive circuit outputs a sixth drive signal for driving the second piezoelectric element so that the second discharge portion discharges a liquid having a fourth discharge amount, and along the one direction, the fifth drive circuit and the sixth drive circuit are located between the first drive circuit and the second drive circuit, and are located between the first drive circuit and the fourth drive circuit.

3. The liquid discharge device according to claim 2, wherein along the one direction, the first drive circuit and the fifth drive circuit are located adjacent to each other and the third drive circuit and the sixth drive circuit are located adjacent to each other.

4. The liquid discharge device according to claim 2, wherein the first discharge amount is larger than the third discharge amount, the second discharge amount is larger than the fourth discharge amount, and along the one direction, the first drive circuit and the third drive circuit are located adjacent to each other and the fifth drive circuit and the sixth drive circuit are located adjacent to each other.

5. The liquid discharge device according to claim 1, wherein a first current amount generated by propagation of the first drive signal is larger than a second current amount generated by propagation of the second drive signal, and a third current amount generated by propagation of the third drive signal is larger than a fourth current amount generated by propagation of the fourth drive signal.

6. The liquid discharge device according to claim 1, wherein the first drive circuit includes a surface mount-type transistor.

7. The liquid discharge device according to claim 1, further comprising:

a heat sink that is attached to the substrate and releases heat from at least one of the first drive circuit, the second drive circuit, the third drive circuit, and the fourth drive circuit.

8. A head drive circuit that drives a discharge head which includes a first discharge portion group having a first piezoelectric element and a first discharge portion discharging a liquid in response to a drive of the first piezoelectric element, and a second discharge portion group having a second piezoelectric element and a second discharge portion discharging a liquid in response to a drive of the second piezoelectric element, the circuit comprising:

a substrate; and a first drive circuit, a second drive circuit, a third drive circuit, and a fourth drive circuit arranged side by side along one direction of the substrate, wherein the first drive circuit outputs a first drive signal for driving the first piezoelectric element so that the first discharge portion discharges a liquid having a first discharge amount, the second drive circuit outputs a second drive signal for driving the first piezoelectric element so that the first discharge portion does not discharge a liquid, the third drive circuit outputs a third drive signal for driving the second piezoelectric element so that the second discharge portion discharges a liquid having a second discharge amount, the fourth drive circuit outputs a fourth drive signal for driving the second piezoelectric element so that the second discharge portion does not discharge a liquid, the third drive circuit is located between the first drive circuit and the second drive circuit along the one direction, and a shortest distance between the fourth drive circuit and the second drive circuit is shorter than a shortest distance between the fourth drive circuit and the third drive circuit.

* * * * *